United States Patent
Kaplan

(10) Patent No.: US 12,300,230 B2
(45) Date of Patent: May 13, 2025

(54) CONVERSATIONAL ARTIFICIAL INTELLIGENCE SYSTEM IN A VIRTUAL REALITY SPACE

(71) Applicant: MeetKai, Inc., Marina Del Rey, CA (US)

(72) Inventor: James Kaplan, Marina Del Rey, CA (US)

(73) Assignee: MEETKAI, INC., Marina Del Rey, CA (US)

(*) Notice: Subject to any disclaimer, the term of this patent is extended or adjusted under 35 U.S.C. 154(b) by 269 days.

(21) Appl. No.: 17/886,320

(22) Filed: Aug. 11, 2022

(65) Prior Publication Data

US 2023/0108256 A1 Apr. 6, 2023

Related U.S. Application Data

(60) Provisional application No. 63/232,061, filed on Aug. 11, 2021.

(51) Int. Cl.
*G10L 15/22* (2006.01)
*G06F 3/01* (2006.01)
(Continued)

(52) U.S. Cl.
CPC ............ *G10L 15/22* (2013.01); *G06F 3/011* (2013.01); *G10L 15/26* (2013.01); *G10L 15/30* (2013.01);
(Continued)

(58) Field of Classification Search
CPC ... G10L 2015/227; G10L 15/26; G10L 15/30; G06F 3/011
(Continued)

(56) References Cited

U.S. PATENT DOCUMENTS

2017/0235848 A1* 8/2017 Van Dusen .......... G06Q 10/101
                                                                                  705/12
2019/0019510 A1   6/2019 Hafsteinsson et al.
(Continued)

FOREIGN PATENT DOCUMENTS

CN    112189229 B  *  3/2024  ............. G06F 3/167
EP     1241600 A1  *  9/2002  ............. G10L 13/00
(Continued)

OTHER PUBLICATIONS

M. Mohler, M. Tomlinson and D. Bracewell, "Applying Textual Entailment to the Interpretation of Metaphor," 2013 IEEE Seventh International Conference on Semantic Computing, Irvine, CA, USA, 2013, pp. 118-125, doi: 10.1109/ICSC.2013.30. keywords: {Training data;Context;Analytical models; Semantics;Data (Year: 2013).*
(Continued)

*Primary Examiner* — Bharatkumar S Shah
(74) *Attorney, Agent, or Firm* — Command IP LLP; Pejman Yedidsion

(57) ABSTRACT

A system for speech interpretation from a users' speech, while in a virtual environment, aided by user data and virtual world data. This system includes a virtual reality device comprising one or more user input devices, one or more user output devices, and a communication module. The output devices outputting a virtual environment to the user. A database stores information about elements in the virtual environment. An artificial intelligence module performs speech interpretation. The artificial intelligence module comprises a speech-to-text module that interprets user speech into a plurality of textual interpretations, and based on a ranking of the textual interpretations, select a top interpretation. An augmentation module adds context into the user speech to aid interpreting the speech. The context is derived from user data regarding the user's interaction with
(Continued)

the virtual environment, and virtual environment data defining an element in the virtual environment with which the user is interacting.

14 Claims, 28 Drawing Sheets

(51) Int. Cl.
    *G10L 15/26*     (2006.01)
    *G10L 15/30*     (2013.01)

(52) U.S. Cl.
    CPC .. *G10L 2015/227* (2013.01); *G10L 2015/228* (2013.01)

(58) Field of Classification Search
    USPC ........................................................ 704/232
    See application file for complete search history.

(56) References Cited

U.S. PATENT DOCUMENTS

2020/0380030 A1* 12/2020 Colas ...................... G06F 16/73
2021/0081650 A1   3/2021 Kienzle et al.
2021/0134286 A1*  5/2021 Burton ..................... G06F 9/453
2023/0033818 A1*  2/2023 Baughman ............. G06F 9/5072

FOREIGN PATENT DOCUMENTS

EP         3200185      8/2017
KR   10-2013-0137692  12/2013
WO   WO 2014/144940   9/2014

OTHER PUBLICATIONS

S. Gratzl, A. Lex, N. Gehlenborg, H. Pfister and M. Streit, "LineUp: Visual Analysis of Multi-Attribute Rankings," in IEEE Transactions on Visualization and Computer Graphics, vol. 19, No. 12, pp. 2277-2286, Dec. 2013, doi: 10.1109/TVCG.2013.173. keywords: {Rankings;Data visualization;Encoding;Histog (Year: 2013).*

P. Fromm and P. Drews, "Natural language processing for dynamic environments," IECON '98. Proceedings of the 24th Annual Conference of the IEEE Industrial Electronics Society (Cat. No. 98CH36200), Aachen, Germany, 1998, pp. 2018-2021 vol. 4, doi: 10.1109/IECON.1998.724028. keywords: {Natural language p (Year: 1998).*

M. Mohler, M. Tomlinson and D. Bracewell, "Applying Textual Entailment to the Interpretation of Metaphor," 2013 IEEE Seventh International Conference on Semantic Computing, Irvine, CA, USA, 2013, pp. 118-125, doi: 10.1109/ICSC.2013.30. keywords: {Training data;Context:Analytical models;Semantics; Dat (Year: 2013).*

S. Gratzl, A. Lex, N. Gehlenborg, H. Pfister and M. Streit, "LineUp: Visual Analysis of Multi-Attribute Rankings," in IEEE Transactions on Visualization and Computer Graphics, vol. 19, No. 12, pp. 2277-2286, Dec. 2013, doi: 10.1109/TVCG.2013.173.keywords: {Rankings;Data visualization;Encoding;Histo (Year: 2013).*

* cited by examiner

CONVERSATIONAL ARTIFICIAL INTELLIGENCE SYSTEM IN A VIRTUAL REALITY SPACE

FIELD OF THE INVENTION

The present invention is a method and apparatus for a conversational artificial intelligence system to provide open conversational interaction with a user in a virtual reality space.

DESCRIPTION OF THE RELATED ART

In virtual reality, a player exists within a space that is either virtual, as in created in 3D, or one based on a place in reality. Inside the space, objects exist with which a user can interact. In the prior art, the interactions with these items are driven through controllers, or other forms of traditional interaction. These interactions are driven by either explicit active actions or implied implicit interactions.

Active interactions are driven by pointing at an object in the 3D space and the user prompting an interaction through use of a button, joystick, hand gesture, or other analog input. The interaction can then bring about changes in the virtual scene, by way of presenting user interface controls or dialogs. This interaction is limited to scripted flow, through decision trees or other pre-programmed encounters. The scripts are limited in content and scope and provide a narrow interaction experience to a user.

Implicit interactions are those that are prompted and started by means of the program detecting that the user is seeking an interaction with some object. This is done in the prior art by detecting what the user's gaze is pointed at in the virtual space. In this way, if there is a long period of time in which the gaze lingers on the same element in the virtual space, the program determines to start an interaction. This interaction leads to the same limited and narrow pre-programmed interaction pathway as in the previous section's descriptions of active interactions.

SUMMARY OF THE INVENTION

AI services: Services provided as procedures and methods to a program to accomplish artificial intelligence goals. Examples may include, but are not limited to, image modeling, text modeling, forecasting, planning, recommendations, search, speech processing, audio processing, audio generation, text generation, image generation, and many more.

Device: A device is any element running with a minimum of a CPU. Optionally, an accelerator can be attached in the form of a GPU or other specialized hardware accelerator. This accelerator can speed up the computation of AI services.

Application: An application is any software running on any user facing device such as mobile devices, smart watches, tablets, home speakers, wearable devices including smart rings, glasses, hearing aids, CarPlay devices, security cameras, webcams, televisions, projection screen monitors, sound bars, personal computers, headphones, earbuds, and laptop devices where a user can interact with touch, audio, visual, or passively.

To overcome the drawbacks of the prior art and provide additional benefits, a system is disclosed for speech interpretation from a users' speech, while in a virtual environment in real-time, aided by user data and virtual world data. In one embodiment, this system includes a virtual reality device comprising one or more user input devices, one or more user output devices, and a communication module, the one or more user output devices outputting a virtual environment to the user comprising at least one visual element. Also part of this embodiment is a database, storing information about elements in the virtual environment, as well as an artificial intelligence module configured to perform speech interpretation. In one configuration, the artificial intelligence module comprises a speech-to-text module configured to interpret user speech received from the one or more user input devices into a plurality of textual interpretations and based on a ranking of the textual interpretations, select a top interpretation. The artificial intelligence module also includes an augmentation module configured to add context into the user speech to aid in understanding and interpreting the speech. The context may be derived from one or both of the following: a user data received from the one or more user input devices of the virtual reality device that provide data regarding the user's interaction with the virtual environment, and virtual environment data defining an element in the virtual environment with which the user is interacting.

In one embodiment, the user data comprises what the user is looking at in the virtual environment or pointing at in the virtual environment, or both. This system may further comprise a response generation module configured to form a question from the top interpretation with the added context, query a second database with the question, receive an answer from the second database responsive to the question, and then generate and provide a user response to the user based on the answer. It is contemplated that the virtual environment data comprises metadata that defines elements in the virtual environment. In one configuration, the virtual reality device includes a headset and one or more hand controllers. Textual interpretations related to elements in the virtual environment that the user is looking at, pointing at, or holding are giving a higher ranking than other textual interpretations. In one embodiment, the virtual environment data defines elements within the virtual environment and the location of those elements within the virtual environment.

Also disclosed is a method for speech interpretation from a user in a virtual environment, which may occur in real-time, aided by user data and virtual world data. This data may include presenting the virtual environment to a user using a virtual reality device. The virtual reality device may comprise one or more user input devices, one or more user output devices, and a communication module, the one or more output devices outputting a virtual environment to the user comprising at least one visual element. This method monitors for user speech with an artificial intelligence module that is configured to perform speech interpretation, the artificial intelligence module further comprising a speech-to-text module and an augmentation module. Responsive to detecting user speech, the artificial intelligence module processes the speech with the speech-to-text module that is configured to interpret user speech received from the one or more user input devices into a plurality of textual interpretations and based on a ranking of the textual interpretations, select a top interpretation. This method further includes obtaining user speech context from the augmentation module which is configured to add context into the user speech such that the context is derived from one or both of the following: user data received from the one or more user input devices of the virtual reality device that provide data regarding the user's interaction with the virtual environment and virtual environment data defining an element in the virtual environment with which the user is interacting.

In one embodiment, the virtual environment data is stored in a database which stores data regarding the elements in the virtual environment and the location of the elements. The user data may comprise what the user is looking at in the virtual environment or pointing at in the virtual environment, or both. In one configuration, this method further comprises, using a response generation module, performing the following: forming a question from the top interpretation with the added context, querying a second database with the question, receiving an answer from the second database responsive to the question, and generating and providing a user response to the user based on the answer. The virtual environment data may comprise metadata that defines elements in the virtual environment. The virtual reality device may include a headset and one or more hand controllers. It is contemplated that the textual interpretations that relate to elements in the virtual environment that the user is looking at, pointing at, or holding are given a higher ranking than other textual interpretations. In one embodiment, the virtual environment data defines elements within the virtual environment and the location of those elements within the virtual environment.

DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1A:
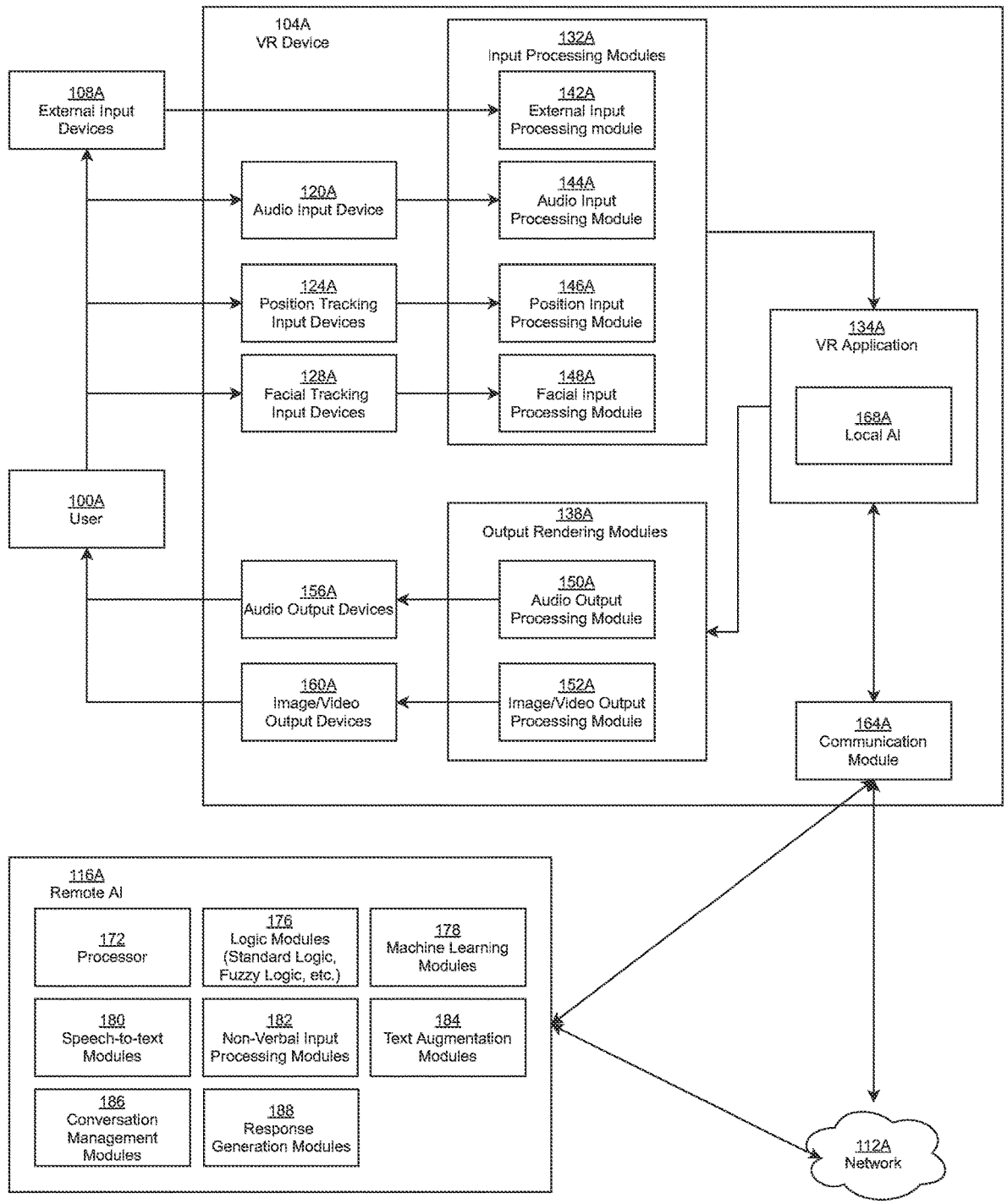
FIG. 1A illustrates a first exemplary embodiment of the present virtual assistant system integrated into a virtual reality system.

In this invention, a user is now able to interact with an AI in the virtual space through conversation. The various embodiments and features described and contemplated herein include the following:

1. A user is able to utilize voice and free form text to interact with their virtual space.
2. A user is able to utilize their voice and free form text in order to interact in response to voice prompts in the space.
3. A user is able to utilize their voice to ask questions about what they are looking at in the space.
4. A user is able to utilize their voice to respond to events that take place in the virtual space.
5. A user's head position and eye movement may be combined with their voice in order to drive a conversation
6. A user's head position, gaze direction, and or gestures may be combined with voice to drive a conversation.
7. External biosensors may be combined with any of the previous embodiments in order to provide additional means of input for the conversation.

These sensors could, for example but without limitation, take into account heart rate in order to provide signals to the AI for prompting conversations.

8. Tone of voice could be used to influence the conversation.
9. Any combination of the previous embodiments can be tracked over time in order to calibrate the AI to be more in tune with the user.

10. Multiple turns of conversation can take place by having the AI respond to the user in the virtual space, the user may then continue to ask questions or discuss with the AI.

A user or player exists within a virtual space; this space may be modeled off one that exists in reality, or it can be something entirely synthetic and synthesized through means of 3D graphics creation. Alternatively, it may be a hybrid of the two, where elements from reality are combined with those of computer creation. Inside this virtual space or scene, there are rendered 3D objects. These 3D objects can be statically placed or mobile and may come in and out of the scene (i.e., within the virtual space). These objects may be based on items from reality or entirely new.

Method of Operation

Step 1: Voice Detection

A user may start an active conversation in the virtual reality space by simply speaking. The application rendering the virtual world first utilizes voice activity detection in order to differentiate that the user has started speaking, as opposed to ambient noise activity.

Step 2: Speech to Text Recognition Customized to Virtual Environment

When true speech is detected, the application then needs to process the input audio from the microphone in order to recognize the user's spoken text. This processing can either happen as part of the viewing device, on a device connected to the viewing device, or on a remote server over the network. This secondary system converts the stream of audio into the spoken language. The speech recognition system is capable of being customized to the current scene that the user is experiencing inside the virtual space. This customization could allow for custom vocabulary to be recognized when it would make sense in the specific environment. By way of an illustrative example; if a user were in a dinosaur world, then the speech recognition system would be customized to enhance name recognition of the variety of dinosaurs.

Step 3: Spoken Text Augmented by Virtual Space

When the speech recognition system has successfully transcribed the user's spoken text, the system may then combine its knowledge of what the user is currently doing, or interacting with, to enhance its linguistic understanding of what the user has said. For example, this allows the AI to find co-references between what the user said and what they are looking at. Such as, if a user asks, "how old is this", the term "this" can be implied from what the user is currently looking at. This functionality can be carried about by fusions of any or one of the following inputs: the user's head position, eye detection, hand position including, but not limited to, placement, grip, pointing, controller position, and general orientation. Furthermore, the system may also fuse in non-controller related signals, such as biometrics from heart rate, breathing patterns, and any other bio-sensory information. This information is fused over time, in order to detect not just instantaneous values for fusion but trends as well.

Step 4: Conversation Extension

Once the system has augmented the text by taking into account the current state of the virtual space in relation to the user, then a conversation can be carried out. The system classifies the spoken text into different categories in order to facilitate the open ended conversation. First the system must determine if a statement is meant to initiate a new conversation or one that continues an existing conversation.

New Conversation

If the user is detected to initiate a new conversation, then the system needs to classify the result among these categories:
1. User comments that do not necessarily require a strong response. For example, if a user states "this is really cool", the system could respond with a more descriptive response in relation to what was remarked as being cool. Alternatively, the system need not respond.
2. User questions that are in relation to the current scene.
3. User questions that are in relation to the non-virtualized world (i.e., reality).

In categories 2 and 3, the AI must facilitate an answer to the question. In category 2 of a question being detected in relation to the virtual world, the system can then proceed down to one of two or more paths. The AI will first attempt to use information local to the AI in order to answer the question. This might be information stored locally, in a connected device or on a remote server. If this information is not sufficient to answer the question, then the system will need to connect to an external database in order to generate an answer. This external database can be a separate application running on the local device, or on a connected device, over the local network or remotely in the cloud.

Continued Conversation

If the user is in an existing conversation, then the system should proceed with the same approach as in the previous section, but with the added impetus of taking into account the context.

Step 5: Response Generation

Once the 4th step has been carried out, the AI may generate an answer responsive to the user. This answer may be transmitted to the user over user interface prompts, dialogs, spoken or rendered text. This response generation can occur locally on the device, or over the network streaming back audio and visuals.

Step 6: Conversation Management

After the response is provided, the AI must take into account the likelihood that the user will continue to ask questions or follow ups to the previous response. The system will use this information in order to better carry out the next algorithm by utilizing this additional information.

Invention Diagrams

FIG. 1A illustrates a first exemplary embodiment of the present virtual assistant system integrated into a virtual reality system. The virtual reality space is rendered by a virtual reality system. Exemplary virtual reality systems are described in U.S. Pat. No. 9,898,091, U.S. Patent Publication 2014/0364212, and U.S. Patent Publication 2015/0234189, which are incorporated by reference herein in their entirety as teaching exemplary virtual reality systems and methods. A user 100A may access the virtual reality space by the one or more components of a virtual reality system, such as a virtual reality device ("VR device") 104A and external input devices 108A, which may be accessories to the VR device 104A. The VR device 104A may be in direct communication with the external input devices 108A (such as by Bluetooth®) or via network 112A providing internet or signals (e.g., a personal area network, a local area network ("LAN"), a wireless LAN, a wide area network, etc.). The VR device 104A may also communicate with a remote AI 116A via the network 112A.

In a preferred embodiment, the VR device 104A may be a wearable user device such as a virtual reality headset ("VR headset"), and the external input devices 108A may be hand-held controllers where a user may provide additional input such as arm motion, hand gestures, and various selection or control input through buttons or joysticks on such controllers.

The VR device may generally include input devices 120A through 128A, input processing modules 132A, VR applications 134A, output rendering modules 138A, output devices 156A, 160A, and a communication module 164A. Input devices may include one or more audio input devices 120A (such as microphones), one or more position tracking input devices 124A (to detect a user's position and motion), and one or more facial tracking input devices 128A (such as facial cameras to detect facial expressions, eye-tracking camera to detect gaze and eye movement, etc.). Additional external input devices may provide user biometrics data or tracking of other user body parts.

The input processing modules 132A may include, but are not limited to, an external input processing module 142A (used to process external inputs such as input from external devices 108A or additional external input devices discussed above), an audio input processing module 144A (used to process audio inputs, such as user speech or sounds), a position input processing module 146A (to process position and motion tracking inputs such as hand motions, finger motions, arm motions, head position), and a facial input processing module 148A (to process facial inputs of the user).

The VR applications 134A are generally responsible for rendering virtual reality spaces associated with their respective VR applications 134A. For example, a VR museum application may render a virtual museum through which a user may traverse and present various artwork which the user may view or interact with. This is achieved through the VR application's 134A integration with output rendering modules 138A, which in turn presents the rendered files on output devices 156A, 160A.

Specifically, the output rendering modules 138A may include, but are not limited to, an audio output processing module 150A responsible for processing audio files, and an image and/or video output processing module 152A, responsible for processing image and/or video files. In turn, one or more audio output devices 156A, such as built-in speakers on the VR headset may present the processed audio file, and one or more image and/or video output devices 160A (such as a built-in screen on the VR headset) may display the processed image and/or video files. Other types of output may include but are not limited to motion or temperature changes to the VR device 104A or the external input devices 108A (such as vibration on hand-held controllers).

User interaction may in turn modify the virtual reality space. For example, if a user inputs motion to indicate he picked up a vase, the rendered virtual reality space may display a vase moving in accordance with the user's motion. Thus, the transmission of information occurs in a bi-directional streaming fashion, from the user 100A to the VR device 104A and/or external input devices 108A, then from the VR device 104A and/or external input devices 108A back to the user 100A. U.S. patent application Ser. No. 17/218,021 provides a more detailed discussion on bi-directional streaming using AI services and examples of broader and specific uses.

The AI may be completely or partially built into the VR device 104A or specific VR applications 134A. Such built-in AI components may be referred to a local AI 168A. Other AI components may be located in the remote AI 116A, which may be operating on remote devices or on cloud-based servers. The local and remote AI 168A, 116A may communicate via the network 112A.

The AI may enhance the user's 100A interaction with the virtual reality system using the embodiments and methods described above. The AI may include one or more of the following components to generally operate the AI and process data, one or more processors 172 and one or more memory storage devices where logic modules 176 and machine learning modules 178 may be stored to provide general AI services. The memory storage devices may further include one or more modules to specifically enhance user-VR interaction, such as speech-to-text modules 180, non-verbal input processing modules 182, text augmentation modules 184, conversation management modules 186, and response generation modules 188.

The speech-to-text modules 180 may be used to perform step 2 of the method discussed above, as well as to generally detect, recognize, process, and interpret user audio input. Recognition allows the speech-to-text modules 180 to distinguish between verbal input (such as a user question) and non-verbal input (such as the user's sight of relief).

While the virtual reality system may have its own modules to process audio inputs, the AI's speech-to-text modules 180 are intended to integrate and enhance existing features in the virtual reality system. Thus, the AI's speech-to-text modules 180 are more robust than traditional voice recognition and processing tools in that the AI speech-to-text modules 180 may generate exponential amounts of interpretations from a single user input, automatically select the top interpretation based on user data, and hold multi-turn conversations with the user as a continuation of that single user input. The enhanced speech-to-text and integration with other applications outside the virtual reality system, and the additional mechanism to recognize usable user input (as discussed in step 2) and to process out of scope user input are discussed in more details in Appendix A.

The AI's non-verbal input processing modules 182 may be used to process non-verbal input. As discussed above, audio input may be non-verbal (such as a user's sigh of relief, or tone of voice). As well, external input devices 108A may include devices to track a user's biometrics or body parts other than arm, hand, and finger movement. Such input may all be processed using additional processing modules, which may be part of the virtual reality system (such as built into the VR device 104A), and/or may be part of the local or remote AI 168A, 116A.

The AI's text augmentation modules 184 may be used to perform step 3 of the method discussed above, where the text augmentation modules 184 are integrated with the virtual reality system to add further context to the interpreted user 100A input.

The text augmentation modules 184 may also be integrated with the non-verbal input processing modules 182 to receive further context. For example, in a multi-turn conversation where a user requests information, the user may input the word "okay". Conventional system may, by default, cease communication because the response "okay" may be pre-coded as a command to terminate interaction. The text augmentation modules 184, in contrast, may analyze the user's tone to detect (1) boredom, and interpret "okay" as a request to shorten the information provided, (2) hesitation or confusion, and interpret "okay" as a request for additional information, (3) impatience, and interpret "okay" as a request to end the interaction.

The text augmentation modules' 184 integration with other devices and modules may not be linear. Rather, context from the virtual reality system may be used in one or more steps of speech interpretation, top interpretation selection, and multi-turn conversations.

The AI's conversation management modules 186 may be used to generate output and/or perform steps 4 to 6 of the method discussed above, where the conversation management modules 186 may be integrated with the text augmentation modules 184 to generate the output used in single or multi-turn conversations.

The AI's response generation modules 188 may be used to generate the output used by the conversation management modules 186. Responses are generated by utilizing resources beyond the virtual reality system to reach additional databases via network. Using the example discussed in step 3, when the user 100A says "how old is this", the virtual reality system may provide context to what the user may be referring to by the term "this". However, upon identification of the object, the answer may be retrieved from other databases through the network 112A.

Using a more specific example, if the VR application 134A currently in use is a museum application, where the user 100A may explore a virtual museum environment displaying various artwork, the speech-to-text module 180 may process a user 100A input inquiry, such as "how old is this". The text augmentation system 182 may, through the VR device's 104A facial tracking input devices 128A and external input devices 108A, identify the user 100A is both looking at and pointing to a vase. The museum application may provide basic information of the displayed artwork (such as artist, date of creation, etc.). Thus, the VR application 134A may, directly or via the AI, output the basic information to the user 100A.

On the other hand, the proper response to the user's first question or any question may not be available in the museum application. For example, a user may ask "can we still recreate this vase today?" or "what chemical was used to create the blue color in the vase", or "what type and temperature of kiln was used to fire the clay in the vase?" to which the proper answer may require an analysis of crafting materials available today, an evaluation of the skills of current artists and/or technology. The user could ask any type question or any type of subject matter about any items in the museum virtual space. This additional information would not be available in the limited scripted museum data file about the vase, but is available in external databases accessible through the network 112A using the AI system. In the prior art, such detailed and unique questions are not stored in the museum application or the VR device 104A. Thus, the AI's response generation modules 188 may identify (1) the response is not available in the museum application, and (2) the response is available in a first and second database (i.e., somewhere on the Internet). As a result, the AI's response generation modules 188 may then query the first and second database to retrieve the necessary information to generate an output such as "yes, while material X used for this vase in the year 1340 no longer exists today, we can use material Y as a substitute, thereby achieving a similar look and texture".

Further, a feature that may not be available in conventional virtual reality systems or conversational AI systems is multi-turn conversation. Following the example above, a user may receive the output and then ask, "can you show me what that would look like". Conventional virtual reality systems may not understand what "that" is referring to, or incorrectly identify the user is still looking at the displayed vase, or not have the requested information. In contrast, through the integration of speech-to-text modules 180, conversation management modules 186, and logic modules 176 such as natural language understanding modules, fuzzy logic modules, the AI would understand the user 100A, in continuation of the previous exchange, is referring to a vase crafted in modern day using material Y and may thus provide output that is truly responsive to the user's second input, and can even download and provide audio, text, images, or video to the user on any topic.

In addition to the robust speech interpretation and multi-conversation feature, the AI presents two other main improvements on conventional virtual reality systems, those being unlimited data and dynamic rendering. Using the previous example, a museum application's data is limited to the pre-loaded data in the application. This is due to the limitation of resources such as limited memory storage and processing power. The AI, in contrast, may query any database accessible over the network. Thus, the entire universe of information available on the internet is accessible by the user through AI.

The same limitation restricts conventional virtual reality systems to fixed rendering of the virtual environment. In other words, the virtual environment presented to the user is based on preset audio, image, and video files. For example, if a user were to take a virtual tour of a museum, conventional virtual reality systems may be able to render the main structures of the museum, and the art currently on display. However, a user may not be able to pick up a vase and inspect from various angles because the vase may only be rendered in a few fixed angles. But because the AI may query additional databases, the AI may retrieve unlimited images of the vase, and render the vase at any angle.

Figure 1B:
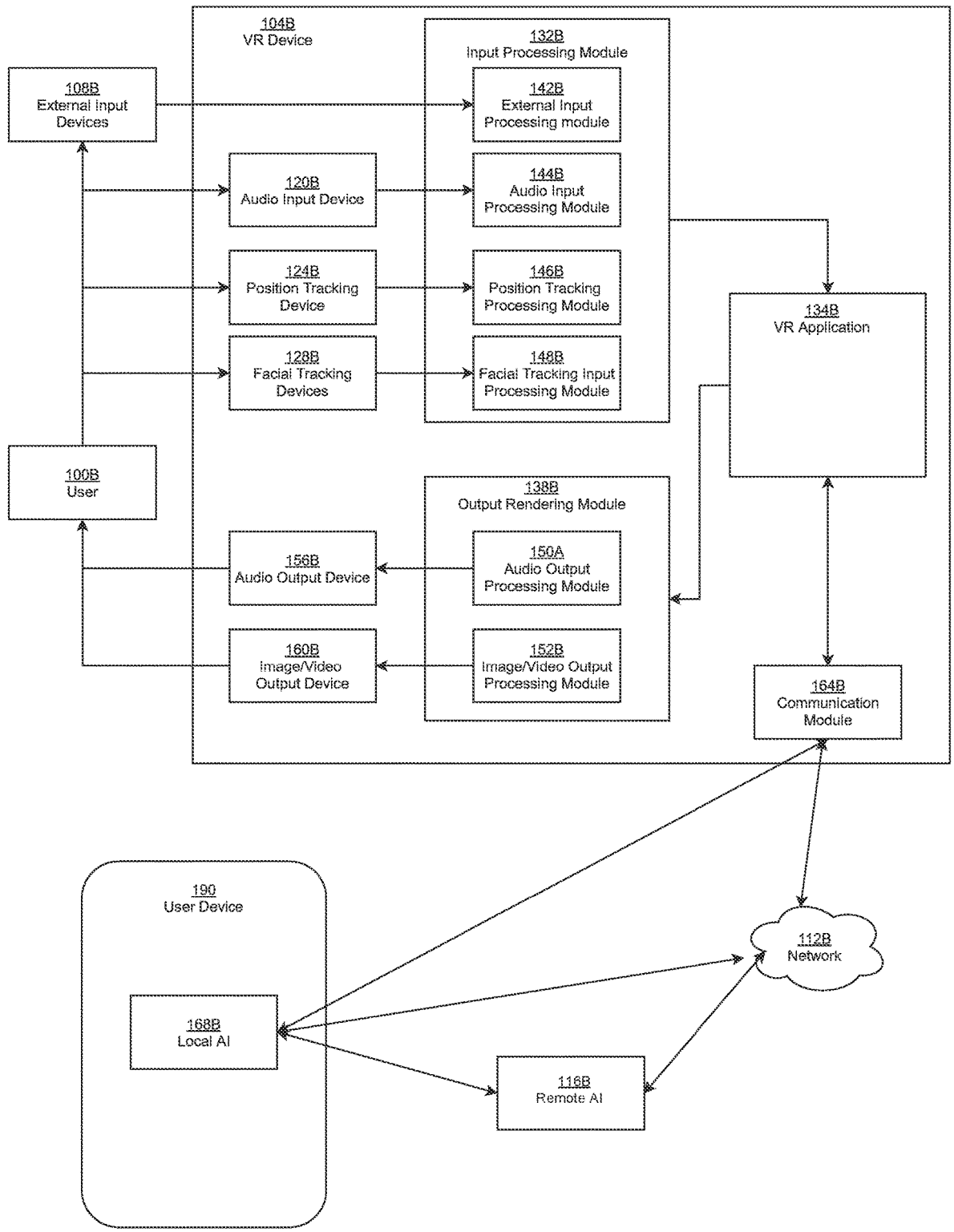
FIG. 1B illustrates a second exemplary embodiment of the present virtual assistant system, where the virtual reality system may use a local AI operating on a separate user device.

FIG. 1B illustrates a second exemplary embodiment of the present virtual assistant system, where the virtual reality system may use a local AI 168B operating on a separate user device 190 such as a smartphone, a tablet, a personal computer, etc. Such separate user devices 190 may establish direct communication to the communication module 164 in the VR device 104B and/or a remote AI 116B housing additional AI modules or may communicate with the VR device 104B and remote AI 116B via the network 112B. The various AI components 172-188 illustrated in FIG. 1A and discussed above may be stored in the local AI 168B and/or the remote AI 116B. The external input devices 108B and the various VR device components 120B-164B may interact with each other and with the local and remote AIs 168B, 116B in similar fashion as described in FIG. 1A.

It is contemplated that in any embodiment, including but not limited to 1A and 1B, any one or more of the AI modules 172-188 may be included in the local AI 168 and/or the remote AI 116. In one embodiment, all AI modules 172-188 may be located on a local AI 168 operating in the VR device 104 such that no remote AI 116 may be necessary. Alternatively, all AI modules 172-188 may be located in a remote AI 116. In preferred embodiments, most or all AI modules 172-188 are in a remote AI 116 such that the AI may be integrated with any VR device 104, including VR devices 104 with no built-in local AI 168A. Such integration may be achieved using AI layers to power cross platform AI services, which is discussed in more details in U.S. patent application Ser. No. 17/218,021.

Figure 2A:
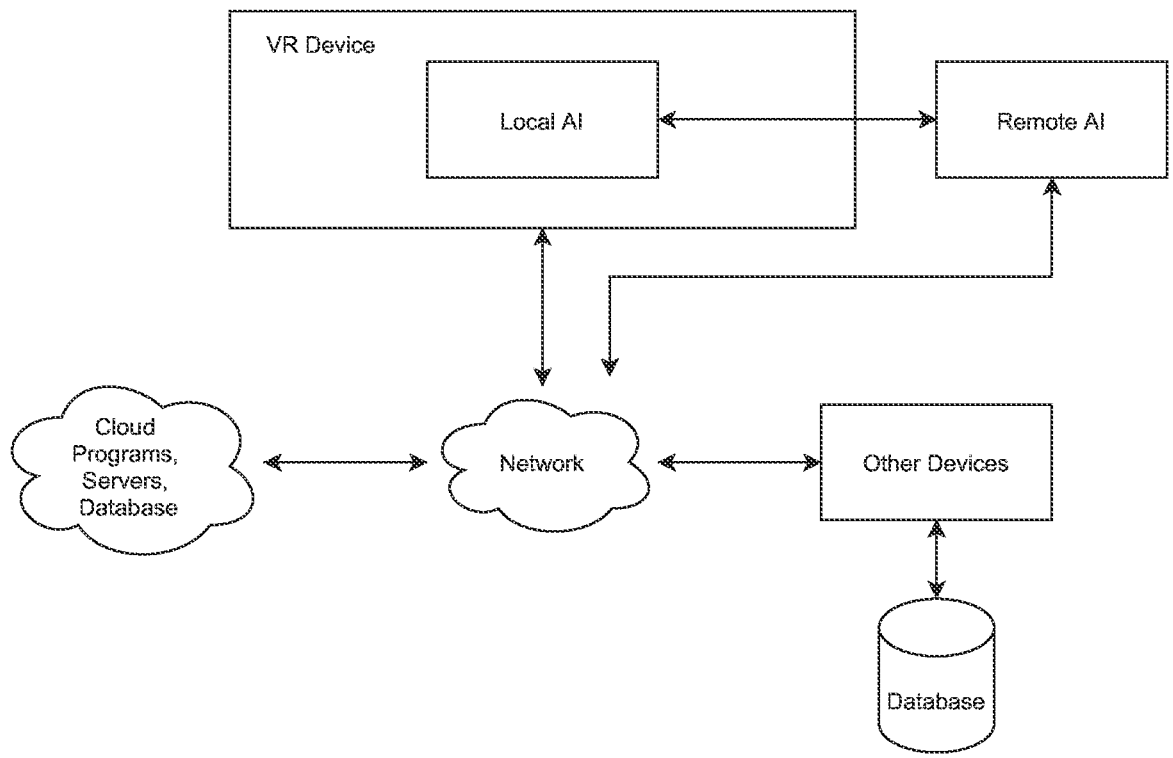
FIG. 2A illustrates a first exemplary environment of use of the AI, corresponding to the embodiment of the first virtual reality system described in FIG. 1A.

FIG. 2A illustrates a first exemplary environment of use of the AI, corresponding to the embodiment of the first virtual reality system described in FIG. 1A. In FIG. 2A, one or more AI modules described above may operate in a local AI 168A built into a VR device 104A, while other AI modules may operate in a remote AI 116A. The local and remote AI 168A, 116A may be in direct communication, or communicate via a network 112A.

The local and remote AI 168A, 116A may also, via the network 112A, access programs, servers, and/or databases stored in a cloud 204 and/or cloud-based servers, as well as other devices 208, which may in turn be connected to their respective databases 121.

Other devices may be any device a user can interact with, and may include but are not limited to vehicle devices (such as CarPlay devices), personal electronic devices (such as smartphones, tablets, personal computers, laptop devices, etc.), wearable devices (such as smartwatches, smart rings, glasses, hearing aids, headphones, earbuds, etc.), home devices (such as home speakers, security cameras, webcams, televisions, projection screen monitors, sound bars, etc.), or any other electronic devices.

The local and/or remote AI 168A, 116A may thus access resources from all connected programs, devices, servers, and/or databases.

For example, the VR application currently in use may be a virtual interior design application, where a user may use virtual images to decorate a virtual room. The user may ask, "does my couch fit this corner?" referring to a corner in the virtual room and a couch in the user's real house. The AI may retrieve an image of the couch from other user devices (such as a photo of the couch identified by the user and stored on the user's smartphone) and utilize that image to generate a virtual display of the couch for the user to then place into the virtual room. In addition, any image may be retrieved from the databases (internet) and shown in the virtual space, thus allowing an unlimited number of designs, shapes, sizes and colors to be retrieved and inserted in the viewed area.

One or more of the connected programs or devices may also function as additional external input devices. For example, the VR application currently in use may be an exercise application prompting the user to make certain exercise movements. The user may be wearing a smartwatch that may include a heart rate monitor. The AI may communicate with the smartwatch to monitor and analyze a real-time feed of the user's heart-rate and customize the exercise program based on the feed, such as greater or lesser intensity.

Figure 2B:
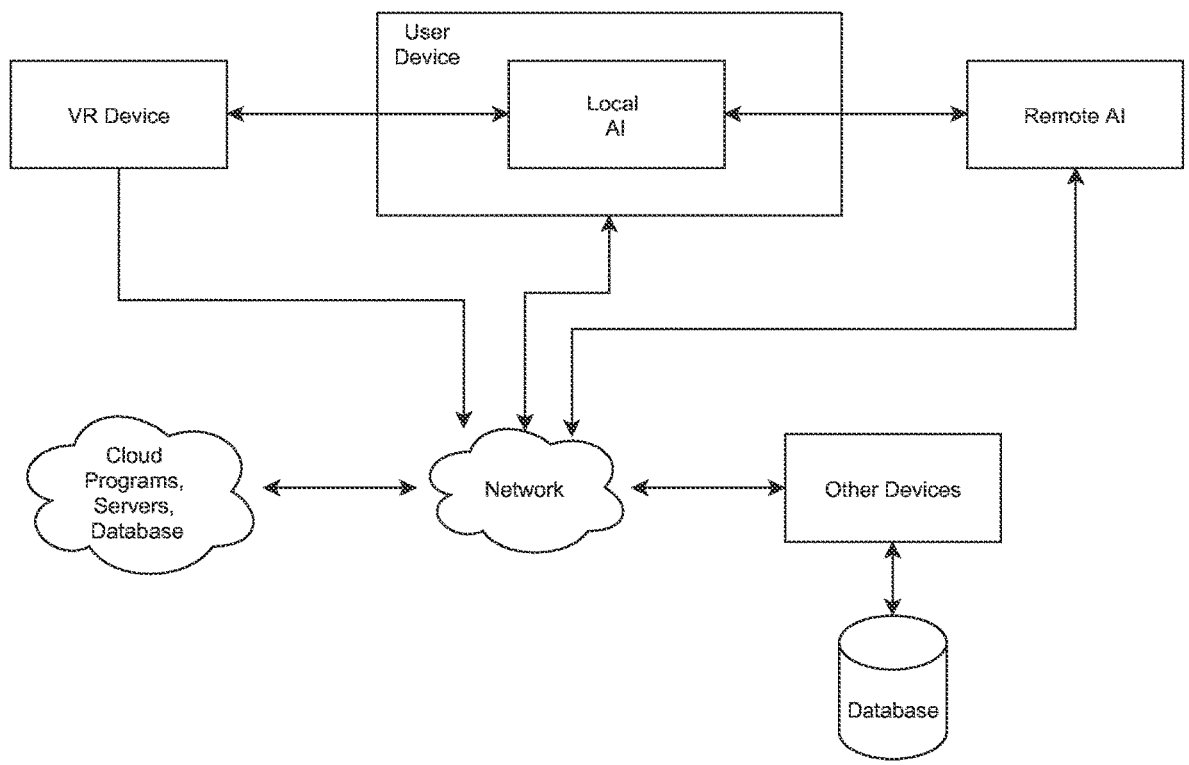
FIG. 2B illustrates a second exemplary environment of use of the AI described herein, corresponding to the embodiment of the second virtual reality system described in FIG. 1B.

FIG. 2B illustrates a second exemplary environment of use of the AI described herein, corresponding to the embodiment of the second virtual reality system described in FIG. 1B. In FIG. 2B, one or more AI modules described above may operate in a local AI 168A built into a user device 190, while other AI modules may operate in a remote AI 116B. The local and remote AI 168B, 116B may be in direct communication, or communicate via a network 112B.

The local and remote AI 168B, 116B may also, via the network 112B, access the VR device 104B, and other programs, servers, and/or databases stored in a cloud 204B and/or cloud-based servers, as well as other devices 208B, which may in turn be connected to their respective databases 121B.

Figure 3:
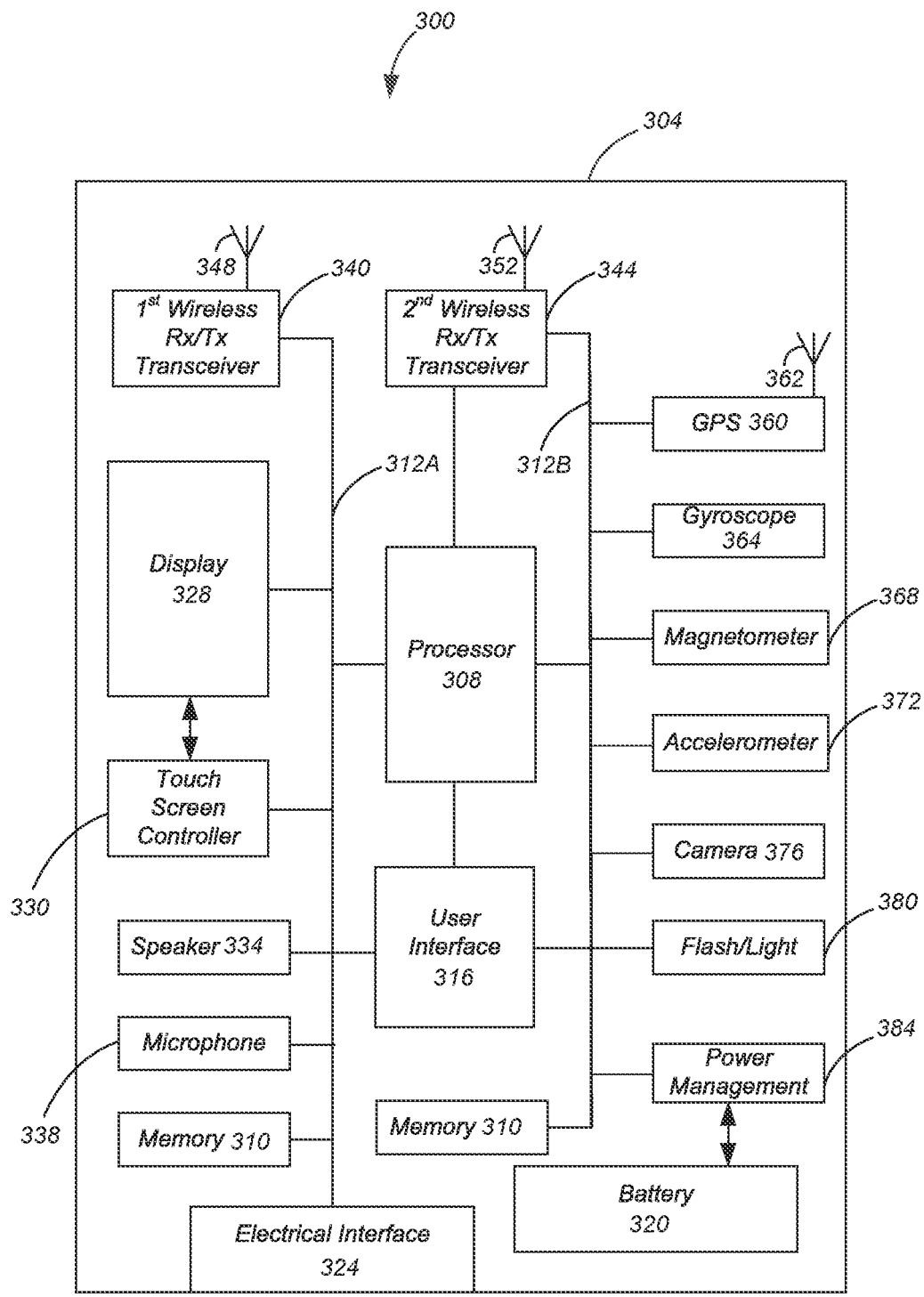
FIG. 3 illustrates an example embodiment of a mobile device on which a solution generator may operate, also referred to as a user device which may or may not be mobile.

FIG. 3 illustrates an example embodiment of a mobile device on which a solution generator may operate, also referred to as a user device which may or may not be mobile. This is but one possible mobile device configuration and as such, it is contemplated that one of ordinary skill in the art may differently configure the mobile device. The mobile device 300 may comprise any type of mobile communication device capable of performing as described below. The mobile device may comprise a Personal Digital Assistant ("PDA"), cellular telephone, smart phone, tablet PC, wireless electronic pad, an IoT device, a "wearable" electronic device or any other computing device.

In this example embodiment, the mobile device 300 is configured with an outer housing 304 designed to protect and contain the components described below. Within the housing 304 is a processor 308 and a first and second bus 312A, 312B (collectively 312). The processor 308 communicates over the buses 312 with the other components of the mobile device 300. The processor 308 may comprise any type processor or controller capable of performing as described herein. The processor 308 may comprise a general purpose processor, ASIC, ARM, DSP, controller, or any other type processing device. The processor 308 and other elements of the mobile device 300 receive power from a battery 320 or other power source. An electrical interface 324 provides one or more electrical ports to electrically interface with the mobile device, such as with a second electronic device, computer, a medical device, or a power supply/charging device. The interface 324 may comprise any type electrical interface or connector format.

One or more memories 310 are part of the mobile device 300 for storage of machine readable code for execution on the processor 308 and for storage of data, such as image, audio, user, location, accelerometer, or any other type of data. The memory 310 may comprise RAM, ROM, flash memory, optical memory, or micro-drive memory. The machine readable code (software modules and/or routines) as described herein is non-transitory.

As part of this embodiment, the processor 308 connects to a user interface 316. The user interface 316 may comprise any system or device configured to accept user input to control the mobile device. The user interface 316 may comprise one or more of the following: microphone, keyboard, roller ball, buttons, wheels, pointer key, touch pad, and touch screen. Also provide is a touch screen controller 330 which interfaces through the bus 312 and connects to a display 328.

The display comprises any type display screen configured to display visual information to the user. The screen may comprise a LED, LCD, thin film transistor screen, OEL CSTN (color super twisted nematic), TFT (thin film transistor), TFD (thin film diode), OLED (organic light-emitting diode), AMOLED display (active-matrix organic light-emitting diode), capacitive touch screen, resistive touch screen or any combination of such technologies. The display 328 receives signals from the processor 308, and these signals are translated by the display into text and images as is understood in the art. The display 328 may further comprise a display processor (not shown) or controller that interfaces with the processor 308. The touch screen controller 330 may comprise a module configured to receive signals from a touch screen which is overlaid on the display 328.

Also part of this exemplary mobile device is a speaker 334 and microphone 338. The speaker 334 and microphone 338 may be controlled by the processor 308. The microphone 338 is configured to receive and convert audio signals to electrical signals based on processor 308 control. Likewise, the processor 308 may activate the speaker 334 to generate audio signals. These devices operate as is understood in the art and as such, are not described in detail herein.

Also connected to one or more of the buses 312 is a first wireless transceiver 340 and a second wireless transceiver 344, each of which connect to respective antennas 348, 352. The first and second transceivers 340, 344 are configured to receive incoming signals from a remote transmitter and perform analog front-end processing on the signals to generate analog baseband signals. The incoming signal may be further processed by conversion to a digital format, such as by an analog to digital converter, for subsequent processing by the processor 308. Likewise, the first and second transceivers 340, 344 are configured to receive outgoing signals from the processor 308, or another component of the mobile device 308, and up convert these signals from baseband to RF frequency for transmission over the respective antenna 348, 352. Although shown with a first wireless transceiver 340 and a second wireless transceiver 344, it is contemplated that the mobile device 300 may have only one or two such systems, or more transceivers. For example, some devices are tri-band or quad-band capable, or have Bluetooth®, NFC, or other communication capability.

It is contemplated that the mobile device 300, hence the first wireless transceiver 340 and a second wireless transceiver 344, may be configured to operate according to any presently existing or future developed wireless standard including, but not limited to, Bluetooth, WI-FI such as IEEE 802.11 a,b,g,n, wireless LAN, WMAN, broadband fixed access, WiMAX, any cellular technology including CDMA, GSM, EDGE, 3G, 4G, 5G, TDMA, AMPS, FRS, GMRS, citizen band radio, VHF, AM, FM, and wireless USB.

Also part of the mobile device 300 is one or more systems connected to the second bus 312B which also interfaces with the processor 308. These devices include a global positioning system (GPS) module 360 with associated antenna 362. The GPS module 360 is capable of receiving and processing signals from satellites or other transponders to generate data regarding the location, direction of travel, and speed of the GPS module 360. GPS is generally understood in the art and hence not described in detail herein. A gyroscope 364 connects to the bus 312B to generate and provide orientation data regarding the orientation of the mobile device 300. A magnetometer 368 is provided to supply directional information to the mobile device 300. An accelerometer 372 connects to the bus 312B to provide information or data regarding shocks or forces experienced by the mobile device. In one configuration, the accelerometer 372 and gyroscope 364 generate and provide data to the processor 308 to indicate a movement path and orientation of the mobile device 300.

One or more cameras (still, video, or both) 376 are provided to capture image data for storage in the memory 310 and/or for possible transmission over a wireless or wired link, or for viewing at a later time. The one or more cameras 376 may be configured to detect an image using visible light and/or near-infrared light. The cameras 376 may also be configured to utilize image intensification, active illumination, or thermal vision to obtain images in dark environments. The processor 308 may process machine-readable code that is stored on the memory to perform the functions described herein.

A flasher and/or flashlight 380, such as an LED light, are provided and are processor controllable. The flasher or flashlight 380 may serve as a strobe or traditional flashlight. The flasher or flashlight 380 may also be configured to emit near-infrared light. A power management module 384 interfaces with or monitors the battery 320 to manage power consumption, control battery charging, and provide supply voltages to the various devices which may require different power requirements.

Figure 4:
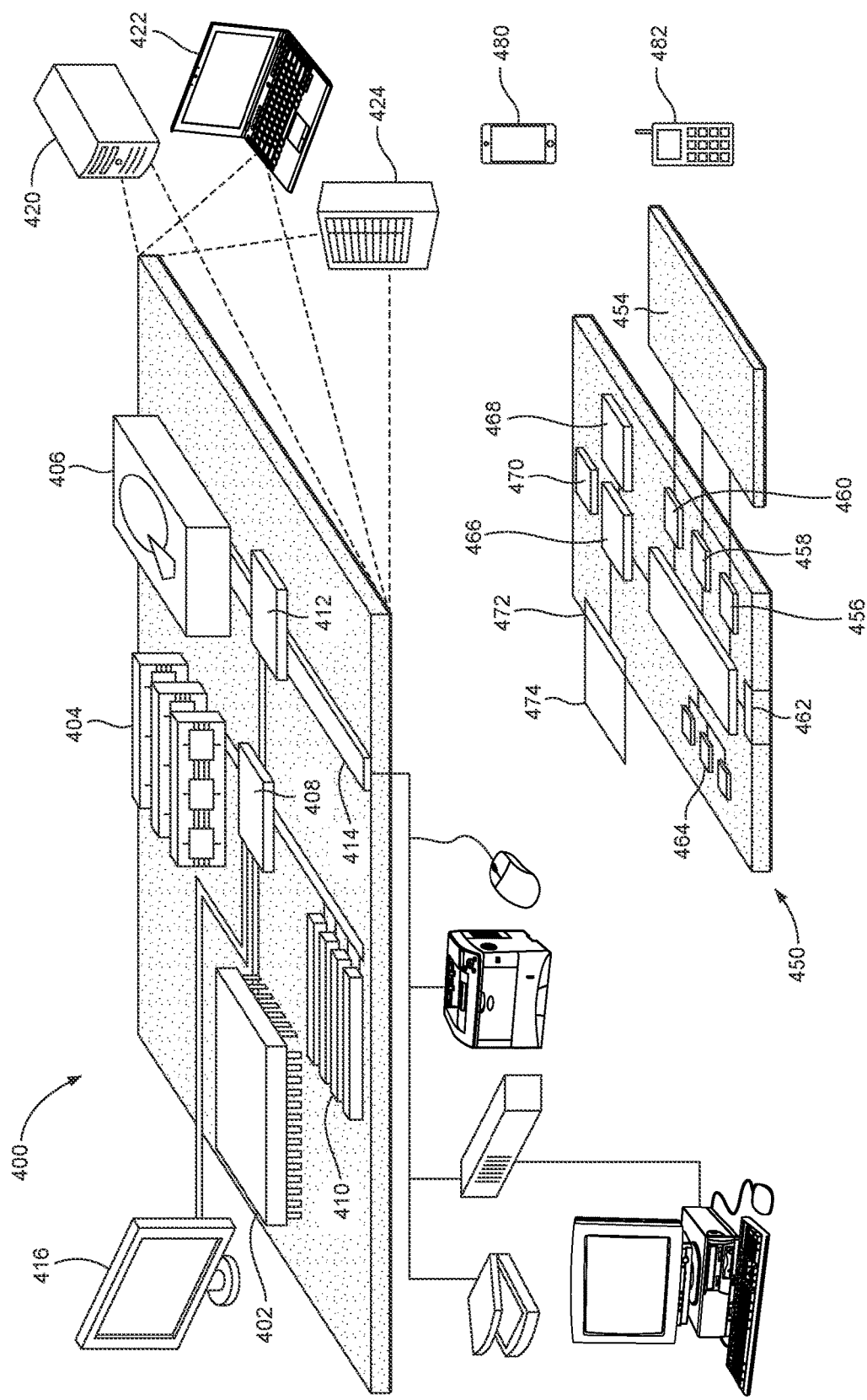
FIG. 4 is a schematic of a computing or mobile device, or server, such as one or more of the devices described above, according to one exemplary embodiment.

FIG. 4 is a schematic of a computing or mobile device, or server, such as one or more of the devices described above, according to one exemplary embodiment. A computing device 400 is intended to represent various forms of digital computers, such as smartphones, tablets, kiosks, laptops, desktops, workstations, personal digital assistants, servers, blade servers, mainframes, and other appropriate computers. Computing device 400 is intended to represent various forms of mobile devices, such as personal digital assistants, cellular telephones, smart phones, and other similar computing devices. The components shown, their connections and relationships, and their functions, are meant to be exemplary only, and are not meant to limit the implementations described and/or claimed in this document.

Computing device 400 includes a processor 402, memory 404, a storage device 406, a high-speed interface or controller 408 connecting to memory 404 and high-speed expansion ports 410, and a low-speed interface or controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406, to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of functions is exemplary only. In one implementation, the high-speed controller 408 is coupled to memory 404, display 416 (i.e., through a graphics processor or accelerator), and to high-speed expansion ports 410, which may accept various expansion cards (not shown). In this representative implementation, low-speed controller 412 is coupled to storage device 406 and low-speed bus 414. The low-speed bus 414, which may include various communication ports (e.g., USB, Bluetooth, Ethernet, wireless Ethernet) may be coupled to one or more input/output devices, such as a keyboard, a pointing device, a scanner, or a networking device such as a switch or router (i.e., through a network adapter).

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device(s), to provide additional storage. Each of the components 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor 452 may be implemented as a chipset of chips that include separate and multiple analog and digital processors. The processor may provide, for example, for coordination of the other components of the computing device 450, such as control of user interfaces, applications run by the computing device 450, and wireless communication by the computing device 450.

Processor 452 may communicate with a user through control interface 458 and display interface 456 coupled to a display 454. For example, the display 454 may be a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, to enable near area communication of computing device 450 with other devices. In some implementations external interface 462 may provide for wired communication, or in other implementations, for wireless communication, whilst multiple interfaces may also be used.

The memory 464 stores information within the computing device 450. The memory 464 can be implemented as one or more of a computer-readable medium or media, a volatile or a non-volatile memory unit or units. Expansion memory 474 may also be provided and connected to the computing device 450 through expansion interface 472, which may include, for example, a SIMM (Single In Line Memory Module) card interface. Such expansion memory 474 may provide extra storage space and/or may also store applications or other information for the computing device 450. Specifically, expansion memory 474 may include instructions to carry out or supplement the processes described above and may also include secure information. Thus, for example, expansion memory 474 may be provided as a security module for computing device 450 and may be programmed with instructions that permit secure use of the same. In addition, secure applications may be provided via the DIMM cards, along with additional information, such as placing identifying information on the DIMM card in a non-hackable manner.

The memory may include for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received for example, over transceiver 468 or external interface 462.

The computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur for example, through a radio-frequency transceiver 468. In addition, short-range communication may occur, such as using a Bluetooth, Wi-Fi, or other such transceiver (not shown). In addition, GPS (Global Positioning system) receiver module 470 may provide additional navigation- and location-related wireless data to the computing device 450, which may be used as appropriate by applications running on the computing device 450.

The computing device 450 may also communicate audibly using audio codec 460, which may receive spoken information from a user and convert it to usable digital information. Audio codec 460 may likewise generate audible sound for a user, such as through a speaker, e.g., in a handset of the computing device 450. Such sound may include audio from voice telephone calls, recorded audio (e.g., voice messages, music files, etc.), and may also further include audio generated by applications operating on the computing device 450.

The computing device 450 may be implemented in a number of different forms, as shown in the figure. For example, it may be implemented as a cellular telephone 460. It may also be implemented as part of a smartphone 482, personal digital assistant, a computer tablet, or other similar mobile device.

Thus, various implementations of the systems and techniques described here can be realized in digital electronic circuitry, integrated circuitry, especially designed ASICs (application specific integrated circuits), computer hardware, firmware, software, and/or combinations thereof. These various implementations can include applications in one or more computer programs that are executable and/or interpretable on a programmable system, including at least one programmable processor which may be special or of general purpose, coupled to receive data and instructions, to and from a storage system, at least one input device, and at least one output device.

These computer programs (also known as programs software, software applications or code) include machine instructions for a programmable processor and can be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., CRT (cathode ray tube) or LCD (liquid crystal display) monitor) for displaying information to the user, a keyboard, and a pointing device (e.g., mouse, joystick, trackball, or similar device) by which the user can provide input to the computer. Other kinds of devices can be used to provide for interaction with a user as well, for example; feedback provided to the user can be any form of sensory feedback (e.g., visual, auditory, or tactile); and input from the user can be received in any form, including acoustic, speech, or tactile input.

The systems and techniques described here may be implemented in a computing system (e.g., computing device 400 and/or 450) that includes a back end component (e.g., data server, slot accounting system, player tracking system, or similar), or that includes a middleware component (e.g., application server), or that includes a front-end component such as a client computer having a graphical user interface or a Web browser through which a user may interact with an implementation of the systems and techniques described herein, or any combination of such back-end, middleware, or front-end components. The components of the system may be interconnected by any form or medium of digital data communication, such as a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be appreciated that the virtual reality system, in conjunction with the disclosed AI, may be used to implement many possible VR applications. A location application may allow a user to visit remote destinations. Conventional virtual systems may only be capable of displaying the destination at select locations, or from fixed views. In contrast, the AI may allow a VR device to render additional areas and angles in real-time, as the user explores the location. For example, a user may provide the address of a destination in the world. The location application may, through the AI, access Google street-view images and other images and/or videos to render a virtual environment that looks identical to the actual selected destination. The AI may additionally access a weather service to render the virtual environment using the destination current weather. The AI may additionally access news databases to render well-known activities currently occurring at the selected destination (such as an annual music festival).

In contrast to conventional virtual environments, which are pre-built based on data available at the time of development, the AI permits the virtual reality system to generate the virtual destination in real-time, and may reflect recent architectural and landscape changes, weather conditions, social activities, etc.

The user may begin at a specific location, such as on a street in front of a café. The user may look into the distance and see a tall building and may interact with the AI to ask about the name of the building, its height, and its important history. Conventional virtual systems may only be capable of presenting limited information on the destination, but the AI may allow the user to have a multi-turn conversation about the building or expand on the topic. For example, the user may ask an uncommon question such as "tell me a scary story that happened in this building." The AI may query archived history to locate a story about a horrific murder. The user may then say, "that sounds like a preventable tragedy. Where was the police?Tell me about the police force in this town." The AI may in turn query police databases to present the user with statistics on personnel and reported crime.

The user may look to the side and notice a café. The user may walk into the café, the AI may query restaurant or advertisement databases to retrieve interior images of the café (such as, for example, uploaded images of the café on Yelp.com), and render a virtual space of the café. The AI may additionally retrieve the café's menu and render virtual images of offered food and drinks. The user may additionally inquire about specialty food of the destination or ask about the various ingredients of the displayed food. The AI may even render a waiter with whom the user may have a multi-turn conversation in a selected language.

A time-travel application may render virtual destinations of a selected date or date range, using archived images of the destinations. For example, a user may wish to visit the coliseum during an ancient roman gladiator fight. Conventional virtual systems may only be capable of presenting a fixed view of the coliseum. In contrast, the AI may allow the virtual reality system to place the user in middle of the fighting pit, where he may view a fight up close using a combination of retrieved images, recordings of movie scenes, and CGI-generated displays, which the AI may retrieve or generate using additional databases and AI services.

A classroom application may render a virtual classroom, where a select topic may be taught. A virtual teacher may present the user with content generated using both local data (such as built-in textbook materials), and auxiliary metadata from third party databases. For example, in a chemistry class, the first portion of the class may be an audio and visual presentation of textbook material, while a second portion of the class may be a virtual laboratory table with various equipment, allowing a user to perform a virtual chemistry experiment. In a political science class, auxiliary metadata such as current news events may be retrieved to generate additional teaching materials and to engage the user in a multi-turn discussion with a virtual teacher.

The content may be further customized to a user's interest, which may be retrieved from various databases storing the user's personal history and preferences. For example, the AI may detect most of the user's browsing history in the past 2 hours is on stocks. In the next economics class, the AI may then present class content centered around stocks.

The content may also be customized to a user's condition. For example, the AI may, through the various input devices, detect the user's gaze is not focused, and determine the user is bored with the current content of a textbook presentation in the chemistry class. The AI may, in response, switch to the laboratory portion of the chemistry class.

A training application may render a virtual training environment, where a select skill may be practiced. For example, a law student may be placed in a virtual hearing before the United States Supreme Court using archived recording on real oral arguments. The law student may be questioned by a virtual avatar of a Supreme Court Justice. The questions may begin to deviate from archived recordings based on the student's own responses. Further, where a student becomes unfamiliar with a cited caselaw, the student may interact with the AI to retrieve the necessary information. The student may even, through the AI, perform on-the-spot legal research in response to a question by a virtual Justice.

A sales application may render a virtual product for viewing. For example, a user may be placed in a virtual tour of a house he wishes to purchase. The user may walk through the space of the house and inquiry the AI about various items in view. The user may ask the AI whether the house suffered water damage, and the AI may query databases on local repair companies for past repair orders on the house, or insurance databases for claims related to water damage. The user may ask the AI to compare prices, or research potential rental income for the house. The user may further ask the AI to retrieve images of his current furniture and render scaled virtual furniture, which the user may place in various virtual rooms of the house to see what the house may look like if the user were to move in.

It will also be appreciated that the AI may also be used to integrate with augmented reality. For example, a user may physically be in a museum wearing smart glasses integrated with the AI. The user may, upon viewing a vase, engage in a multi-turn conversation with the AI, as described in a previous example. The user may further request the AI to display similar vases created by the same artist but not currently on display in the museum. The AI may query art databases to locate such images, and then render the images on the smart glasses.

As another example, a user may be standing at the top of the Eiffel Tower in Paris on a rainy day and request the AI display his view on a clear and starry night. The AI may, through third party databases, retrieve various images or videos fitting the user's criteria, and generate an augmented view on the user's smart glasses displaying the user's current view in a different environment.

As a third example, a user may be in an actual chemistry lab, and may have performed an experiment incorrectly and produced a vial of blue liquid. The user may ask the AI to show him what the liquid is supposed to look like in a correct experiment, and the AI may render the image of a vial of red liquid on the user's smart glasses, superimposed on the vial of blue liquid. The user may further ask the AI what he did wrong, and the AI may retrieve the recording of his experiment from the smart glasses and analyze the footage relative to information on the experiment from various databases to identify inconsistencies, to which the AI may then output to the user via built-in speakers on the smart glasses.

Figure 5:
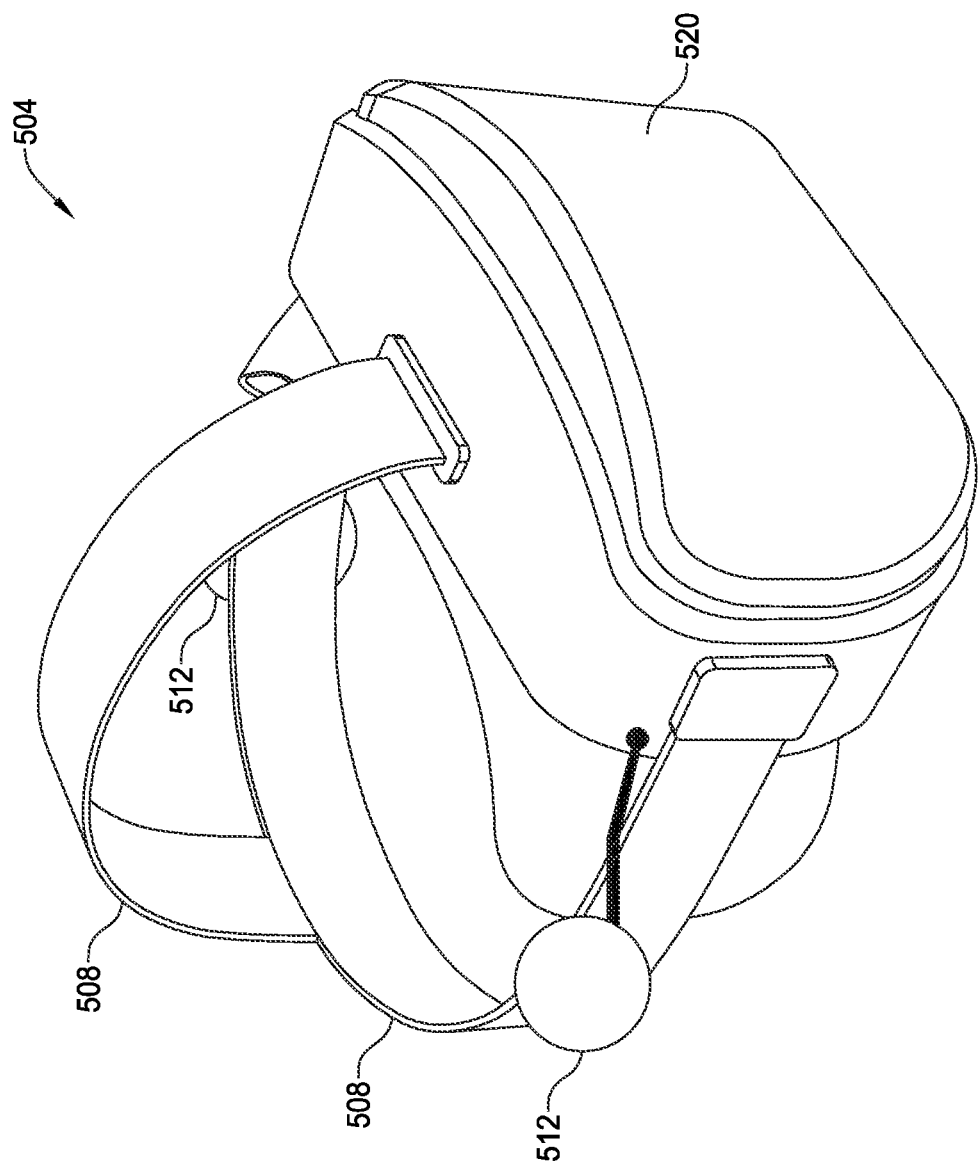
FIG. 5 illustrates an example embodiment of a virtual reality headset.

FIG. 5 illustrates an example embodiment of a virtual reality headset. This is but one possible exemplary headset 504 shown for purpose of understanding. One of ordinary skill in the art understands the innovation described herein may be used with numerous other apparatus to enable a user to enter a virtual environment, such as but not limited to those described in the patents and patent application incorporated herein by reference. In this embodiment, a headset 520 is provided with a user facing screen to present the virtual environment to the user. As discussed above in connection with FIGS. 1A and 1B, numerous other elements are associated with the headset such as but not limited to sensors, detectors, and other elements configured to enable to methods discussed herein. The sensors and detectors provide outputs which are processed and interpreted by the software (machine executable instructions) executing on a processor that is associated with the headset, associated hardware, and AI systems as described herein.

Also part of the headset 504 is a supporting strap 508 which may assume any configuration suitable for securing the headset to the user's head. One or more speakers 512 and microphones (not shown in this embodiment) may be provided to further enhance the virtual reality experience. It is contemplated that one or more user facing or user based sensor may be associated with the headset 504 (or other user device), such as but not limited to the interior user facing area of the headset. These sensors may detect aspects of the user such as but not limited to light of sight or sight path into the virtual environment, eye movement detectors, temperature sensors, perspiration sensors, motion sensors, heartrate, or any other user biometric.

Figure 6:
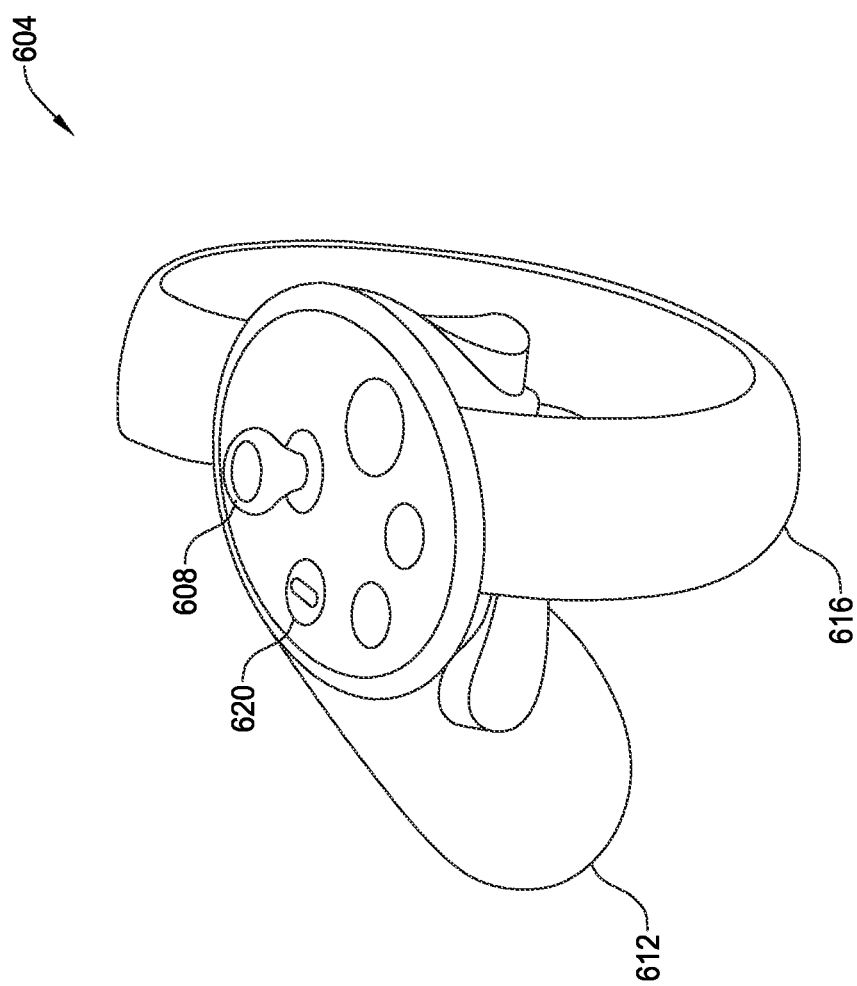
FIG. 6 illustrates an exemplary handheld controller for use in a virtual environment.

FIG. 6 illustrates an exemplary handheld controller for use in a virtual environment. Numerous difference configuration are possible for the handheld controller 604 based on the user's preferences and different offering from different manufactures. The user can use the handheld controller 604 to navigate the virtual environment us as by pointing and selecting options. In this example embodiment, the handheld controller 604 includes a handle portion 612 and a protective outer ring 616 to secure and protect the user's hand. The user interacts with the handheld controller 604 with one or more buttons 620 and/or joystick type interface 608. The handheld controller 604 may also be configured to a microphone, speaker, and any biometric sensor or environmental sensor as discussed herein.

Figure 7:
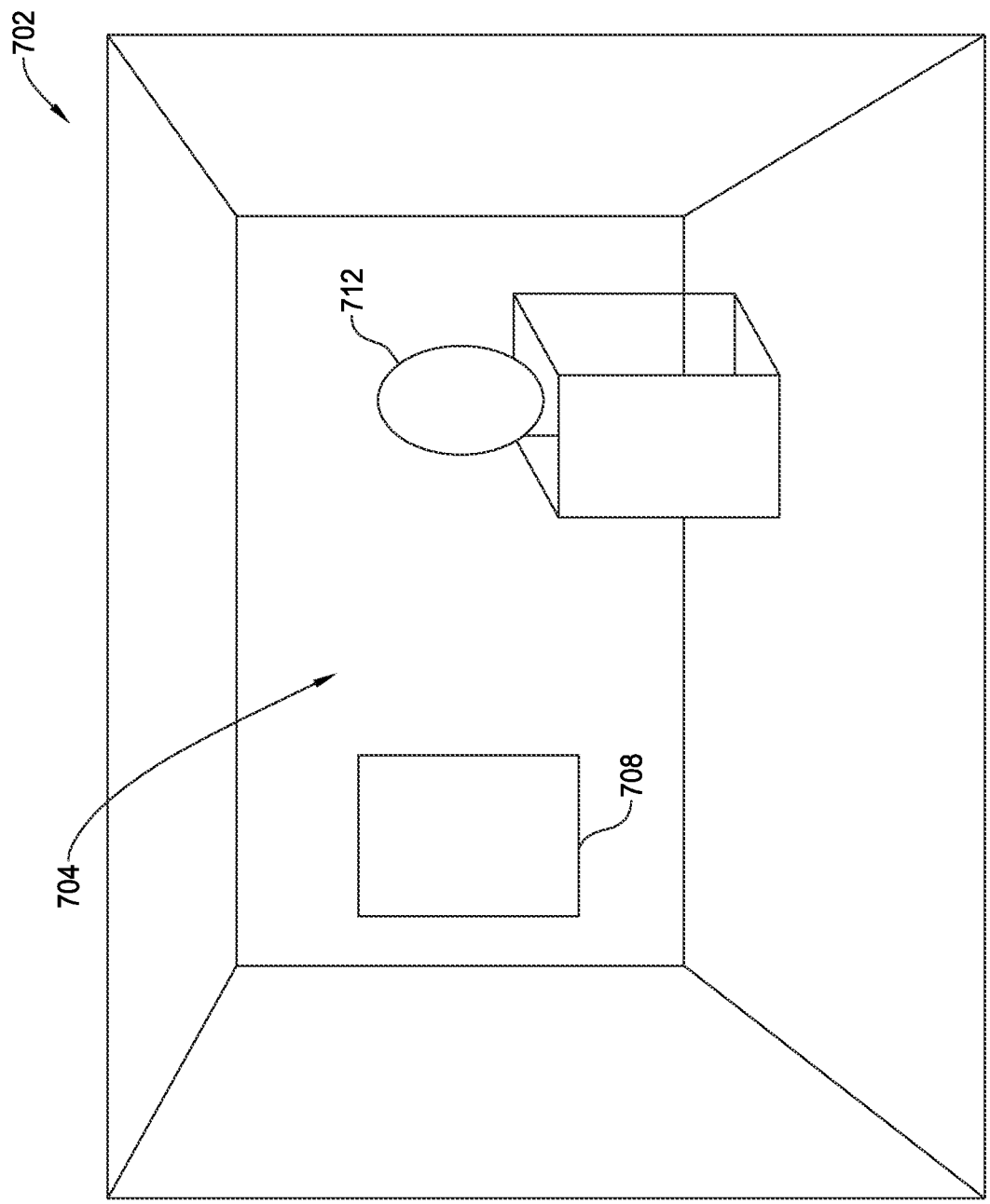
FIG. 7 illustrates an example embodiment of a basic virtual environment (room) that a user may enter.

FIG. 7 illustrates an example embodiment of a basic virtual environment (room) that a user may enter. This environment is a generalized representation as there are an almost unlimited number of different virtual environments and those in actual practice would be more involve and detailed. The virtual environment may be bounded, such as room 704 or an environment, such as outside, or in space. Within the environment 702 may be one or more objects such as viewable objects 708 or interactive objects 712. Each of these categories could be any type of elements such that viewable object 708 may be objects that the user primarily looks at while interactive objects 712 are items or elements that the user interacts with. Any type of items or object could be represented by the objects 708, 712 as discussed herein.

Figure 8A:
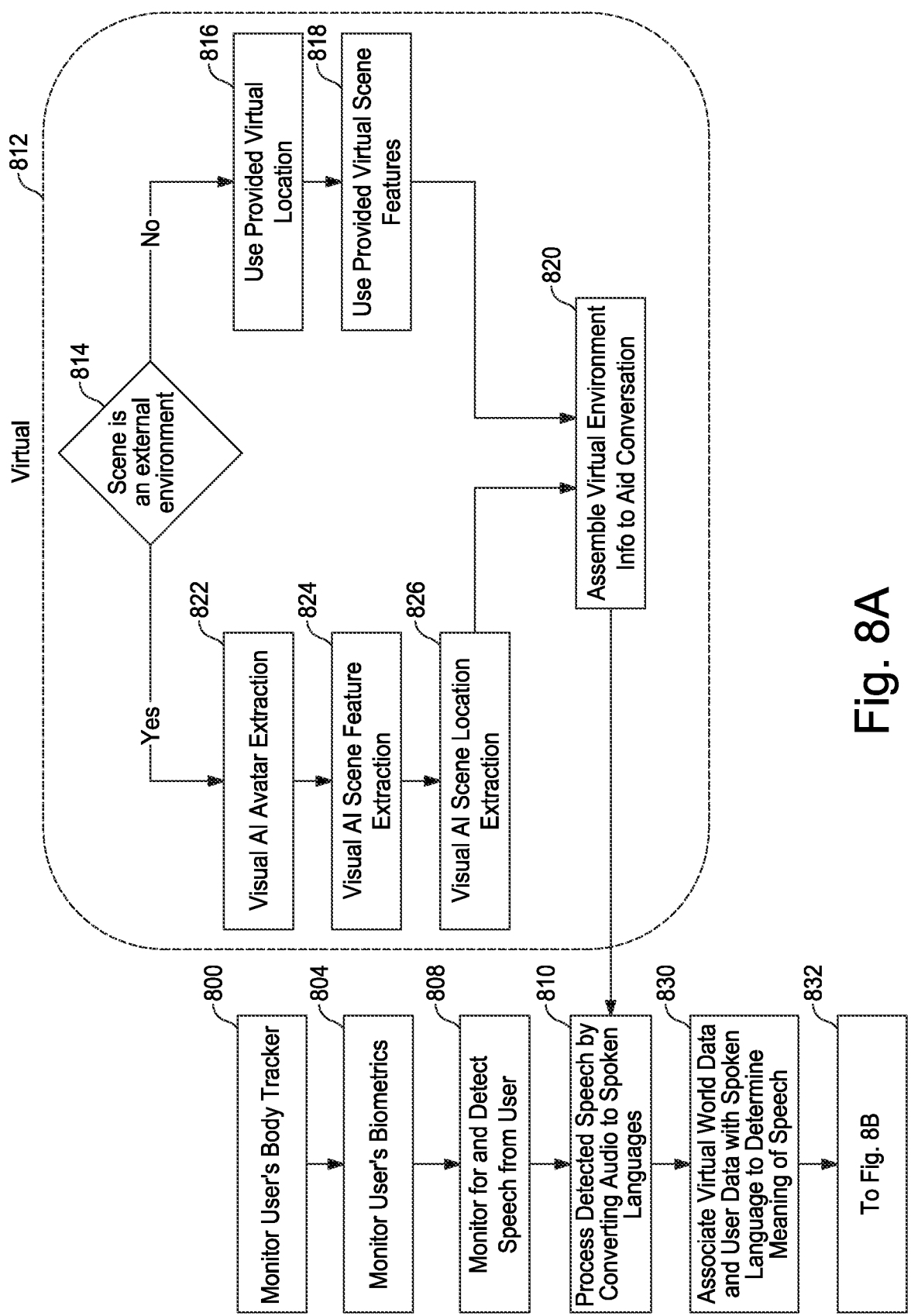
FIG. 8A and FIG. 8B illustrates an exemplary flow diagram of an example method of data collection and speech processing for use by an AI speech interpretation system.
Figure 8B:
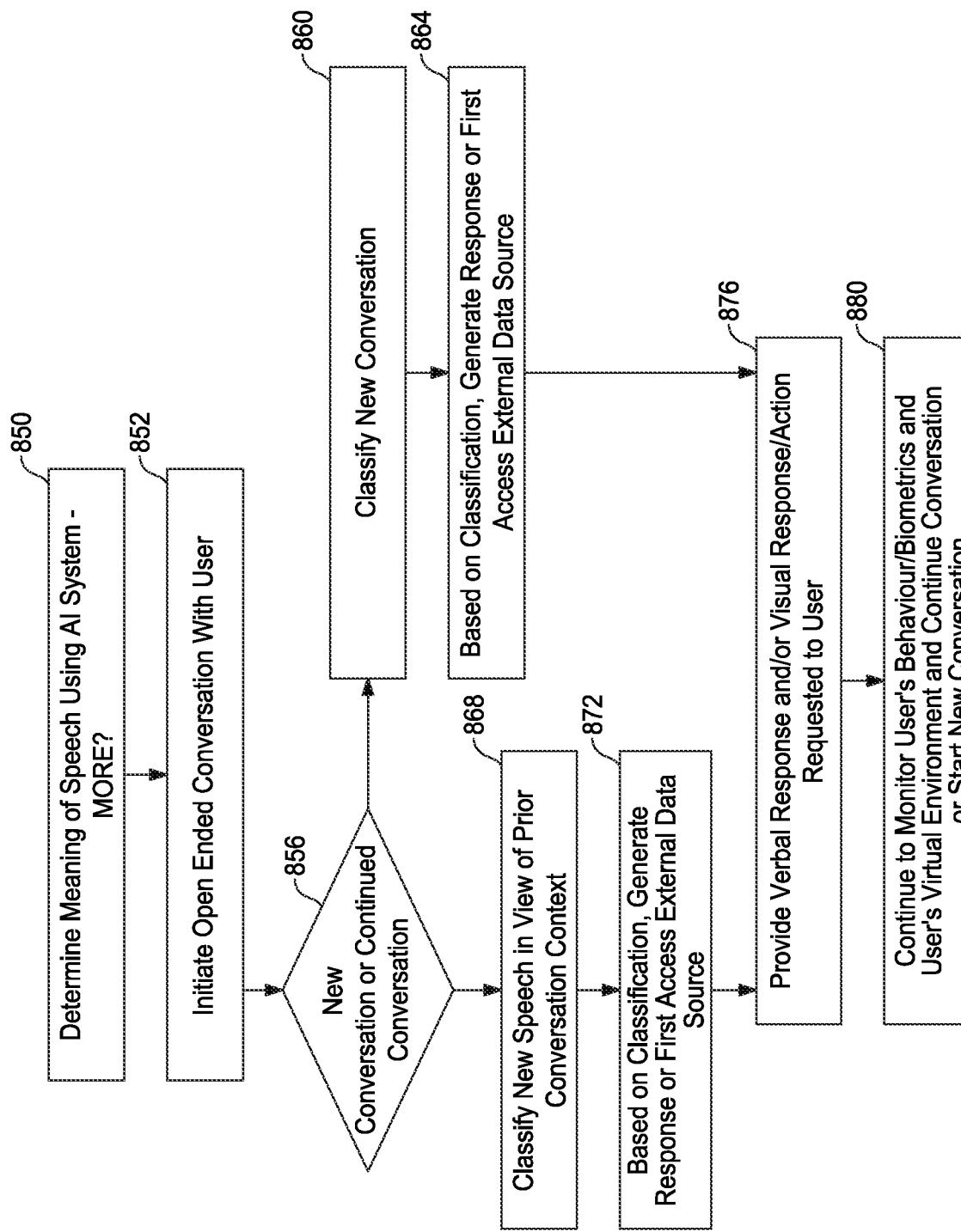

FIG. 8A and FIG. 8B illustrate an exemplary flow diagram of an example method of data collection and speech processing for use by an AI speech interpretation system. This is but one possible exemplary method of operation and other methods which include the various benefits and features described herein are possible. At a step 800, the system monitors the user's body tracker. A body tracker refers to the virtual world systems that monitor the user behavior in the virtual world. These systems may include hand and/or arm position sensors, head position or direction sensors, sight sensors, or any other type of tracker or monitor that provides data regarding the user's body. At a step 804, the system monitors the user's biometrics. Additional possible details regarding steps 800, 804, 808 are discussed in greater detail in connection with FIG. 9.

At a step 808, the system is also monitoring for and detecting speech from the user. As discussed herein, it is contemplated that during a virtual reality or augmented reality, the user may talk or speech in the real world and this is detected as speech in the virtual world AI system, or to other people or elements in the virtual world. Having the user speak in the virtual environment improves the user's experience as compared to simply interacting with button clicks. However, for the user to realize the benefits of speaking or conversing in the virtual environment, their speech must be understood by the AI system.

Upon detecting speech from the user, at a step 810, the system processes the detected speech by converting it into spoken language. This process is discussed below in greater detail.

Also occurring is an analysis of the user's virtual environment. Referring to step 814, AI systems, such as the system that will be processing the user's speech for understanding, determines if the scene in the virtual environment is an external environment. An external environment is an environment external to the AI system or is not part of the system of the present invention, such as a third party's virtual world. In contrast, a non-external environment is a virtual environment that the AI system by now has data regarding the elements of the environment to aid in the interpretation of speech. For example, in an external environment, the user may look at an item and the AI system does not know that the item is, while in a non-external environment, the AI system has data defining what each element is and its location.

If at decision step 814 the scene is not an external environment, then the operation advances to step 816. At step 816, the AI system uses the provided or selected virtual location (environment) that the user is in when using environmental data to interpret the user's speech. For example, this may be a known outdoor virtual environment or a known indoor virtual environment or scene. This location may be selected by the user from locations stored or associated with the system. Similarly, at a step 818, the system uses the provided virtual scene features. The features may be any type element in the scene, such as artwork in a museum, elements in a jungle environment, people at a virtual gathering with famous people represented by virtual icons. The operation then advances to step 820, at which time the system assembles the virtual environment information to aid in conversation with the user.

Alternatively, if at step 814 the scene is an external environment, then the operation advances to step 822. At step 822 the visual AI avatar is extracted. In one embodiment, this comprises of a deep convolutional neural network that performs segmentation on external avatar bodies placed throughout the scene, it then converts those segmentations into corresponding metadata to represent other people (or other elements) within the scene. The metadata can store distance of avatars from the user as well as body orientation i.e., if the other avatars are facing the user. Similar data can be associated with and/or obtained from other elements based on metadata for other elements in the scene. At a step 824 system extracts the visual AI scene features. In one embodiment, this comprises of a deep convolutional neural network that performs segmentation on features of the scene such as weather, brightness, colors on objects placed within the scene, the objects themselves, etc. The features of the scene are turned into metadata, i.e., an object with an uncommon spoken name can be placed near the user. Although the words may have a low confidence score of prediction, the score can increase due to the additional features metadata. Then, at step 826, the system extracts the visual AI scene location. In one embodiment, this comprises of a system that uses a deep convolutional neural network that uses the surrounding scene to map to a known place i.e., mapping New York Times Square to the actual coordinates of times square.

Thereafter, the operation advances to step 820, which was discussed above. After step 820, the operation advances to step 810 as shown, and this data is used to convert the audio to spoken language. By having information about the virtual environment and the user's actions in the virtual environment, the AI system can more accurately convert the user's speech to spoken language and understood for processing.

At a step 830, the system associates the virtual environment data and the user data with the spoken language. At a step 832, the operation advances to FIG. 8B.

Turn to FIG. 8B, at a step 850, using the associated virtual environment data and the user data gained from the virtual environment, the system determines the meaning of the speech. This is done by the AI system and speech interpretation as discussed below in detail. Providing the additional data regarding the user's actions in the virtual environment, and the virtual environment itself, improves speech comprehension accuracy.

Next, at a step 852, the AI system initiates an open-ended conversation with the user. Establishing a conversation with an intelligent AI system improves the user experience by refining understanding which allows accurate responses. The operation next advances to decision step 856 where the system determines if this is a new conversation or a continued conversation. If at decision step 856 the system determines the user's speech input relates to a prior conversation, then the operation advances to step 868 and it classifies or interprets the new speech in view of the prior conversation context. This further aids in classifying and interpreting the speech of the user such that if the user, in the prior conversation was discussing airplanes, then there is a higher likelihood that the user's next statement may relate to airplanes, flights or travel, than if a new conversation was initiated. The operation next advances to step 872, based on the classification, the system generates a response or, prior to generating a response, accesses an external data source to obtain additional information used to formulate the response. The operation then advances to step 876 such that the system provides a verbal response and/or visual response/action as requested by the user's speech, to the user.

Alternatively, if at step 856 the conversation is a new conversation, then the operation advances to step 860. At step 860, the system classifies the new conversation. The step of classification comprises parsing the conversation turn, using a natural language understanding (NLU) model to predict the probability that the conversation is a completely new context. Then, at a step 864, based on the classification, the system generates a response or, if additional data is needed, the system may first access an external data source. Thereafter, the operation advances to step 876, which was discussed above. At a step 880, the operation continues to monitor the user's behavior and/or biometrics as well as the user's virtual environment to maintain the conversation.

Figure 9:
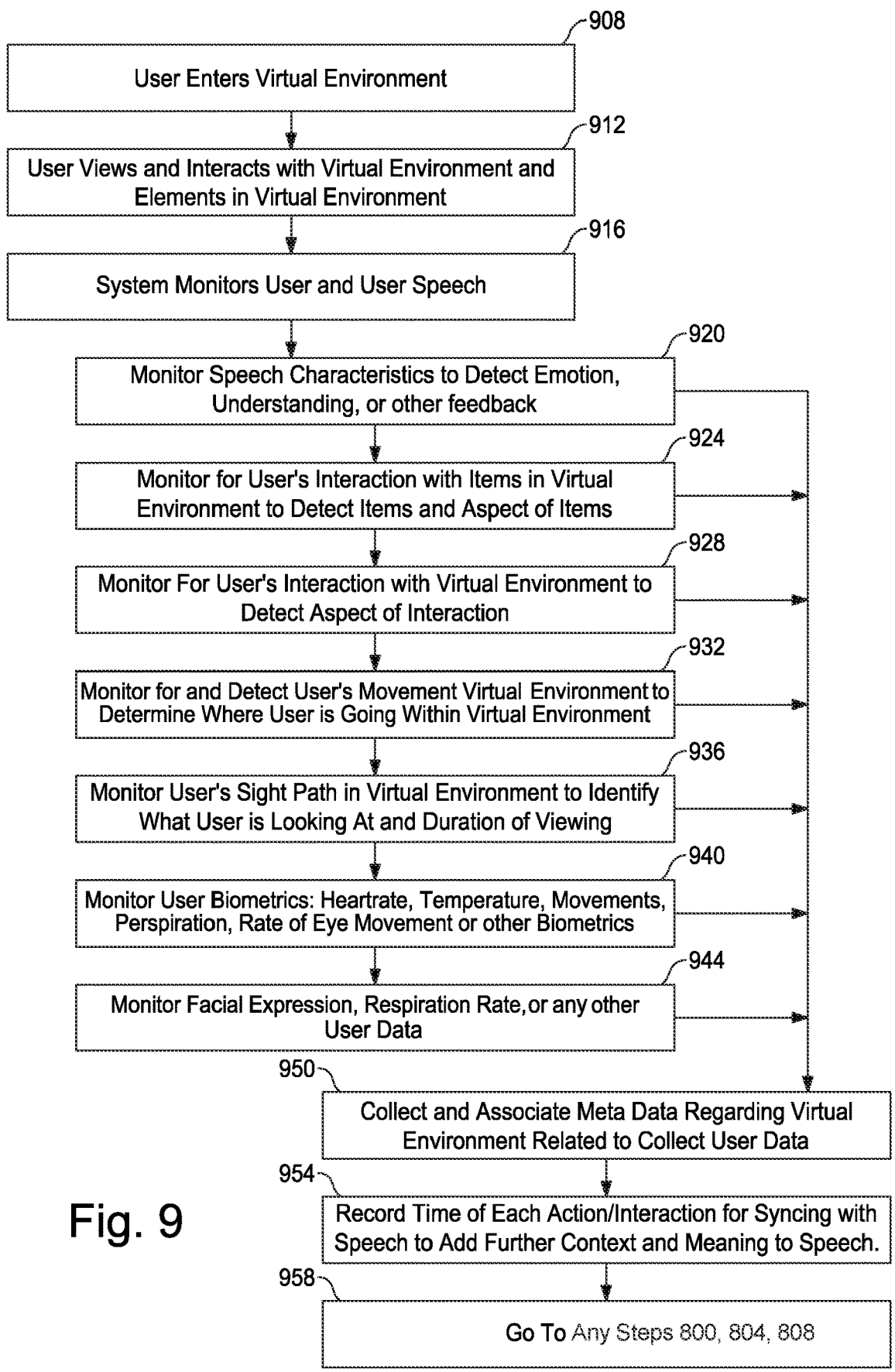
FIG. 9 illustrates a flow chart of an example embodiment of supplemental data collection.

FIG. 9 illustrates a flow chart of an example embodiment of supplemental data collection. This is but one possible method of operation and optional steps for obtaining additional information for use with the AI system and method, such as that shown in FIGS. 8A & 8B. This allows the virtual reality system and other sensors, to obtain additional information to aid the AI system to aid the virtual environment to better interact with the user. This improves the user experience and provides benefit not possible in the prior art.

At a step 908, the user enters the virtual environment, such as by engaging the headset and activating software to display the virtual environment on the screen of the headset. At a step 912, the user views and interacts with the virtual environment and the various elements of the virtual environment. This may be for enjoyment, training, education, vacation experience, gaming, business, home or business arrangements, meetings, exploration or any other known or future develop use or activity. At a step 916, the AI system monitors the user and the speech of the user. This may occur using the numerous sensor and microphone as discussed herein.

At a step 902, the AI system monitors for speech characteristics of the user to detect emotion, understanding or confusion. The voice of the user may be analyzed to detect information about the user beyond the meaning of the text. For example, if a voice is shaky or trebly, the user may be experiencing an emotion or not understanding the input from the AI system. In addition, certain voice characteristics may indicate that the user is frustrated with the AI system, and the AI system may use this information to change it approach or phrasing to improve understanding or the user experience.

At a step 924, the system monitors for interactions those items in the virtual environment to detect items and the aspects of the items that the user is interacting with. By detecting which items or aspect of the virtual environment the user is interacting or viewing, the AI system can use this information to better formulate a response. For example, if the user is viewing the engine compartment of a virtual car, then the AI system can tailor its understanding of the user's speech based questions to something related to the engine of the car, and not the trunk area or the interior. Similarly, if the user is looking at the virtual engine of a virtual car, the AI system can offer unsolicited information about the engine, thereby providing a better user experience than having an AI system recite from a script without any relation to what the user is actually doing in the virtual environment. In another example, if the user is in front of a particular painting in a virtual museum, then the AI system can interpret questions or requests from the user as being highly likely to be related to that particular painting. This improves the speech analysis. Similarly, the AI system can provide unsolicited information about that particular painting. At a step 928 the system monitors for user various other aspects of interaction.

At a step 932, the system monitors for and detects a user's movement within the virtual environment to determine or estimate where the user is going in the virtual environment. This aids the AI system in understanding requests or questions by the user. For example, if the user is outside, and walking toward a particular monument, and the user is asking questions, such as what is that object, then the AI system is more likely to understand what the user is referencing because of where they are walking, flying, floating, or other form of virtual movement. In this example, like other examples herein, the AI system receives this information to better interpret user speech, meaning, and thought to better formulate a response or the user environment. For example, if the user always heads to the area with loud music, then the AI system can tailor the virtual environment to suit the user and better understand the speech of user, who is likely asking about places with music. Likewise, fast movement means the user may be excited or interested in something or afraid of something. The AI system can take this additional data into the processing path with processing of speech and/or improving the virtual environment.

At a step 936, the system monitors the user sight path in the virtual environment to identify what the user is looking at and the duration of viewing. By knowing what the user is looking at with their eyes, the AI system is better able to tailor their speech interpretation. For example, if the user is looking at a training seminar of airplane flight controls and looking at the elevator flight control and the user uses the term elevator, the AI system is more likely to know they are saying the term 'elevator' and not 'aileron' which might otherwise sound similar. There are numerous other examples where knowing what a user is looking at will aid the AI system in accurately interpreting the user's speech. Similarly, if the user maintains their line of sight at a particular element, that is an indicator that the user is interested in, thinking about, and/or referencing a particular element in their speech. Similarly, if a user is looking is looking at a particular mountain or tree in an outdoor virtual environment, and the user asks, as would be typical in human speech, "what is the name of that mountain" or "what is the name of that tree", the AI system can better interpret the speech by assuming the user is referencing the items they are looking at in the virtual environment.

At a step 940 the system monitors biometrics of the user to better understand the user's speech and/or better determine how to respond to make a more accurate response, initiate communication, or improve the user experience. For example, these biometrics, which include heart rate, temperature, movements, perspiration, rate of eye movement or other biometrics can be used to determine user emotion, user interest/boredom and speech interpretation. For example, if a user's heart is beating very fast, the probability that the user is scared or excited is increased. This increase in heart rate can help the prediction model factor in the pace at which the user is speaking among other information and aid in understanding based on the change in speech pattern as well as the likelihood that the user is speaking about that which made them have the fast heart rate.

At a step 944 the system monitors biometrics or other aspects of the user to better understand the user's speech and/or better determine how to respond to make a more accurate response, initiate communication, or improve the user experience. The headset or other elements of VR system may include a user facing camera or sensor to monitor facial expression, or heart rate. This may include external camera, biomonitoring watches, body monitors, or other apparatus can provide input into the AI system.

After each of the above steps, the operation advances to step 950. At step 950, the AI system, the VR system, or a combination of both collects meta data and/or other data associated with virtual environment to provide information regarding the data collected. For example, if the user is looking at a painting, then the AI system would benefit from knowing what the painting is and what elements are in the painting, such as a person, an outdoor scene, or an item. By providing meta data associated with the painting or other item the AI system knows the painting and the elements in the painting or other items. For example, if the user is looking at a particular car, the AI system benefits by knowing the make, model, and year of car, as well as the car's options to best understand the user and provide a response. It would be challenging for the AI system to know all those details about the car just by looking at the car, but with the meta data or other information of the virtual item, the AI system can best understand and generate a response. The virtual environment typically knows this information regarding items in the virtual environment which is how the VR system generates a graphical representation or operational representation of the item. The VR system can share this data directly with the AI system.

Thereafter, at a step 954 the system records the time of each user action/interaction for syncing with the user's speech or other data to add time synced context and develop further meaning. For example, it is meaningful to synchronize the user's speech with what the user was looking at when the user was speaking. This applies to other aspects of the user, such as changes in heart rate, changes in interest level, user's movement and other user data/biometrics to synchronize this data to the virtual environment. This is further used when determining and interpreting speech and/or an AI response.

At a step 958, this information is returned to any of the steps 800, 804, or 808 of FIG. 8 or the grouping of steps in block 812 so that the AI system can use this additional data to interpret user speech and generate an optimal response.

The following relates to a method for providing a digital concierge assistant that is capable of operating across multiple domains for an arbitrary number of turns in a conversation. Specifically, the invention related to a novel technique to allow for an arbitrary number of domain specific agents to operate in parallel with the ability for them to work together to accomplish goals. Further, this method provides the means with which contextual language can be understood from the state of the conversation across all agents. This method further allows for agents to be split across devices both in a local setting and with cloud server related connectivity.

Figure 10:
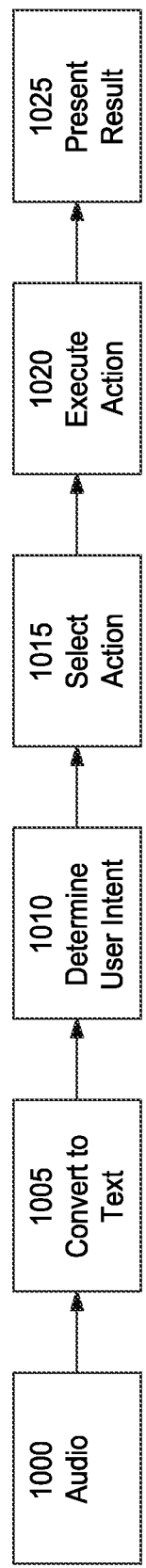
FIG. 10 illustrates a prior art virtual assistant operation and its limitations due to operating on a linear and isolated task-based approach.

FIG. 10 illustrates a prior art virtual assistant operation and its limitations due to operating on a linear and isolated task-based approach. A user input, commonly in the form of voice commands, initiates the process of operation. The voice input is recorded as audio 1000, then converted to textual representation 1005. The textual representation is delivered to the cloud assisted service to determine the user intent 1010. Based on the determined user intent, an action is selected 1015 and executed 1020. Finally, the result of the executed action is presented to the user 1025.

This type of process has several limitations. First, the process of FIG. 10 only considers one interpretation of the user's intent for execution. If this initial interpretation of the voice input from the user is incorrectly interpreted, such as due to poor pronunciation by the user, microphone positioning, background noise, or any other factor the interpretation may be incorrect, which will yield a sub-optimal result provided to the user. In addition, there may be multiple valid competing interpretations, but because of the single path nature of the prior art, only one interpretation is pursued. As a result, there is no room for additional context or different interpretations of the user's input.

Second, each task only considers the top textual representation. For example, only the top textual representation is selected 105 and passed on to the next task, where only the top user intent 1010 is determined, and passed on to the next task. Then, only the top action 1015 is selected, and so on. Thus, there is no room for collaboration between tasks. Third, this process does not allow for back-tracing, and each task cannot be stored
- as an independent piece of the user's history. Thus, the process does not perform exclusionary commands such as "but not" functions well (as these commands require back-tracing) and does not leave room for multi-turn user interaction. For example, if the first audio 1000 comprises a command to perform an internet search, and upon delivery of the results 1025 the user wishes to modify the search using a second audio command, the user would have to manually incorporate the previous result 1025 in their second audio command 1000. A further drawback of the prior art arises because each task illustrated in FIG. 10 does not allow for collaboration between the tasks.

Figure 11:
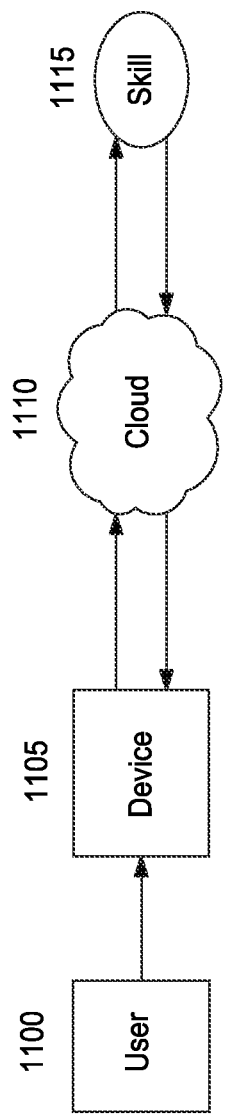
FIG. 11 illustrates an example environment of use of the virtual assistance described herein.

FIG. 11 illustrates an example environment of use of the virtual assistance described herein. The user 1100 interacts with the device 1105 via user input. User input prompts the device 1105 to send a message to a cloud-based server 1110, which then selects a skill 1115 to fulfill the request. Skills are defined herein as a software module or routine executable to perform a task or generate a result, such as PlayMovie, PlayMusic, FindRecipe in response to a single user query. Other examples of skills may be software module or routine focused on a particular area, such as but not limited to wine information, recipe information, or cooking information. Skill selection refers to how a computerized virtual assistant selects what skill to be used given the input text. As illustrated in FIG. 11, the selected skill 1115 then returns a message or response to the cloud 1110, which in turn then passes the message back to the device 1105. The device 1105 can optionally inform the user 1100 of some result of the skill 1115.

The invention provides for a method of overcoming the shortcomings of the prior art, by providing for an unlimited number of turns between the user and the virtual assistant to be handled by the virtual assistant. In addition, there is the option for an unlimited number of domains. The example environment of operation is in a user device configured as the user interface for the virtual assistant. The user provides audio or text input into the device, for processing by the virtual assistant, to initiate the process. The user device may comprise any computing device including but not limited to a mobile computing device such as a smartphone, smartwatch, tablet, laptop, desktop computer, kiosk, or a network connected unit configured with a microphone, speaker, and optional display. Other devices may include a network connected television, appliance, vehicle, or any other device capable of or configured to function as described herein.

Figure 12:
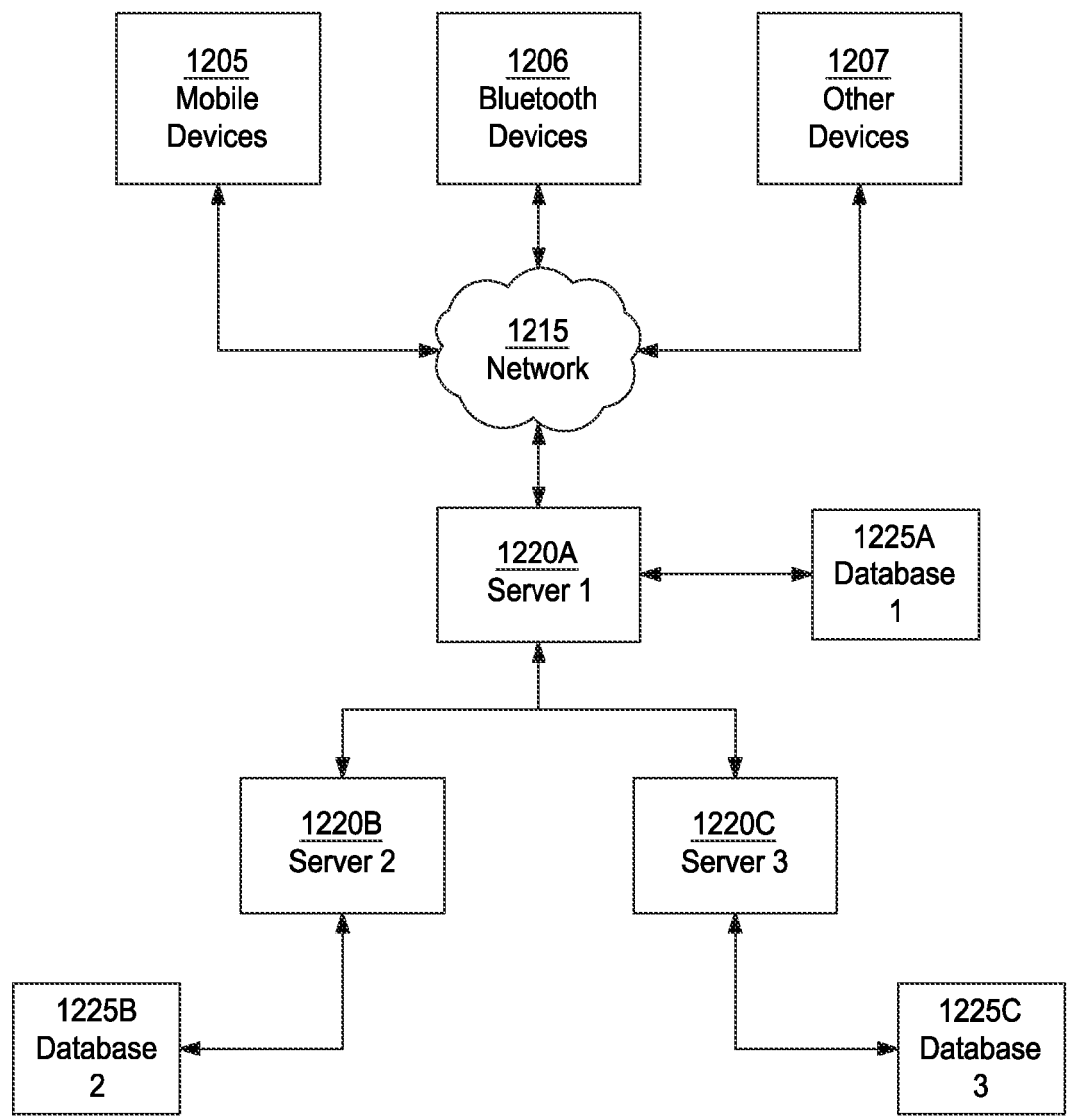
FIG. 12 illustrates an example environment of use of the virtual assistant system described herein.

FIG. 12 illustrates an example environment of use of the virtual assistant system described herein. This is but one possible environment of use and system. It is contemplated that, after reading the specification provided below in connection with the figures, one of ordinary skill in the art may arrive at different environments of use and configurations.

In this environment, user devices 1205, 1206, 1207 are used to access the virtual assistant (including a user's account) are connected to remote servers 1220A, 1220B, 1220C via a network 1215. The user devices 1205, 1206, 1207 may include (1) mobile devices 1205 capable of capturing a voice, image, or other types of input, such as smartphones, smart watches, tablets; (2) Bluetooth devices 1206 that the user may connect to remotely, such as speakers and consoles, and (3) any other devices 1207 such as remote-controllable vehicle players, temperature controller, light switches, etc.

These user devices 1205, 1206, 1207 are configured to connect to one or more networks 1215, which in turn connect to one or more remote servers 1220A, 1220B, 1220C. Such communication may occur over a local area network ("LAN"), a wide area network ("WAN"), a personal area network ("PAN"), the Internet, an ethernet, a Wi-Fi connection, or any other wired or wireless connections. The network 1215 may comprise a single network or multiple networks in communication with each other. The network 1215 connects to one or more servers 1220A, 1220B, 1220C. The servers 1220 may include any type of computing device capable of communicating with the user devices 1205, 1206, 1207. The user devices 1205, 1206, 1207 and servers 1220 are configured with a processor and memory, and further configured to execute machine-readable code or machine instructions stored in the memory.

The servers 1220 may also communicate with each other directly, or indirectly via one or more network or one or more servers. In the example illustrated in FIG. 12, the network 1215 is directly connected to one server 1220A. Server 1220A is connected to its server database 1225A and other servers 1220B, 1220C. These other servers 1220B, 1220C are also connected to their server databases 1225B, 1225C, respectively. Thus, all user devices 1205, 1206, 1207 may communicate with all servers 1220 and their respective databases 1225.

The databases 1225 can be stored on mobile device, secondary local device, or remote location as shown and may contain data such as a user account to identify the user to allow access to associated user data as well as information to be provided to the user. The data may be, for example, information relating to a user account to allow access to separate account information in another server. Other data may also be included such as GPS data, device identification information, databased, user training data, preferences, and the like.

In the embodiment illustrated in FIG. 12, the server 1220A processes requests from the user devices 1205, 1206, 1207. A second server 1220B with an associated second database 1225B, and third server 1220C with an associated third database 1225C may be provided to contain additional information that is not available on server 1220A and database 1225A. For example, one of the additional servers 1220B or 1220C may only be accessed based on the request from the user. The configuration of FIG. 12 is but one possible embodiment and it is contemplated that other embodiments are possible.

Figure 13:
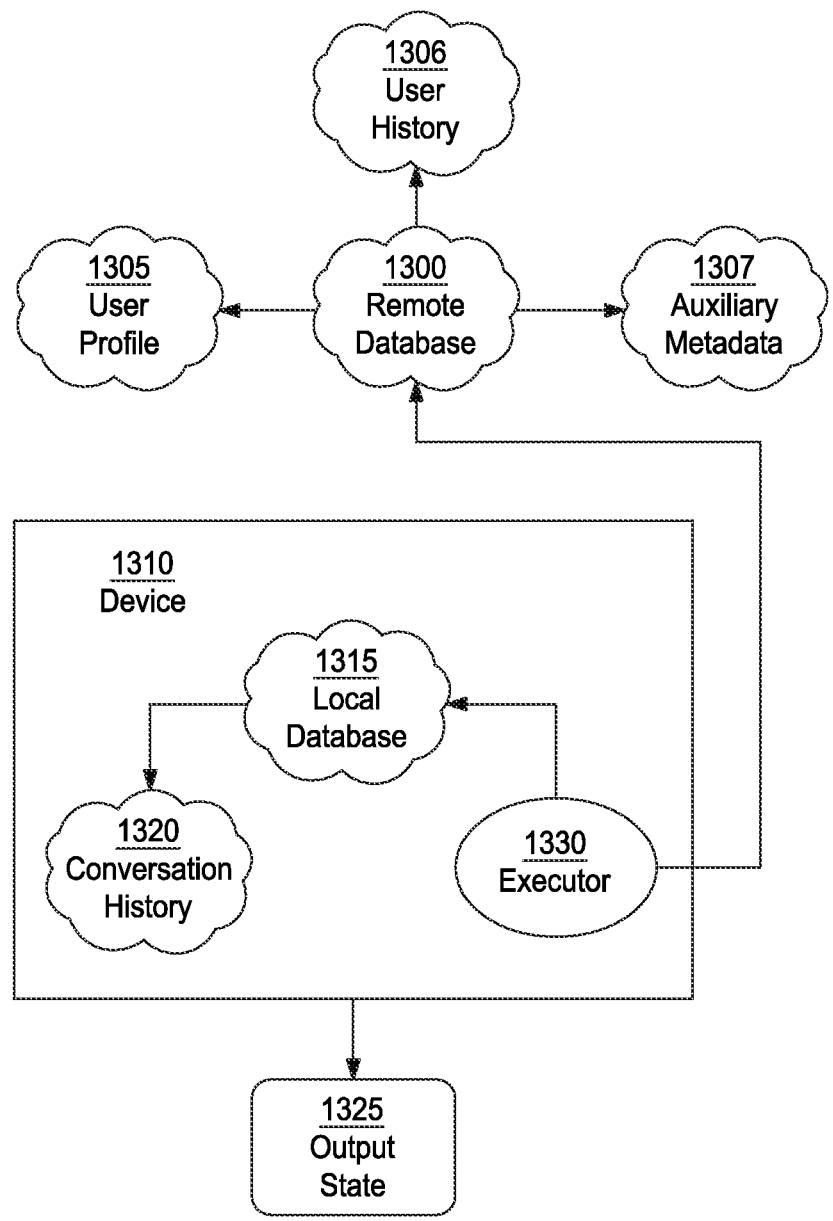
FIG. 13 illustrates an example embodiment of a user device and associated elements that enable the virtual assistant.

FIG. 13 illustrates and example embodiment of a user device and associated elements that enable the virtual assistant. The user device 1310, as described above, includes an executor 1330 comprising a software, hardware, or a combination of both configured to oversee and guide operation of the virtual assistant. In this embodiment, the executor 1330 is located in the user device 1310 but in other embodiments, the executor 1330 may be located in a secondary user device or in a cloud computing environment (cloud) or remote server. In this embodiment, the executor 1330 is stored inside the user device 1310, along with a local database 1315 and a memory or database storing a conversation history 1320. The executor 1330 receives and processes the user input as described herein. After receiving a request and performing processing, the executor 1330 can either be configured to time out after a certain amount of time has elapsed after a request, or utilize a different heuristic based upon the running set of result states to determine that hypothetical reasoning should cease. Upon time out or determination that hypothetical reasoning should cease, the executor 1330 collects all possible states and presents the results to the user. A scoring module may be is stored in a remote database.

Also shown in FIG. 13 is a remote database 1300 that is in communication with the executor 1330. The user request may also be sent to the remote database 1300 for additional processing. The remote database 1300 is also in communication with user provided data 1305, user history data 1306, and auxiliary meta data 1307. The user provided data 1305 comprises any information the user may have provided in registering a user account, such as name, date of birth, user-selected areas of interest, user-selected primary use for the device, user location, user metrics (such as heart rate, on devices that measure such metrics), etc. The user history data 1306 comprises conversation history, recorded base states (discussed below), actions (discussed below), results (discussed below), etc. The auxiliary metadata 1307 comprises non-user information generated by third parties, such as recent news, weather, etc. These additional data sources are used to score the results. For example, if the user profile indicates they are interested in 'race cars' and their user history indicate that auto racing is a primary topic on the weekends, then results associated with motorsports may be ranked higher than interpretations of the user request that indicate the question was about 'face scars'. The scoring module considers not only all confidences of actions taken as part of generating a state as part of the conversation history 1320, but also the user provided data 1305, the user history data 1306, and any auxiliary metadata 1307 to rank and/or discard the results and provide the results to the user as an output state 1325.

In one embodiment, the improved virtual assistant may utilize a plurality of scorers. Such plurality of scorers may comprise or utilize scorers provided by third parties or based on auxiliary metadata provided by third parties. In one embodiment, the plurality of scorers may collaborate with each other to customize scoring based on user preferences and auxiliary metadata selected or accessed.

Figure 14A:
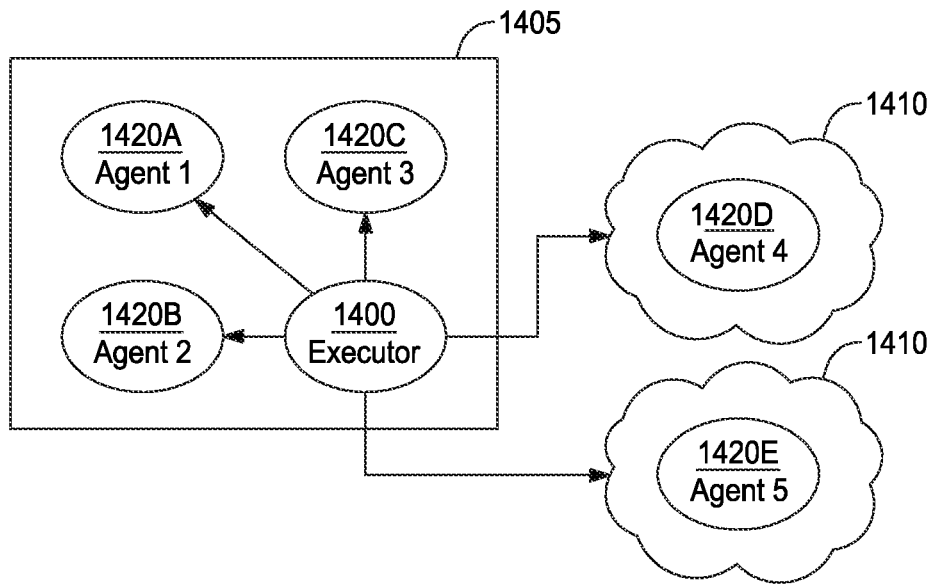
FIG. 14A and FIG. 14B illustrate two embodiments of the invention showing different locations of an executor module.
Figure 14B:
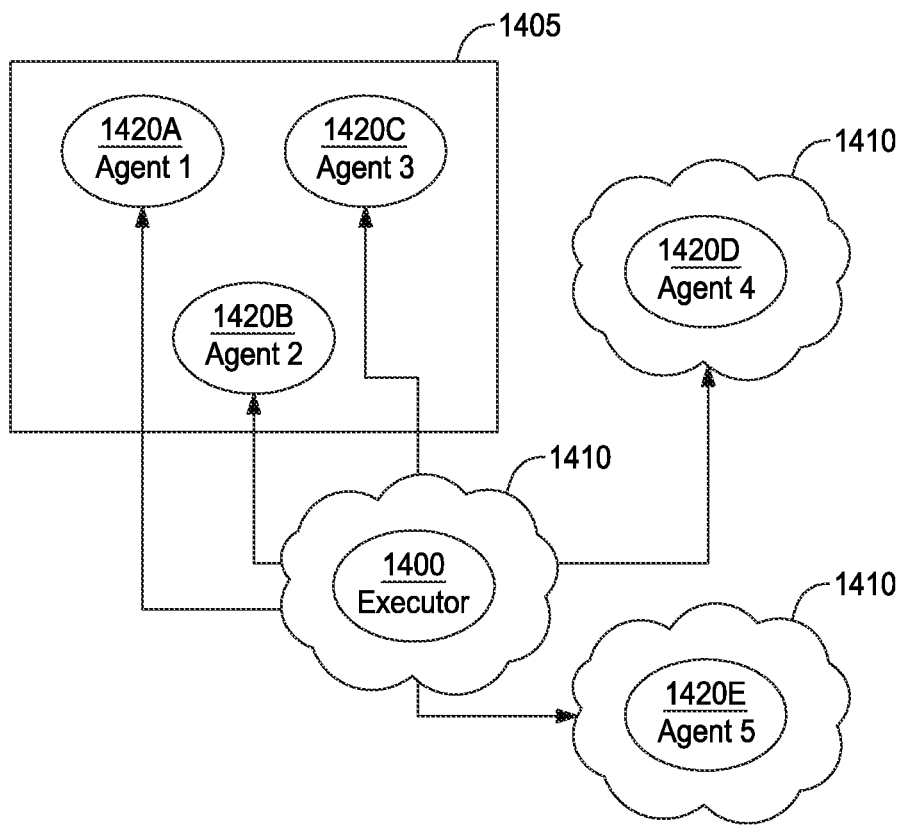

FIGS. 14A and 14B illustrate two embodiments of the invention showing different locations of an executor module. Both figures are discussed together due to the overlap in some elements. The executor 1400 is comprised of a base node (software executing on hardware). FIG. 14A illustrates an embodiment where the base node of the executor 1400 is mounted (located and operating) locally on the user device 1405 that the user directly interacts with or which is local to the user, such as a smartphone which interfaces with a smartwatch or personal assistant device. FIG. 14B illustrates an embodiment where the base node of the executor 1400 is mounted on a remote device 1410. The remote device 1410 can be either a device in the same network as the user device 1405, a device in a separate datacenter, a remote cloud-based server, or a combination thereof.

The executor 1400 can access any number of agents 1420. The agents 1420 are comprised of software executing on hardware. The executor 1400 uses one or more agents 1420 to carry out parallel hypothetical reasoning. The agents 1420 can be amounted on the user device 1405 (such as agents 1420A, 1420B, 1420C) or on one or more remote devices 1410 (such as agents 1420D, 1420E). As illustrated by FIGS. 14A and 14B, the location of the executor 1400, the user device 1405, the one or more remote devices 1410, and the agents 1420 are flexible. The user device 1405 can access the executor 1400 no matter where the executor 1400 is mounted relative to the user device 1405. Similarly, the executor 1400 can access one or more agents 1420 no matter where the agents 1420 are mounted relative to the executor 1400.

The method and apparatus disclosed herein also presents an improvement on skill selection and execution. As discussed above, conventional virtual assistants process a user request by performing tasks in a single path linear fashion. Each task may be carried out by a separate request from the device to the cloud to select, then execute, a skill. The selected skill for one task is not related to the selected skill for another task. In contrast, the method and apparatus disclosed herein allows selected skills to cooperate with each other by classifying user requests into specific vertical topics called domains, and by combining one or more skills into skill modules.

Figure 15:
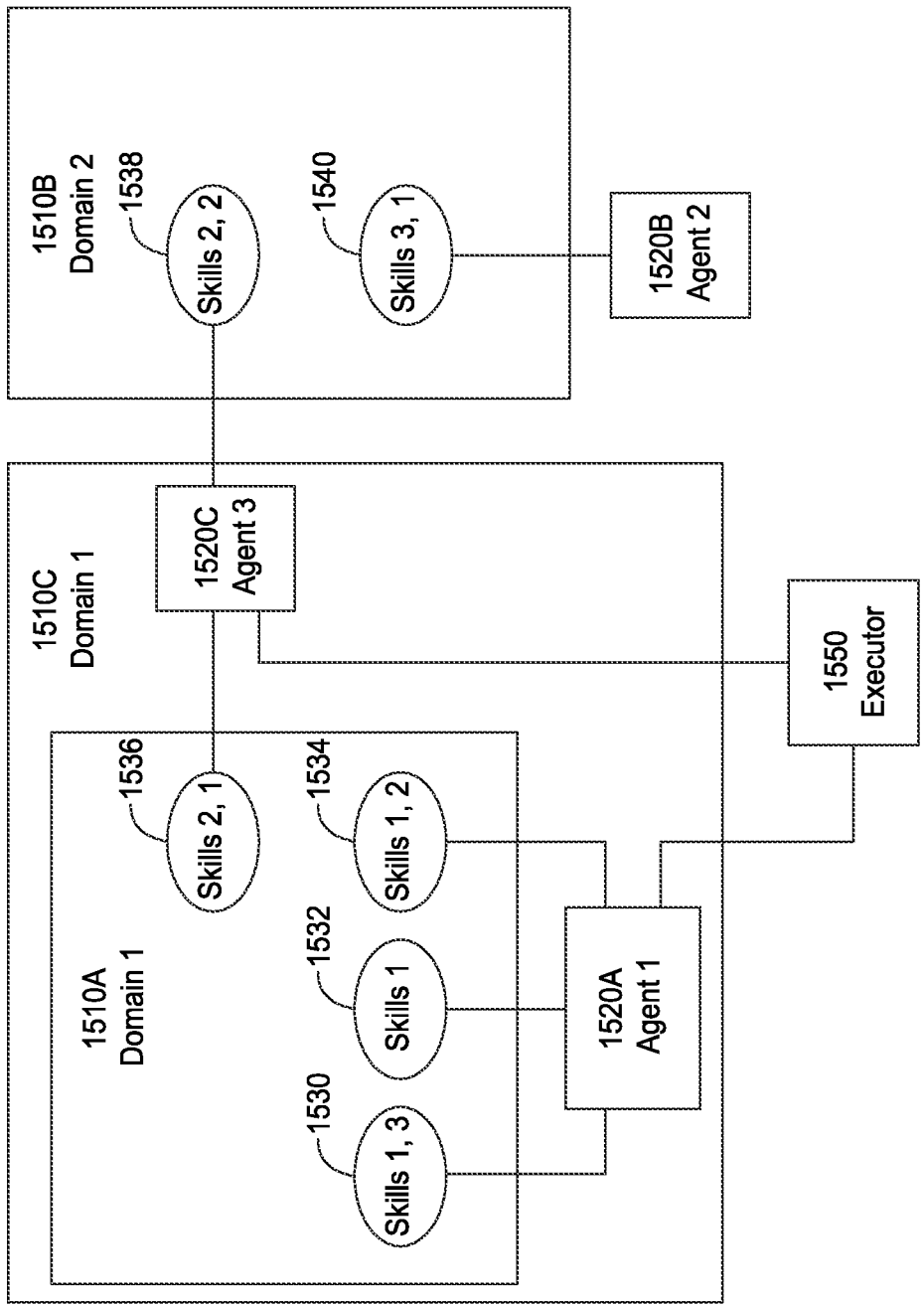
FIG. 15 illustrates a block diagram showing an interrelationship between the executor, agents, and skills, allowing for improved skill cooperation across domains.

FIG. 15 illustrates a block diagram showing an interrelationship between the executor, agents, and skills, allowing for improved skill cooperation across domains. FIG. 15 illustrates one possible layout or communication pathway of software modules. The number and arrangement of domains, agents, skill modules, and skills vary over time based on the user's preference, the user's profile, and current and past user interaction. In this example embodiment, an executor 1550 is configured as the primary control module and is configured to communicate with one or more other software modules. As shown, the executor 1550 is configured to communicate directly with three agents 1520, each agent supporting its own domain 1510. Each agent 1520, in turn, communicates with skill modules 1530-1540 within their respective domains 1510. As discussed in more detail below, each skill module 1530-1540 comprises one or more skills related to a domain 1510.

Within domain 3 1510C is domain 1 1510A, agent 1 1520A, and agent 3 1520C. Domain 1 1510A includes numerous skill modules, such as skill modules 1530, 1532, 1534, 1536. These skill modules 1530, 1532, 1534, 1536 are accessible by the agent 1520A to carry out the request from the user. As shown, skill module 1536 within domain 1 1510A is configured to also communicate with agent 3 1520C to carry out the request, such as if during processing skill module 1536 determines that it must seek data from agent 3 1520C.

The system of FIG. 15 is also configured such that agent 3 1520C, which is part of domain 3 1510C may communicate with domain 2 1510B. Within domain 1510B are skill module 1538 and skill module 1540. Thus, the agent 3 1520C in domain 3 1510C may access and communicate with skill module 1538 to perform request processing.

Different user requests will result in different agents being activated, and in turn, different skill modules being called to obtain the information or action requested by the user. As discussed above, multiple paths may be developed simultaneously to respond to a user's request. Applying this principle to FIG. 15, the executor 1550 may receive a request from a user in the form of a voice command, and the executor 1550 then enable agents 1520 on possible interpretations of the user's request. In turn, each agent 1520 enables skill modules 1530-1540 to further obtain, develop, and provide optional responses for the user. A scoring module evaluates which response to provide to the user, such that input from each agent may be a different response. A path that looks promising initially may, after developed with one skill module, be an undesirable response. A path that initially appeared to be sub-optimal may, after development with another skill module, yield the best scored path. During and after the response being provided to the user, each branch (agent path and sub-paths) is maintained, thus allowing the user to modify or clarify the request, thus allowing rapid and dynamic shift to a different branch (agent path), or for a path to be further developed.

Each domain may encompass smaller domains. In FIG. 15, domain 1 1510A is inside domain 3 1510C. For example, an entertainment domain may encompass smaller domains such as a movie domain, a television domain, and a music domain. On the other hand, domain 2 1510B is separate from domain 1 1510A and domain 3 1510C.

As shown and during operation, each domain may utilize one or more agents to process requests associated with that domain. Agents are software modules or routine that may rely on multiple skill modules to process a single request, particularly if the request from the user involves more than one skill. In FIG. 15, agent 1 1520A supports domain 1 1510A, agent 2 1520B supports domain 2 1510B, and agent 3 1520C supports domain 3 1510C. It is contemplated that more than one agent may support a domain (not illustrated in FIG. 15).

As part of operation, the executor 1550 controls or directs requests to the agents 1520 and is therefore able to process user requests in the domains 1510 using these agents 1520 to support the request. In some instances, the executor 1550 may only utilize one agent 1520 to process a user request in a single domain. In other instances, the executor 1550 may utilize multiple agents across multiple domains to process a user request. For example, a user request to find "food recipes with wine pairings" may prompt the executor 1550 to call upon agents from the "recipes" domain, the "wine" domain, and the "cooking" domain to run simultaneously using independent but parallel processing paths as related agents 1520 for a particular request.

In the example embodiment of FIG. 15, during operation each agent may be configured to have access to at least one skill module. For example, agent 1 1520A has access to several skill modules 1530, 1532, 1534, 1536. Agent 2 1520B has access to skill module 1540. Agent 3 1520C has access to skill modules 1536, 1538. It is contemplated that agents may access the same skill modules or have dedicated skill modules. As illustrated in FIG. 15, agent 1 1520A and agent 3 1520C can both access skill module 1536.

During operation, the skill modules 1530-1540 may access one or more skills. Some skill modules may be configured to access overlapping skills (for example skill modules 1530, 1534 can both access skill 1). Other skill modules may be configured to access the same skills in different orders (for example skill modules 1534 may be configured to access skill 1 before skill 2, while skill module 1536 may be configured to access skill 2 before skill 1). Yet other skill module may be configured to utilize multiple iterations of the same skill (for example skill 1538 may be configured to utilize skill 2 twice). It is further disclosed that some skill modules may be configured to optionally and selectively access one or more skills. For example, even though skill module 1530 can access skill module 1 and skill module 3, it may only utilize skill 1 for a particular request based on the interpretation of the request.

Although shown in FIG. 15 in one particular arrangement, the location or accessibility of agents 1520 relative to the skill modules is flexible. One or more skill modules may be mounted inside a user device ("local skill modules"), while other skill modules may be mounted inside remote devices or housed in remote cloud-based servers ("remote skill modules"). Similarly, one or more agents may be mounted inside a user device ("local agents"), while other agents may be mounted inside remote devices or housed in remote cloud-based servers ("remote agents"). It is contemplated that local agents may access local skill modules and remote skill modules as needed. Similarly, remote agents may access local skill modules and remote skill modules as needed.

By allowing the skill modules to share skills, agents to share skill modules, and the executor to use one or more agents simultaneously, this invention permits skill cooperation, which was not possible in conventional virtual assistants. Further, conventional virtual assistants fetch each individual skill from a cloud and executes said skill in a linear, single path fashion. This invention, in contrast, allows one or more agents to access skill modules both locally and remotely, and to execute these skill modules (to satisfy the request) in parallel, adding both speed and depth to the virtual assistant's capabilities.

Figure 16:
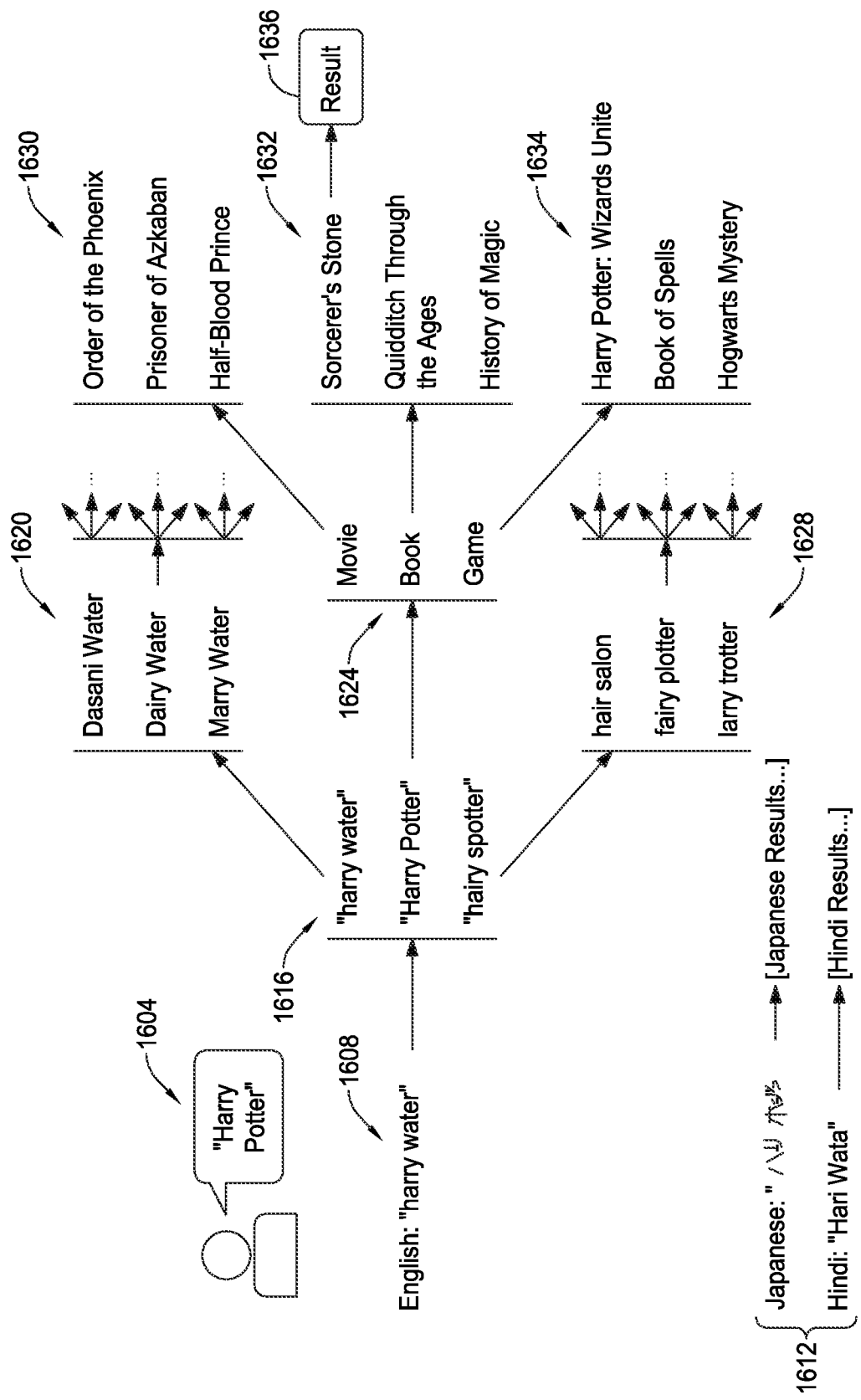
FIG. 16 illustrates a practical application of the improved virtual assistant using a sample user input phrase

FIG. 16 illustrates a practical application of the improved virtual assistant using a sample user input phrase "Harry Potter". As described, the virtual assistant enables a multiple path, parallel processing approach to increase accuracy and improve the user experience. Instead of a single processing path as shown in FIG. 1, the disclosed method executes multiple parallel simultaneous processing paths, including multiple interpretations.

As shown in FIG. 16, a user may enter an input, such as a voice command (or any other input method) comprising a phrase 1604. The executor converts the audio to a data representation 1608, such as by using speech recognition technology to create digital data representing the user's audio. Speech recognition and audio to digital conversion is well known and as such it is not described in detail herein. The executor converts the data representation 1608 into additional textual interpretations 1616, including textual representations across all supported languages 1612. As can be seen with the exemplary textual interpretations 1616, although the user may speak the words "Harry Potter", the digital data 1608 after speech recognition may not be correct and may actually be interpreted as "harry water". As we know, the user is seeking information about "Harry Potter" and not "harry water". In prior art systems, the user would be provided incorrect information based on the incorrect but top interpretation, or no information at all since "harry water" is non-sensical.

The disclosed method and apparatus overcome the drawbacks of the prior art and provides an improved method to generate a better or optimal response to the user, even when the initial interpretation of the spoken request is inaccurate. To overcome the drawbacks of the prior art, the additional textual representation 1612, 1616 are further converted into possible actions or interpretations 1620, 1624, 1628. These possible actions or interpretations, in turn, may yield one or more possible results 1630, 1632, 1634. All results will be evaluated by the scoring module, and one top result 1636 will be selected for output. As discussed herein in greater detail, numerous factors are considered when ranking the possible results 1630, 1632, 1634 such as but not limited to user's interaction history, web browsing history, user account information, and personal habits.

As discussed above, conventional virtual assistants use a single textual representation of the user's input. In contrast, the improved virtual assistant uses a branching transcription method to consider all possible written interpretations. Thus, while the textual representation 1608 may be the initial interpretation of the user input, the executor will also consider other textual representations 1616 or interpretations across all supported languages 1612. This is accomplished by allowing for transcription of the spoken input to be carried out by some languages on the device and other languages in the cloud. For example, the end user device might support language A and B, but the cloud service could support C-Z, upon a user's spoken input being received, the device would transcribe into language A and B and then combine that with the cloud services transcription capabilities for C-Z. All these inputs are then simultaneously considered as possible interpretations of what the user may have said. In one embodiment, the three top choices are selected.

Each textual representation 1612 and 1616 triggers the executor to select possible actions. In one embodiment, the three top actions are selected. For example, the textual representation 1616 of "harry water" may trigger the top action of generating a list of possible types of drinking water 1620. As another example, the textual representation 1616 "Harry Potter" may trigger the top action of generating related media, such as movies 1632, books 1630, and games 1634. As yet another example, the textual representation "hairy spotter" may trigger the top action of compiling a list of hair salons, or possible actions for searching phonetically similar phrases 1628. Other actions can also be triggered but are not shown in FIG. 16.

Each result may trigger additional actions and yield additional results. For example, the movie category of result group 1624 may trigger the top action of generating a list of related movie titles. The invention may select the three top movie titles 1630. As another example, the book result 1624 may trigger the top action of generating a list of related book titles. The invention may select the three top book titles 1632. As another example, the game result 1624 may trigger the top action of generating a list of related game titles. The invention may select the three top game titles 1634.

Results 1630-1634 also represent terminal results, which are results that do not warrant further branching. In contrast, results 1616, 1620, 1624, 1628 are non-terminal results, which require further branching. Each terminal result (such as "Order of the Phoenix" under 1630, "Quidditch Through the Ages" under 1632, and "Hogwarts Mystery" under 1634) will receive its in own result score. The result with the highest score 1636 will be selected and presented to the user.

Another novel aspect of an embodiment of this innovation as compared to the prior art is the nature in which a conversation can be carried out over multiple turns. Instead of only considering the next turn as following the current conversational state as in a conventional system, all previous prior states, from the parallel exploration, are considered as possible origins for stepping the conversation forward. For example, upon receiving the top result, which in the example illustrated in FIG. 16 is the book title "Sorcerer's Stone" 1632, the user may enter a new voice command such as "I want movies" (not illustrated in FIG. 16). The executor would then backtrack to step 1624 and append higher scores to results related to the movie action to present the result with the new highest score, which in this example may be the movie title "Order of the Phoenix" under 1630 (not illustrated in FIG. 16). Alternatively, the executor may abandon paths which are not related to movies, and further develop the movie paths.

Yet another novel aspect of the method and apparatus disclosed herein is the use of additional data to adjust scoring. For example, based on the user input phrase 1604 of "Harry Potter", book titles 1630, movie titles 1632, and game titles 1634 may receive equal scores. However, data from the user history may suggest the user frequently plays or asks about video games. As a result, game titles 1634 may receive a higher score than book titles 1630 and movie titles 1632. Auxiliary metadata may further suggest a new video game featuring Harry Potter has just been released, titled "Hogwarts Mystery". As a result, "Hogwarts Mystery" under 1634 may receive the top score (not illustrated in FIG. 16) instead of a game that was released 5 years ago.

Figure 17:
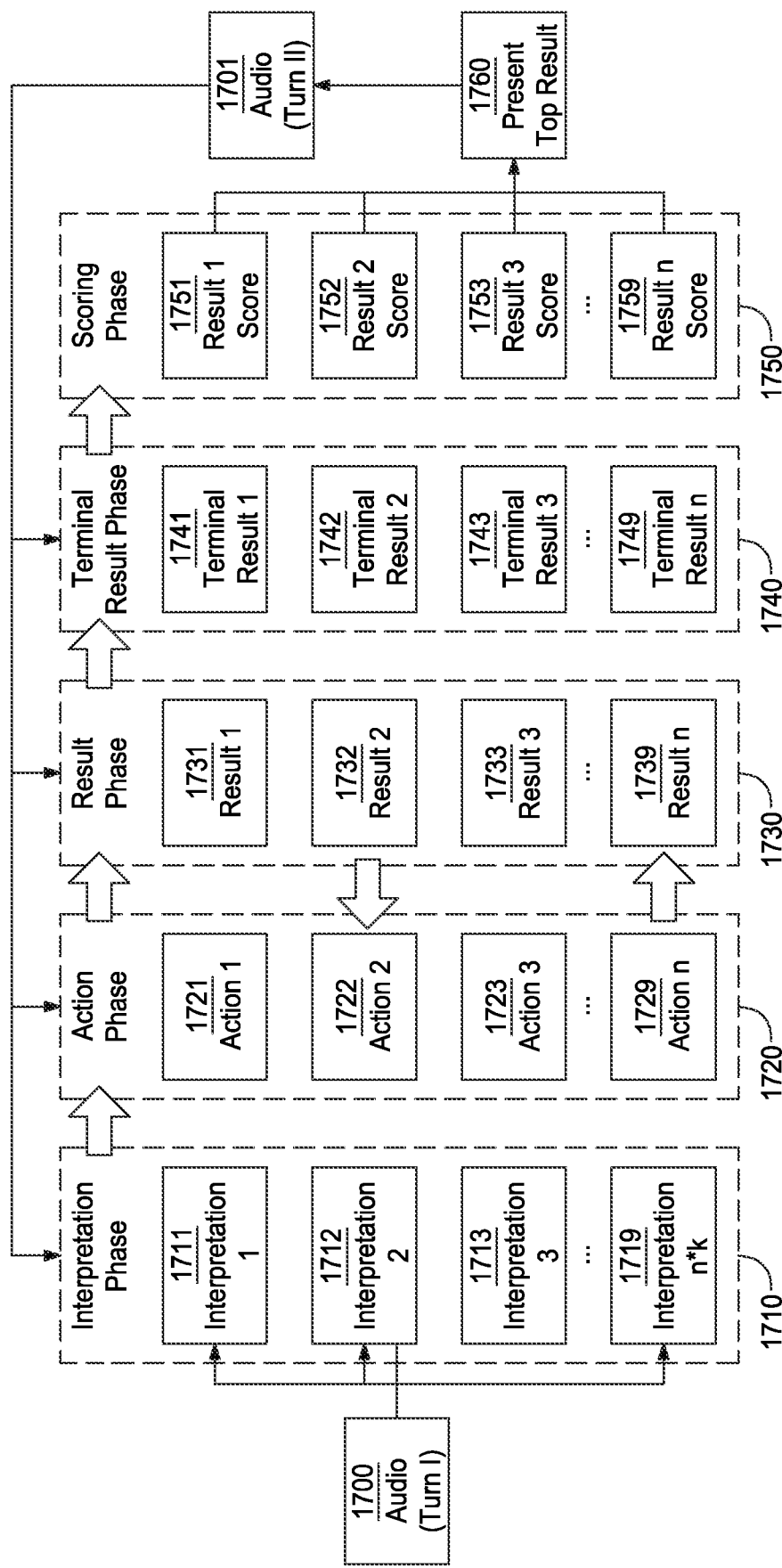
FIG. 17 illustrates an overview of the branching transcription method discussed in FIG. 7.

FIG. 17 illustrates a broad overview of the branching transcription method discussed in FIG. 16. Upon user input (commonly in the form of a voice command, but may be in any digital format) 1700, the executor enters an interpretation phase 1710, where the user input is interpreted into textual representation. Next, the executor enters an action phase 1720, where all possible actions are considered for each textual interpretation. Next, the executor enters the result phase 1730, where the result of each action is prepared.

Some results may require further actions. For such results, the executor may enter additional action phases 1720, yielding additional result phases 1730. The executor repeats the action phase 1720 and result phase 1730 until results do not require further actions. For those results, the executor enters the terminal result phase 1740, where the results are designated as terminal and sent to the scoring module discussed above. Note, the executor may process action phases 1720, result phases 1730, and terminal result phases 1740 in parallel.

In the scoring phase 1750 the scoring module appends a score to each terminal result and selects the result with the highest score. The executor actualizes the result with the highest score, meaning the action associated with that result is executed, and the result is presented to the user 1760 as the top result (of many) or the only result or action. In one embodiment, a top number (such as 3) of results are actualized (not illustrated in FIG. 17). If the user provides additional user input 1701, the executor may backtrack to any of the previous phases 1710-1750 as necessary to process said additional user input 1701.

In the interpretation phase, the executor sends the user input to one or more local and/or remote agents to generate textual representations. FIG. 17 illustrates 1 to N*k interpretations 1711-1719. These interpretations 1711-1719 are generated in parallel. In one embodiment, a top number (such as 3) of interpretations is selected for processing in the action phase 1720.

In the action phase, each of the 1 to N*k interpretations 1711-1719 is processed into 1 to n actions 1721-1729. In other words, the executor may predict a set of 1 to n actions 1721-1729 for interpretation 1 1711, a set of 1 to n actions 1721-1729 for interpretation 2 1712, and so on. Note the executor is capable of predicting all actions 1721-1729 are parallel. In one embodiment, a top number (such as 3) of actions for each interpretation is selected for processing in the result phase 1730.

In the result phase, a result is prepared for each action. For example, result 1 1731 is prepared for action 1 1721, result 2 1732 is prepared for action 2 1722, and so on. For example, if action 1 1721 is playing a video, result 1 1731 is queueing the video file for output. Note the executor can prepare all results 1731-1739 in parallel and generally simultaneously or concurrently.

Some results may require further actions. For example, if action 2 1722 is find all media related to "Harry Potter", then result 2 1732 may comprise identification of different types of media (movies, books, games, etc.). The executor would then execute additional actions, such as an action to query all movies related to "Harry Potter", yielding results comprising a list of movie titles. Note, the executor is capable of predicting further actions for some results, while simultaneously designating other results as terminal results.

Figure 18:
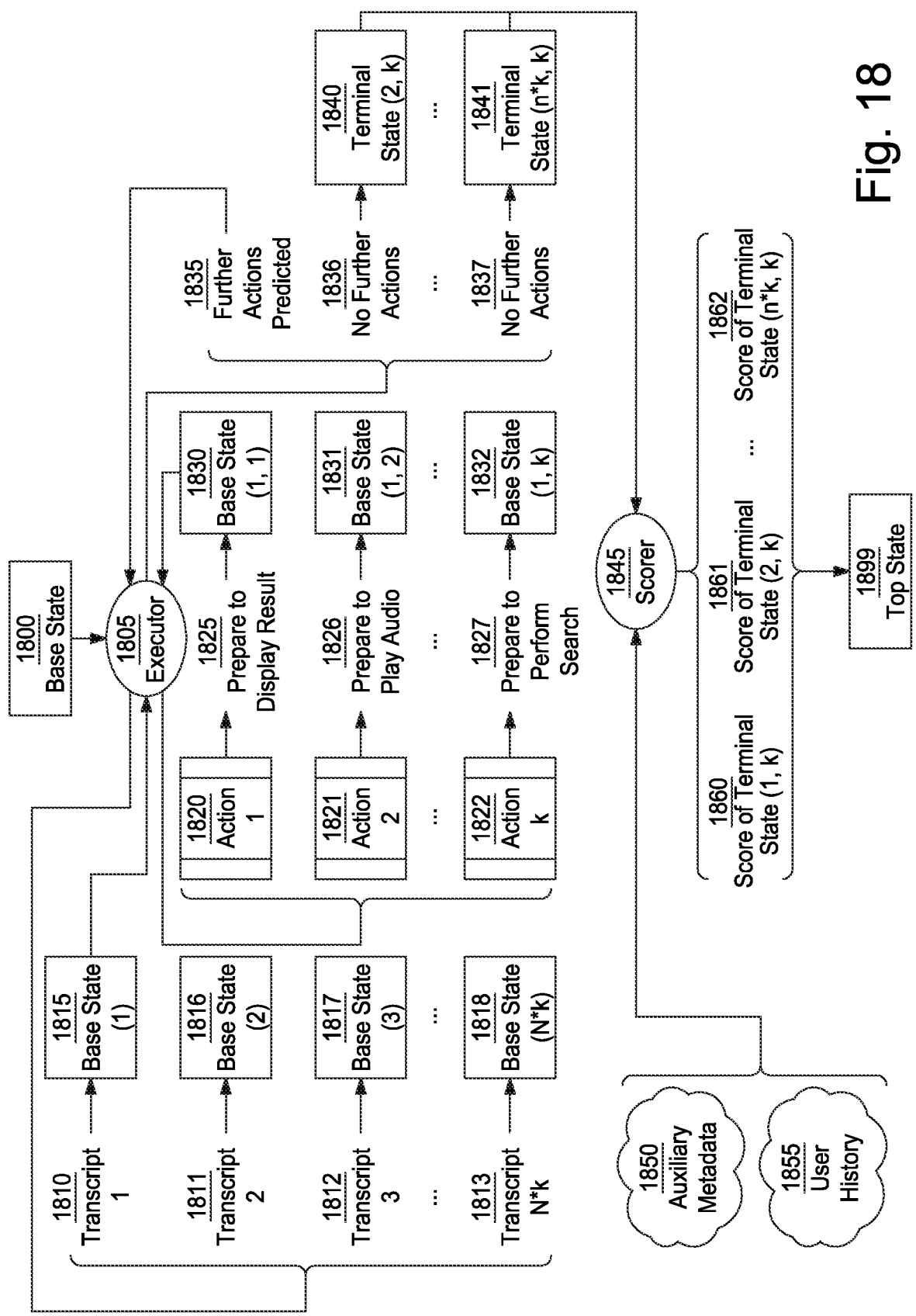
FIG. 18 illustrates the manner by which one branch of possible results paths traverses the tree of results.

As illustrated in FIG. 16, the executor can maintain multiple branches. Each branch defines possible user meanings and contexts, yielding its own actions, which lead to results, thus forming a tree of results. These results have their own intermediate or terminal states. The term "state" is generally defined as a point in the interaction between the user and the virtual assistant. FIG. 18 illustrates the how one branch of possible results paths traverses the tree of results. A user input, such as the voice command "Harry Potter", generates a base state, which becomes another base state in the interpretation phase, and yet another base state in the action and results phase, until it is finally designated as a terminal state and enters the scoring phase to reach its top state.

More specifically, the input (the unique identifier or request) of the user is designated as the initial base state 1800. In the interpretation phase 1870, the executor 1805 applies the top N*k possible transcription hypotheses to the initial base state 600 in parallel 1810-1813. The executor 1805 assumes each possible transcription is the correct input and forks the state. The result is N*k subsequent base states 1815-1818, one for each applied transcription hypothesis 1810-1813.

In the action phase 1872, the executor 1805 predicts all possible actions for each subsequent base state 1815-1818 in parallel. One or more of the actions 1820-1822 may be idempotent and reversible. In one embodiment, the executor 605 selects a top number (such as 3) of actions for the results phase discussed above. FIG. 18 illustrates the top k actions 1820-1833 for subsequent base state (1) 615 only.

In the results phase 1872 the results for each action 1825-1827 are prepared but not actualized. For example, if one action 1820 comprises a search, then the search results 1825 may be prepared for display but are not yet displayed to the user. If another action 1821 comprises playing an audio 1825, that audio clip may be prepared for output. The actions 1820-1822 result in k new subsequent base states 1830-1832. As mentioned above, FIG. 18 illustrates the new base states 1830-1832 for the top k actions 1820-1833 for base state (1) 615 only.

The executor 1805 may determine that some of the base states require further actions, such as base state (1,1) 630 and corresponding prediction 635. In that case, the executor repeats the action phase 1872 and results phase 1874 for that base state to create new subsequent base states. In one embodiment, the executor 1805 can either be configured to time out after a certain amount of time has elapsed, or utilize a different heuristic based upon the running set of result states to determine that hypothetical reasoning should cease.

If, on the other hand, the executor 1805 determines some base states do not require further actions, such as base states (1,2) 631, base state (1,k) 632, and corresponding predictions 636, 637, then the base states 631, 632 enter the terminal phase 1876, such that these states are designated as terminal states 1840, 1841, and then enter the scoring phase. As mentioned above, FIG. 18 illustrates terminal results of the top k actions 1820-1833 for base state (1) 615 only.

In the scoring phase 1878, a scorer 1845 receives the one or more terminal states from the terminal results phase 1876 and assigns a score to every terminal state 660-662. The scorer 1845 may consider all steps taken as part of generating a state 600-641, as well as auxiliary metadata 1850 and any user history 1855 such as user profile, user preferences, and previously saved actions or results.

The terminal state with the highest score is designated as the top state 1899 and is actualized. Actualization of a state means the action associated with that state is carried out permanently, and the prepared result is output to the user. For example, if the base state 1831 was designated as the top state 1899, then the action 1821 is actualized and the prepared audio (such as a song) 1826 is presented to the user via an output. In one embodiment, actualized results are stored in the user history 1855 to avoid repetition and facilitate personalization. In one embodiment, a top number (such as 3) of results are actualized (not illustrated in FIG. 18).

In one embodiment, the executor 1805 can execute action phases, result phases, and terminal phases in parallel such that some base states are designated as terminal states, while other subsequent base states continue to generate new actions and results. In one embodiment, the executor 1805 also executes scoring phases in parallel with other phases such that existing terminal states receive their scores while other base states are still entering new action and result phases. In one embodiment, the top state changes as new terminal states receive their scores. In one embodiment, output to the user is updated or added as new top states emerge.

To carry out search results from a hypothetical reasoning perspective, it may be required that a search engine be capable of handling queries that have a special branching form or that the search engine carry out searches for numerous different interpretations to obtain search results for the various different interpretations. In one embodiment, the method and system disclosed herein has its own search engine internally capable of carrying out these queries, but in other embodiments other search engines may be utilized.

This in turn may involve indexing the web for all items that might be searched for and distilling them into a metadata representation that improves hypothetical reasoning.

Figure 19:
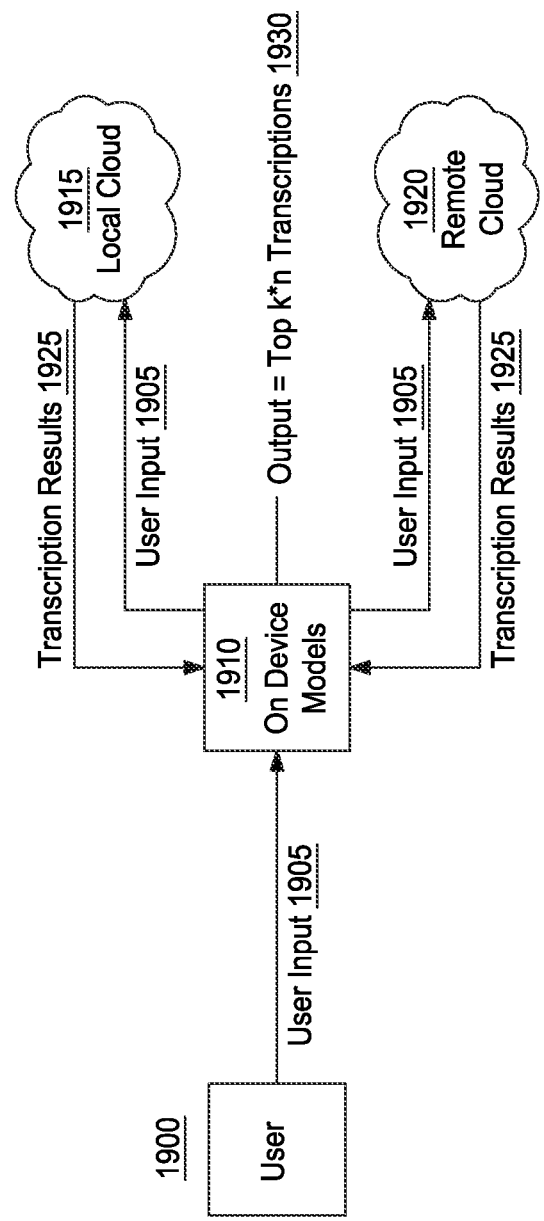
FIG. 19 illustrates the hardware interaction during the interpretation phase.

FIG. 19 illustrates the hardware interaction during the interpretation phase. As discussed above, the executor, the agents, the skills, and skill modules can all be mounted separately and can all operate on a device or in a cloud system, or both. FIG. 19 illustrates an example where the executor is mounted in the device 1910, while agents used for the interpretation phase are located in one or more local clouds or databases 1915 and one or more remote clouds or databases 1920. The user 1900 interacts with the device 1910 containing by user input, such as but not limited to voice, text, images, video, or any other type of user input 1905. The device 1910 may interact with local clouds or databases 1915 or remote clouds or databases 1920. In one embodiment, such interaction comprises the device 1910 transmitting user input 1905 to the clouds or databases 1915, 1920, and the clouds or databases 1915, 1920 transmitting transcription results 1925 back to the device 1910. At the conclusion of this stage, the output is a top-k list of possible transcriptions for each of the N languages considered, for a total N*k possible transcriptions or interpretation of the user's voice or vision input 1905.

Figure 20A:
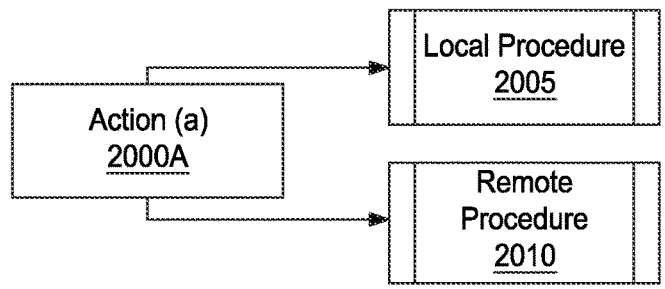
FIG. 20A, FIG. 20B, FIG. 20C, and FIG. 20D illustrate various methods of actualization.
Figure 20B:
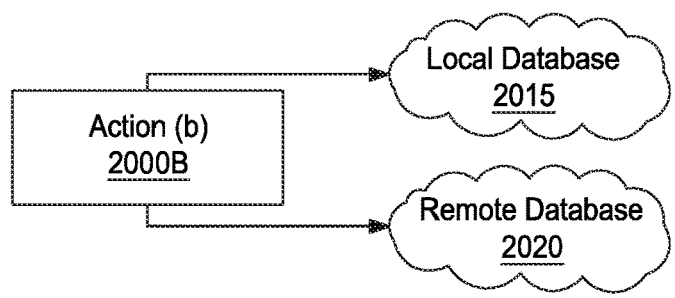
Figure 20C:
Figure 20D:
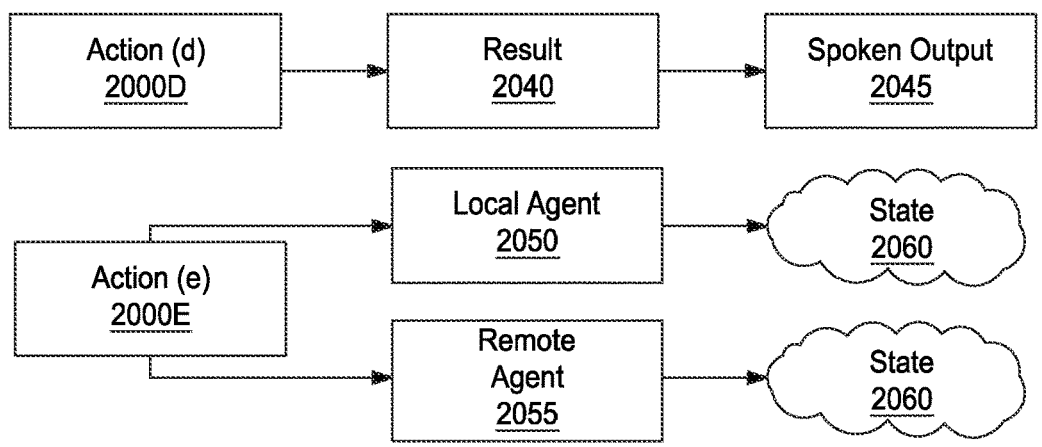

As discussed above, when a terminal state is designated as the top state, the executor actualizes the action and outputs the result of that top state. The top state is actualized wherein all actions that were assumed carried out as part of the reasoning to reach the terminal state are executed and output to the user by means of audio, visual or haptic feedback. FIGS. 20A, 20B, 20C, 20D illustrate various methods of actualization. As shown in FIG. 20A, the action 2000A may call local or remote procedures 2005, 2010. As shown in FIG. 20B, the action 2000B may connect to local or remote databases 2015, 2020 to modify or fetch data. As shown in FIG. 20C, the action 2000C may perform searches on local or remote search engines or in local or remote databases 2025, 2030 to deliver search results 2035. As shown in FIG. 20D, the action 2000D may prepare an existing result 2040 (such as a result stored in user history, as discussed above) for output 2040 (such as playing a saved audio file). As shown in FIG. 20D, the action 2000E maybe connect with local or remote agents 2050, 2055 to create new states or modify existing states 2060.

One or more or all states that could have also been selected for actualization are stored in the executor. When a new user input is received the following method is used to continue the conversation forward: (1) assume each possible terminal state from the previous turn was correct; (2) create a copy of that state and take the new top N*k input hypothesis as input in order to execute parallel hypothetical reasoning; and (3) once parallel hypothetical reasoning has been carried out with each possible previous state as the root, then execute the scoring procedure as defined above to select the top state to continue the conversation.

Figure 21A:
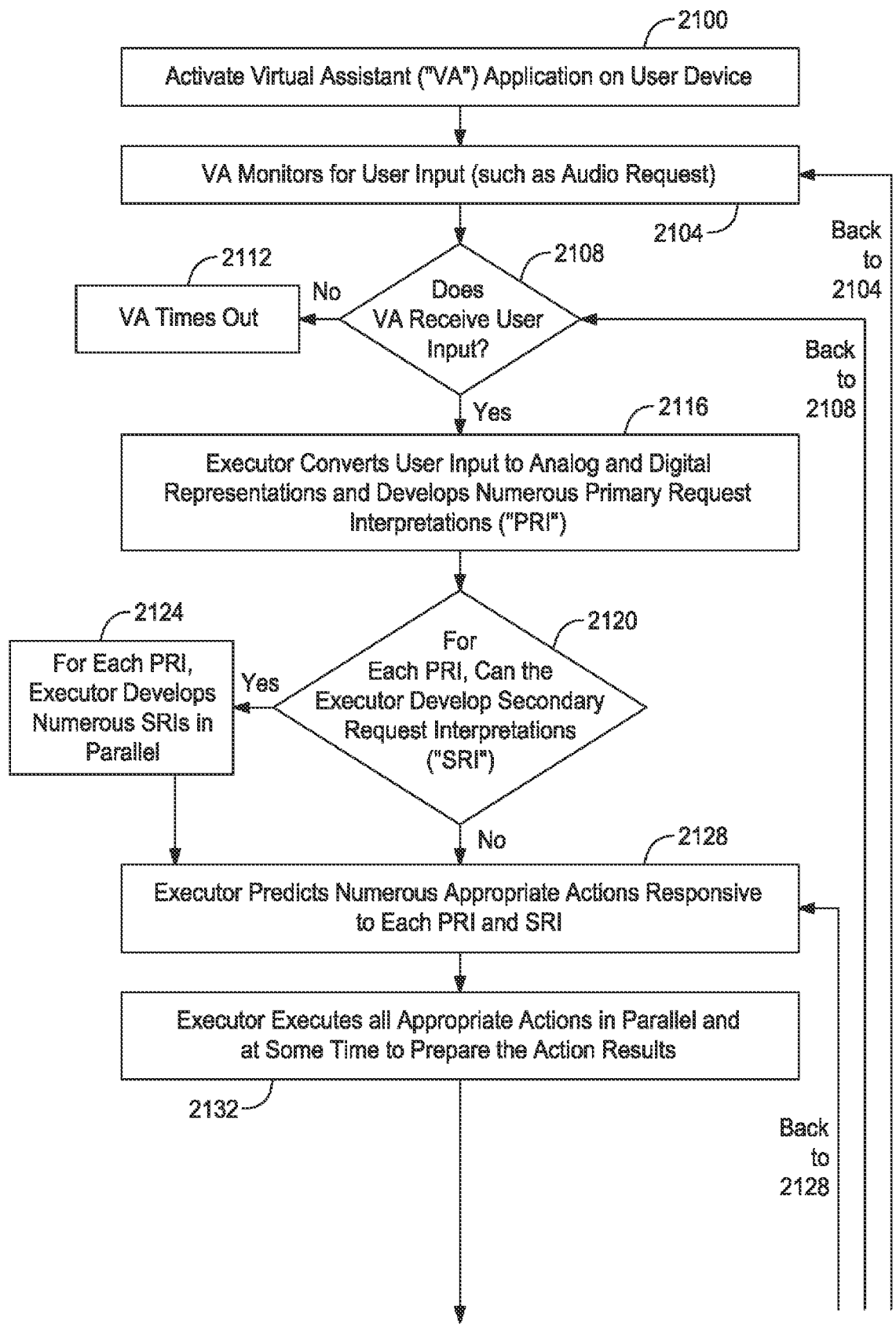
FIG. 21A and FIG. 21B illustrate an exemplary operational flow diagram of one possible method of operation.
Figure 21B:
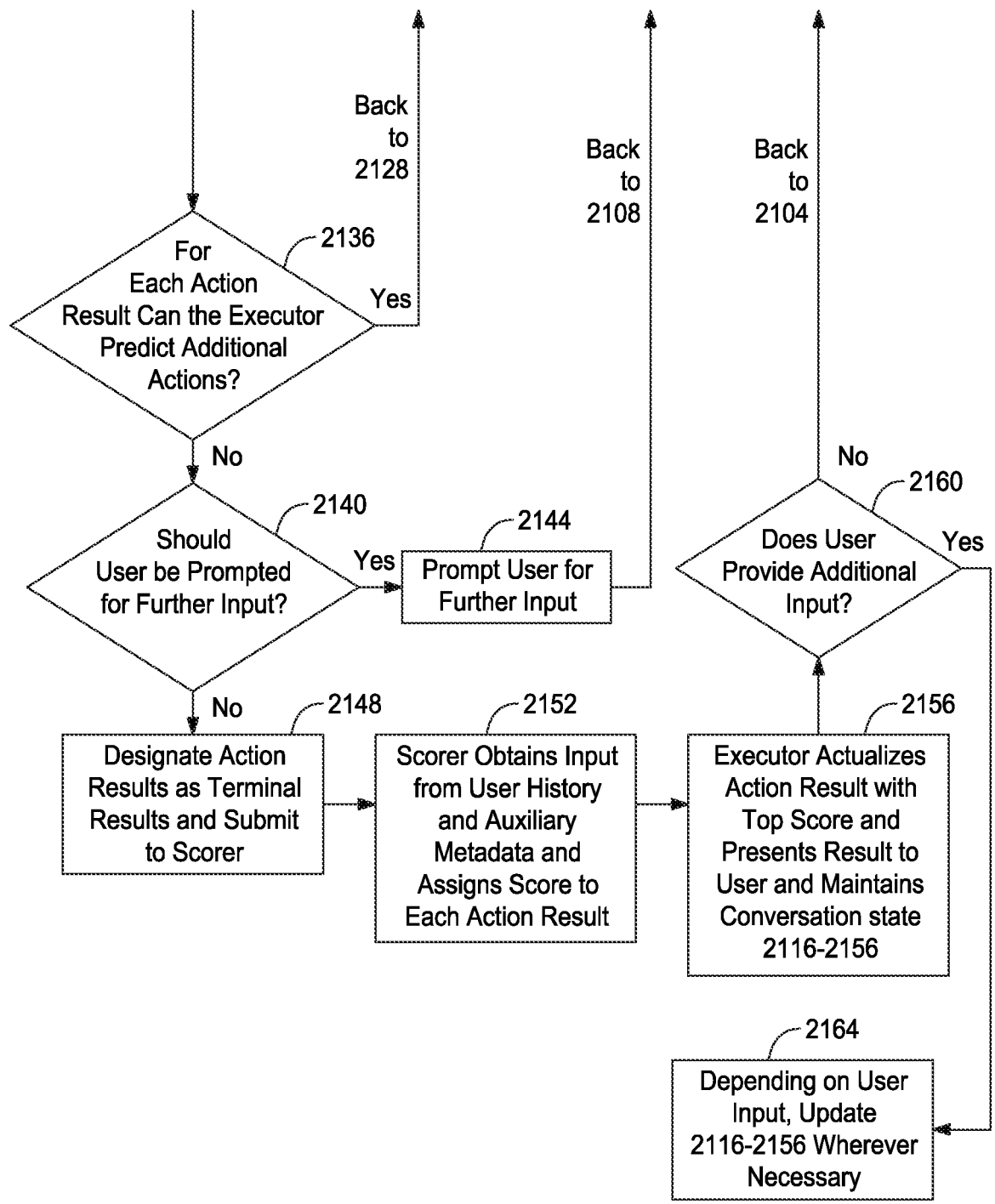

FIGS. 21A and 21B illustrate an exemplary operational flow diagram of one possible method of operation. In a step 2100, the virtual assistant is activated on a user device. This step assumes the user device itself is already in operation. In one embodiment, the virtual assistant is preinstalled on the user device and activates whenever the user device itself is operating. In another embodiment, the virtual assistant is installed on the user device later (such as via software download and installation, or via direct or indirect connection to another device operating the virtual assistant). In one embodiment, the virtual assistant is automatically activated upon successfully installation. In yet another embodiment, the virtual assistant requires further activation such as a user selection of a "start" function. As discussed previously, the virtual assistant (and more specifically the executor) can, but not necessarily have to be mounted or installed inside the user device.

In a step 2104, upon activation the virtual assistant enters stand-by mode and monitors for user input. User input may be direct (such as the user sending a command to the user device via voice, text, images, video, or any other input method) or indirect (such as a direct user input to an intermediate device such as a smartwatch, whereupon the smartwatch communicates to the user device, such as a phone).

In one embodiment, the virtual assistant is on stand-by mode for as long as the user device itself is operating. In another embodiment, as illustrated in steps 2108-2112, the improved virtual assistant may be set to enter a time-out mode after a period of inactivity (e.g., no user input). The time-out mode causes the virtual assistant to stop cease the current session and return to step 2104 and monitor for user input or go into a sleep state. This is a desirable feature on many user devices to conserve resources such as power and data.

In one embodiment, the virtual assistant may stay in time-out mode until the user performs further activation such as is discussed in step 2100. In another embodiment, the virtual assistant stays in time-out mode until the user performs any activity on a user device. For example, if a user goes to sleep and stops using his phone for eight hours, the virtual assistant may enter time-out mode. When the user wakes the next morning and begins to browse the news on their phone, the virtual assistant automatically exits time-out mode and enters stand-by mode. In yet another embodiment, the user may command the virtual assistant to enter time-out mode by user input.

In a step 2116, upon receiving user input, the virtual assistant enters the interpretation phase, such that the user input is converted into primary request interpretations. More specifically, the executor transmits the user input to local and remote databases and receives one or more transcript results, then outputs N*k possible transcriptions in parallel. FIG. 21A refers to these N*k possible transcriptions as primary request interpretations ("PRIs").

In a step 2120, the executor evaluates whether each PRI requires further interpretation. If so, in a step 2124, the executor develops secondary request interpretations ("SRIs") in parallel. Using the example discussed in FIG. 16, where a user attempts to enter a voice command input of "Harry Potter" but does not do so clearly, the executor may generate "harry water" as a PRI, and then develops "harry water", "Harry Potter", and "hairy spotter" as SRIs. In one embodiment, SRIs are evaluated for further interpretation, such that the executor may develop tertiary request interpretations, quaternary request interpretations, and so on. In one embodiment, the executor is set to exit the interpretation phase when a top number of rounds of interpretations are developed (for example, exit the interpretation phase upon developing tertiary request interpretations).

In a step 2128, the executor enters the action phase, where the executor predicts numerous appropriate actions responsive to each PRI and SRI. In one embodiment, the executor predicts actions responsive to only the top number (such as 3) of PRIs and SRIs. The executor can run the interpretation phase and the action phase simultaneously, such that PRIs enter the action phase while SRIs are developed.

In a step 2132, the executor enters the results phase, where the executor executes the appropriate actions in parallel and generally simultaneously or generally concurrently to prepare the action results. In some embodiments, the actions could execute sequentially, but that would slow operation. For example, if an appropriate action is to play a song, the executor prepares an audio file of the song for output but does not play the song. In one embodiment, the executor only executes a top number (such as 3) of actions for each PRI or SRI.

In a step 2136, one or more action results may cause the executor to predict additional actions. If an action result requires additional actions, steps 2128-2132 are repeated. For example, the initial action may be to generate a list of song titles. The list of song titles may require an additional action of retrieving all, or a top number (such as 3), of songs to be prepared for output.

In one embodiment, as illustrated by a step 2140, the executor determines whether the user should be prompted for further input. If so, in step 2144 the executor may output a prompt to the user (such as by audio or text notification) to request further input, and steps 2104 to 2136 are repeated. Using the example above where an initial action may be to generate a list of song titles, the executor may prompt the user to confirm whether the user wishes to perform the additional action of retrieving one or more songs. In one embodiment, steps 2140-2144 may be performed at any point between steps 2116-2164.

In a step 2148, where no additional actions can be predicted for an action result, the executor enters the terminal result phase. In the terminal result phase, action results with no additional actions are designated as a terminal result and submitted to a scorer for the scoring phase.

In the scoring phase of a step 2152, the scorer appends a score to all terminal results. To determine each score, the scorer considers (1) all steps 2116-2148 taken as part of generating the terminal result, (2) the auxiliary metadata (any data not specifically related to the user), and (3) the user history (such as user profile, user preferences, and previously saved actions or results). For example, based on a user input of "Harry Potter", all Harry Potter-related book titles, movie titles, and game titles may receive equal scores. However, data from the user history may suggest the user frequently plays or asks about video games. As a result, game titles may receive a higher score than book titles and movie titles. Auxiliary metadata may further suggest a new video game featuring Harry Potter has just been released, titled "Hogwarts Mystery". As a result, "Hogwarts Mystery" may receive an even higher score than other game titles. In one embodiment, the executor can run scoring phases in parallel with other phases such that existing terminal results receive their scores while other action results are still entering new action and result phases.

In a step 2156, the executor actualizes the terminal result with the top score. As discussed above, actualization means the action associated with that terminal result is executed, and the result is presented to the user. For example, if a song is determined as the terminal result with the top score, the previously prepared audio file of that song is played to the user. In one embodiment, the top state changes as new terminal results receive their scores. In one embodiment, output to the user is updated or added as new top score results emerge. In one embodiment, a top number (such as 3) of results are actualized.

The executor may be configured to maintain the conversational state throughout steps 2116-2156, even after a terminal result receives a top score and is presented to the user. A conversational state is the state as it relates to the interaction with the user. In one embodiment, the executor maintains a conversational state indefinitely. In another embodiment, as shown in a step 2160, the executor is set to terminate the conversational state after a period where the user provides no further input. Upon termination of the conversational state, the improved virtual assistant returns to the stand-by mode, as discussed in step 2104. If, on the other hand, the user does provide input, as shown in step 2164, the executor may update and/or adjust steps 2116-2156 accordingly.

The ability to maintain conversational states is another improvement over the prior art. In one embodiment, the conversational state contains the history of what the user has said in the current session, the history of what the agent/executor has said the current session, and the results that the user has seen the current session as well as associated metadata (the movie title, the actors in a movie, etc.). A persisted conversational state corresponds to a persistent conversational state that lives beyond the scope of a single dialogue interaction. The method and system disclosed herein maintains state information and data during the interaction with the user thereby allowing the system to develop multiple branches to determine which branch will yield the best result, which often cannot be determined until actual results are determined. This process also allows the system or user to jump or backtrack to a different branch for any reason, such as further user input or based on unsatisfactory search results. The persistent conversational state also allows the user to continue with the same virtual interaction by bringing up the same topic again, at a later time, to restore the conversational state. In various embodiments, the later time could be minutes, hours, days, or weeks.

For example, upon receiving the top result of a suggestion of the game title "Hogwarts Mystery", the user may enter a new voice command such as "I want movies, not games". The executor would then backtrack to step 2148 and append higher scores to a movie result. Alternatively, the executor may abandon paths which are not related to movies, and further develop the movie paths.

Individual skills can maintain their own interpretation of the conversational state as well as query other skills/agents conversational state interpretations. This conversational state is persisted both for the duration of the current conversational session as well as over the entire course of the user's history. This historical conversational state across all agents may be persisted into both a client and a cloud database. This persisted conversational state can be queried by agents to form a personalized profile for use in augmenting input. This combined user profile is an advancement over the prior art in which each skill is required to maintain in isolation a representation of the user's profile.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

When a user provides an input (user inquiry) to a voice assistant in the form of either text, audio, or image, the current virtual assistant will attempt to process the user inquiry in order to provide the user with a helpful and accurate response. The processing involves having the virtual assistant 'understand' what the user is asking or requesting and whether the virtual assistant can provide an answer or satisfy the request. One problem which arises is that the user inquiry may be determined to be out of scope and/or out of domain of the virtual assistant.

The scope of a virtual assistant consists of all possible responses a virtual assistant may generate to a user inquiry. A response (defined as a response or action) that a virtual assistant is not capable of generating is considered out of scope. For example, a user request for a virtual assistant to operate a microwave may be out of scope if the virtual assistant is not connected to a microwave or configured to operate a microwave. Likewise, a virtual assistant that is built to operate a microwave would not be capable of finding movies or music.

A domain of a virtual assistant consists of all related topics a virtual assistant may comprehend and thus process. A single assistant may be capable of handling many different domains. However, because a virtual assistant only understands which domains it does know, it does not have an understanding of that which it has never been exposed to. A user input that a virtual assistant cannot comprehend is considered out of domain. For example, virtual assistants may generally not be able to comprehend or process a user input that consists of incomprehensible noises or even word combinations which do not have a meaning. But a virtual assistant may try to find the closest topic in its domains for that random input because it assumes an input is something that it could handle.

Figure 22:
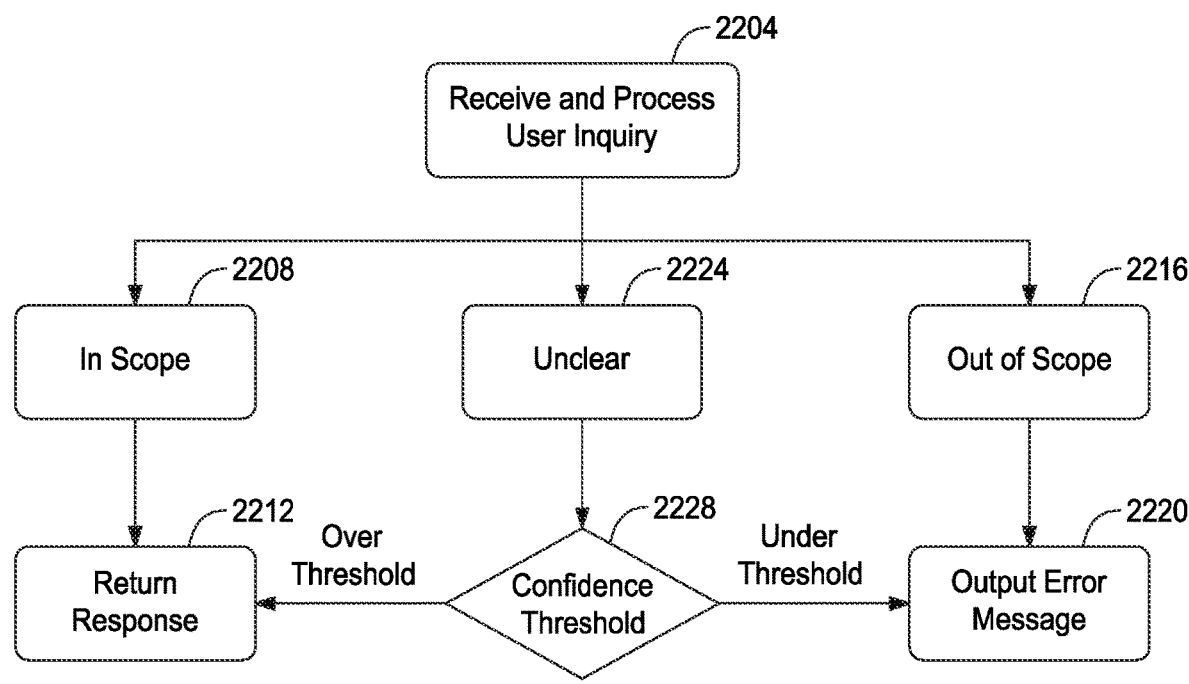
FIG. 22 illustrates conventional methods of handling out of scope inquiries.

FIG. 22 illustrates conventional methods of handling out of scope inquiries. In the past, virtual assistants may include a set of data definitions that define which inquiries may be in scope, and which may be out of scope. Thus, upon receiving and processing a user inquiry at a step 2204, the virtual assistant may classify the user inquiry into three categories: inquiries that are in scope, inquiries that are out of scope, and inquiries that are neither in scope nor out of scope (in other words, inquiries that cannot yet be defined by either set of data, i.e., being in or out of scope).

At a step 2208, inquiries classified as in scope are processed such that, at a step 2212, a response may be returned to the user. At a step 2216, inquiries classified as out of scope are processed such that, at a step 2220, an error message may be output to the user. At a step 2224, inquiries classified as neither in scope nor out of scope may be processed as an in scope inquiry at step 2212 by mapping the inquiry to the closest known capability the virtual assistant has, even though the closest mapping may not be confidently relevant, or the initial request was simply not understood.

Other current approaches to solve this problem include use of a confidence threshold at a step 2228, where the closest known capability is given a confidence rating. If the confidence rating of the closest known capability is above a predetermined threshold, then a response may be returned at step 2212. If the confidence rating is below the predetermined threshold, then an error message may be output to the user at step 2220. An accurate confidence threshold is difficult to calibrate using this approach, thereby limiting the virtual assistant's capabilities to provide any help in that scenario. Out of domain inquiries are prompts processed in a similar manner and face similar challenges.

Current Voice Assistants such as Siri®, Alexa®, and Google® take a limiting approach to addressing this problem. First, these systems define the scope of all possible capabilities that are supported. Typically, these are tasks such as "streaming", "video games", "banking", "messaging" and many more. When a user provides a new input (user inquiry) the model attempts to classify the input into one of those categories and assigns a confidence score between 0 and 100% to the classification. These systems determine if a result is low confidence. If the confidence is low, such as below a predetermined threshold, then the input is classified as Out-Of-Scope and the user is notified that an answer is not available. While this solution may reduce the chance of a user obtaining a response that is unrelated to the inquiry (i.e., clearly wrong), it avoids that response by simply returning no response at all. For anyone who has used a virtual assistant, far too often the virtual assistant returns an irrelevant response or no response. Depending on the confidence score and the threshold, the user is either provided a wrong answer, or no answer at all, and this is a drawback to the prior art. In many cases the user is just presented with a list of web search results of the exact text that the user input, which can be incomprehensible at times.

Figure 23:
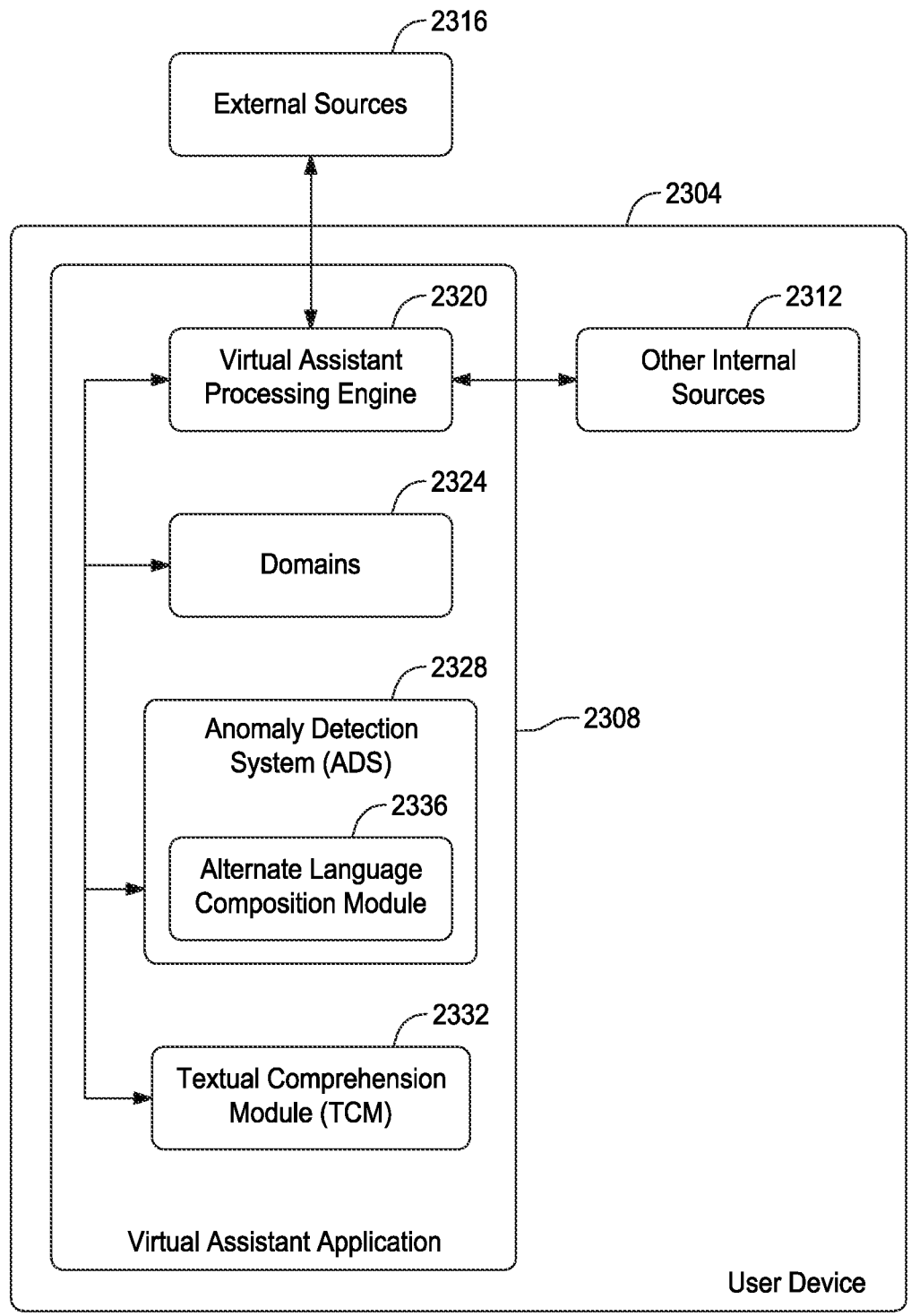
FIG. 23 illustrates an exemplary system of the improvement, wherein the virtual assistant is a software application on a user device.

The various embodiments disclosed herein present an improved solution. FIG. 23 illustrates an exemplary system, where the virtual assistant is a software application on a user device. In FIG. 23, a user device 2304 includes an improved virtual assistant application 2308 and various other internal sources 2312. Internal sources 2312 may include hardware, databases, and other software application installed on the user device 2304. For example, the internal sources may be a database that contains information, other applications, other virtual assistants, search engines or any other internal source of information which may be used by the virtual assistant. The virtual assistant application 2308 may be in communication with one or more internal sources 2312, as well as external sources 2316. External sources 2316 may include any device illustrated in FIGS. 3 and 4 described above (such as mobile devices 305, Bluetooth devices 306, and/or other devices 307), as well as software applications operating on these devices. The internal sources 2312 and external sources 2316 may comprise databases, search engines, virtual assistances, or any other resources that may be used by the virtual assistant 2308 to satisfy a user request for action or information. These other sources 2312, 2316 are known in the art and as such not described in detail herein. As disclosed herein, the virtual assistant 2308 may send an inquiry to these other sources 2312, 2316 to seek information in the event the virtual assistant requires assistance in classifying, determining the scope request, or both, or satisfying the user request.

The virtual assistant may comprise numerous software modules, algorithms, functions, or features, which are utilized as described herein. The software modules may be referred to as machine executable code or instructions, which are stored on a memory in a non-transitory state, for execution by a processor. The virtual assistant application 2308 may include a virtual assistant processing engine 2320, which may process user inquiries using one or more domains 2324, the anomaly detection system ("ADS") 2328, and/or the textual comprehension module ("TCM") 2332

The domains 2324 are one or more datasets defining the possible topics the virtual assistant application 2308 may comprehend and process. These domains 2324 may be used to determine whether the virtual assistant application 2308 is able to comprehend and process the user inquiry without additional steps, and to calculate the confidence rating of each domain identified as one that which may be used to comprehend and process the user inquiry. In one embodiment, the domains of other internal sources 2312 may also be used to comprehend and process the user inquiry.

The ADS 2328 is software configured to process user inquiries which may not be comprehended with any domains 2324, or which may be comprehended with domains 2324 at a confidence rating below a predetermined threshold. The ADS 2328 may determine if such user inquiries may still be interpreted as a valid user inquiry for any virtual assistant, or if the user inquiry is truly incomprehensible. For example, the ADS 2328 may use the alternate language composition module 2336 to determine if the user inquiry may be understood in another language. The ADS 2328 may also use other functions to expand the user inquiry into a number of possible alternative interpretations, as shown in FIG. 23.

The TCM 2332 may be used to process user inquiries which may not be processed with any domains 2324, or which may be processed with domains 2324 at a confidence rating below a predetermined threshold. The TCM 2332 may reform the user inquiry into a question and may query the textual descriptions of the capabilities of the virtual assistant application 2308, the other internal sources 2312, and the external sources 2316 for answers.

Figure 24A:
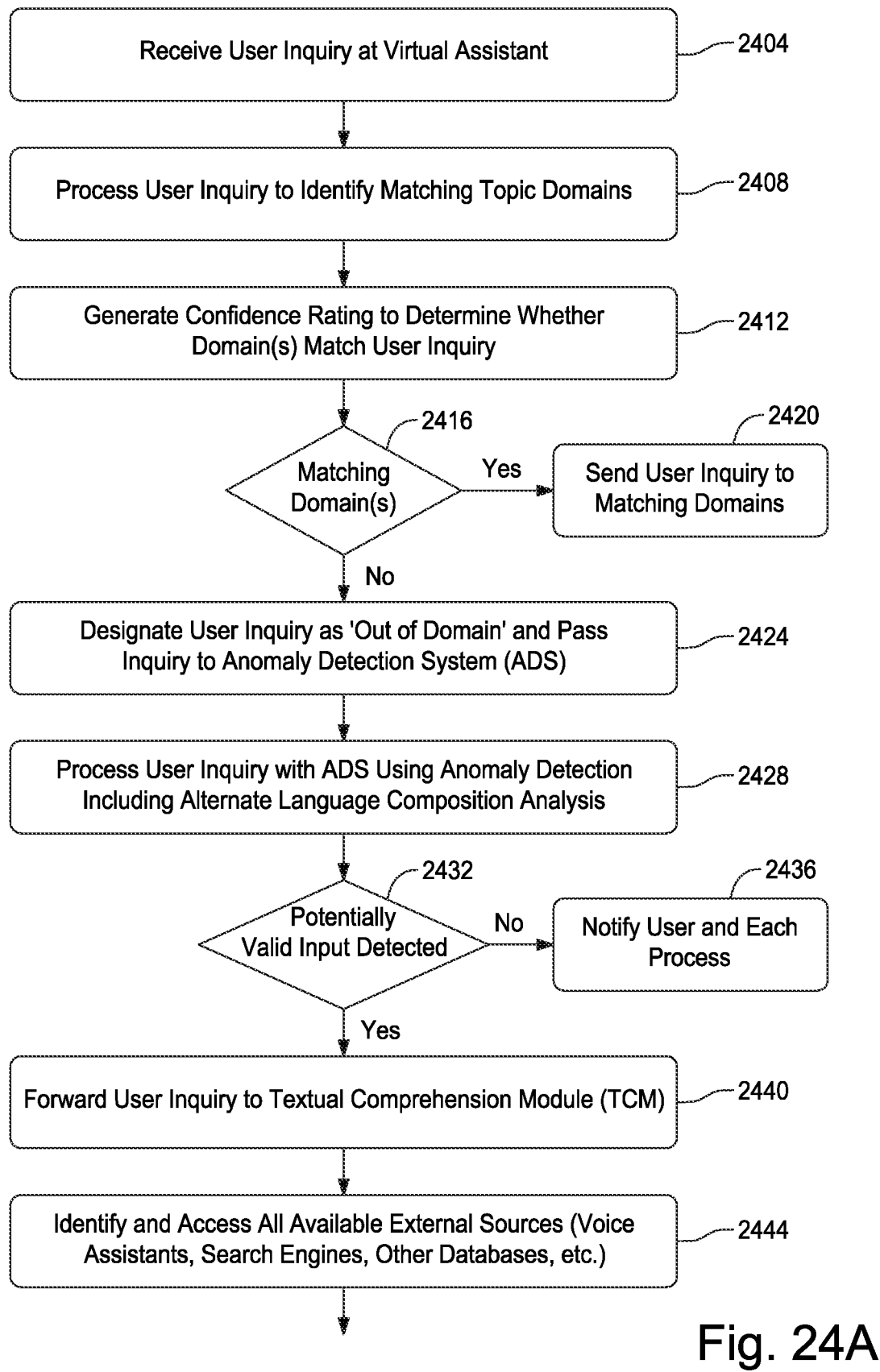
FIG. 24A illustrates the first part of an exemplary method of operation.
Figure 24B:
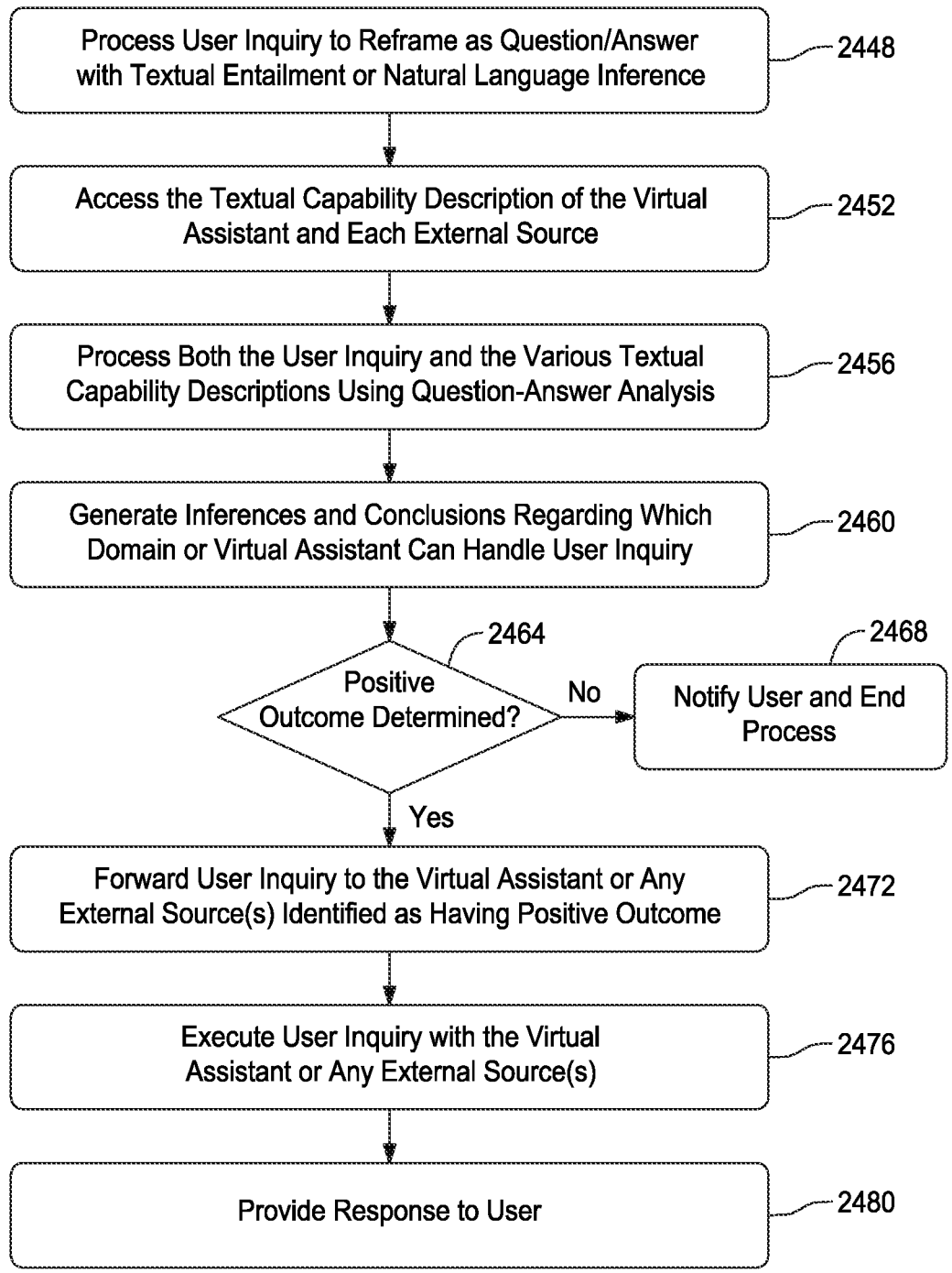
FIG. 24B illustrates the second part of an exemplary method of operation.

An exemplary method of operation is shown in FIGS. 24A and 24B. This is but one possible method of operation and other methods are contemplated. At a step 2404, the virtual assistant receives an inquiry from a user. The user inquiry may be in the form of text, voice, images, video, or any combination thereof. The virtual assistant may first assume the user inquiry is in scope and in domain. Thus, at a step 2408, the user inquiry is classified into a pre-set number of domains. Using the example in FIG. 23, a user inquiry of "harry water" may be classified into the domain of consumables (such as bottled water), media (such as movies, books, and games), and so on.

At a step 2412, confidence ratings are generated for each classified domain. At a step 2416, domains with a confidence rating over a predetermined threshold are identified as matched domains. In one embodiment, this confidence is tuned to be very high, such that false positives (wrongly classified as being in domain) are minimized at the expense of many more false negatives (for being out of domain). A user inquiry is in domain if the system can identify one or more matched domains. A user inquiry is out of domain if the system cannot understand the user inquiry or cannot identify any matched domains If the user inquiry is being classified as in domain, then the operation advances to step 2420 and the user inquiry is sent to the matching domains to be further processed. Alternatively, if at step 2416 no domains above a predetermined threshold are identified, then the operation advances to step 2424. At a step 2424, the user inquiry is classified as being out of domain and the user inquiry is passed to an ADS. The ADS is tasked with determining if the user inquiry that is seen as low confidence at step 2416 may still be interpreted as a valid user inquiry for any virtual assistant, or if the user inquiry is truly incomprehensible.

At a step 2428, the ADS attempts to interpret the user inquiry across all supported languages as well as other factors to determine if the user inquiry can be understood in a different language or using different phrases or terms of expression. For example, as shown in FIG. 16, a user inquiry of "harry water" 1608 may be processed into alternative phrases, as shown in the textual representations 1616-1634. Another example may be a user who typed a sentence with many grammatical and spelling errors, such as "find HP movie @3". The ADS may, using various correction and interpretation modules, interpret the input into a user inquiry to find which movie locations play the movie "Harry Potter" at 3:00 pm on that day. ADS may also include an alternate language composition module, which, processes out of domain user inquiries using alternate languages, as shown in the textual representations 1612 of FIG. 16.

At a step 2432, the ADS may finish processing the user inquiry and may have identified the inquiry as either a potentially valid inquiry (such that the system may be capable of processing further), or an invalid inquiry (such that is truly incomprehensible). If the ADS identifies the inquiry as invalid, the operation advances to a step 2436 and the virtual assistant notifies the user that the inquiry is invalid and ends the process for this inquiry and may notify the user of the same. Alternatively, if at step 2428 the user inquiry is not identified as invalid, successfully interpreted into a comprehensible inquiry, such that at step 2432 the user inquiry is determined to be a potentially valid input, then the operation advances to a step 2440.

In the ADS confidence is prioritized on either end of the spectrum. That is, the confidence threshold of the determination that the user inquiry cannot be further interpreted must be very high to proceed to step 2436. In one embodiment, user inquiries interpreted with moderate confidence may either be considered as a valid inquiry if more processing time is available at steps 2440 and beyond (such as for example, user inquiries that do not require an immediate response). Thus, if the ADS is still not confident if a user inquiry is in domain or out of domain, the operation may also proceed to step 2440. Otherwise, the user inquiry may be considered invalid if lower latency in response is required.

At a step 2440, potentially valid user inquiries are processed by a TCM to identify the scope of the user inquiry, and to match the user inquiry with peripheral devices, if necessary. Textual comprehension is a more advanced method of understanding text-based inquiries implementing question answering. A question answering implementation may construct its answers by querying a structured database of knowledge or information. More commonly, question answering systems can pull answers from an unstructured collection of natural language documents. In this case, the TCM pulls answers from textual descriptions of the virtual assistant and external sources, as discussed in detail in steps 2444 to 2460 below.

Specifically, at a step 2444, the virtual assistant may identify and access all available external sources (as illustrated as item 1616 in FIG. 16 and described above). In a preferred embodiment, external sources include other virtual assistants. It is contemplated that more than one virtual assistant may operate and be available on a user's device. For example, Siri may call other virtual assistances, such as MeetKai with other capabilities, and either or both may call a third virtual assistance or access local or remote databases. In one embodiment, other internal sources (as illustrated as item 1612 in FIG. 16 and described above) may also be identified and accessed.

The virtual assistant's scope may then be combined or linked with the scope of such external sources. For example, the virtual assistant may itself, not be capable of turning on an electric vehicle. Thus, by itself, a user request to turn on an electric vehicle may be considered out of scope. However, by connecting with a second virtual assistant tailored to or in the electric vehicle, or on the user device, the ability of turning on an electric vehicle is now considered in scope.

At a step 2448, the TCM may reframes the user inquiry from being a classification task (i.e., a return task generating an in domain or out of domain classification) into a question answering and textual entailment inquiry. This may also be referred to as understanding implied meaning or natural language inference understanding of the user inquiry. Natural language inference processing is known in the art of software language processing and as such is not described in detail herein. For example, a text-based inquiry may be "find a Harry Potter movie." A question/answer inquiry of that same user request may be "can you find movies?"

At a step 2452, the scope of the virtual assistant and the external sources are defined in terms of the English language in sentence-based form. In other words, in one embodiment, the virtual assistant and the external sources' capabilities and knowledge base are described in a paragraph or more of a language. These capabilities can be automatically generated into English (or any other applicable languages) through templates based on domain and intent names or be provided through a specialized declaration framework, including being defined by those who maintain the domain. The model is then presented with the English document describing the virtual assistant, and each external source and their capabilities. In one embodiment, the scope of other internal sources (as illustrated as step 1612 in FIG. 16 and described above) may also be included in the sentence-based definitions.

At a step 2456, the TCM may use a question/answer analysis to process the user inquiry, which is now in the form of a question/answer through textual entailment or natural language inference, and the various textual descriptions of the scope of the primary virtual assistant and the external sources. Using the example above, where a user inquiry is reframed as "who can find movies?" the TCM may then analyze the textual description of the scope to determine whether the virtual assistant or the external sources may describe an ability to find a movie. An assistant may have the textual description of their capabilities including the phrase "I can search for film content", while not an exact match for "movie" the TCM could still match that they would be capable of finding a movie.

There are several differences between this process and classification. One such difference is that the question/answer system is configured such that it operates on documents of knowledge and attempts to provide human reading comprehension approximation. In this way the TCM may infer capabilities that might not be explicitly defined or determinable by the virtual assistant or an external source. The virtual assistant or any external source that is identified as a possible reading comprehension answer (such as, using the example above, any device that describes an ability to find a movie) is then passed through a feature of the TCM which is textual entailment. Textual entailment is the task of training a model to take a description that is the "premise" and an inquiry that is the "hypothesis" and determine if the hypothesis is implied by the premise, or if the hypothesis and the premise form a contradiction. For example, the premise may be an external source, such as a second virtual assistant, with the description "Assistant 1 can handle finding movies". The hypothesis may be "I can ask the Assistant 1, find me a movie". Thus, the hypothesis is implied by the premise. On the other hand, if the hypothesis is "I can ask the Assistant 1, find me a widget", then the hypothesis and the premise form a contradiction. This reframing of the task as a reading comprehension and question/answering task allows the usage of much more complicated models of human intelligence than classification.

At a step 2460, the TCM generates inferences and conclusions regarding whether the virtual assistant, or any other external sources, can handle the user inquiry or which domain can handle the inquiry. Where the hypothesis is implied by the premise, the virtual assistant or the external source providing the premise are identified as a device or application that can process the user inquiry. Where the hypothesis and the premise form a contradiction, the virtual assistant or the external source providing the premise is identified as one that cannot process the user inquiry.

At a decision step 2464, TCM determines whether a positive outcome exists. A positive outcome is the identification of the virtual assistant or an external sources, as a device or application that can handle the user inquiry. If no positive outcome exists, then the operation advances to a step 2468 and the virtual assistant notifies the user that a response cannot be located or generated, and the process ends.

If, on the other hand, one or more positive outcomes are identified, then at a step 2472, the user inquiry may be offloaded to that device or application to provide the user a result. At a step 2476, the identified virtual assistant and/or external source(s) execute the user inquiry to generate a response. Then, at a step 2480 the response is provided to the user.

For example, a user inquiry to find a Harry Potter movie may be made on a smartwatch with no movie finding capabilities. But the virtual assistant may, using TMC, identify a nearby smartphone that can find movies. The user request may thus be routed to the smartphone to complete.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A system for speech interpretation from a user in a virtual environment in real-time aided by user data and virtual world data, the system comprising:
   a virtual reality device comprising one or more user input devices, one or more user output devices, and a communication module comprising machine executable instructions stored on a memory, for execution by a processor to establish direct communication with the one or more user input devices and one or more user output devices, and the one or more output devices outputting a virtual environment to the user comprising at least one visual element;
   a database storing information about elements in the virtual environment;
   an artificial intelligence module comprising machine executable instructions stored on a memory, for execution by a processor to perform speech interpretation, the artificial intelligence module comprising:
   a speech-to-text module comprising machine executable instructions stored on a memory, for execution by a processor to interpret user speech received from the one or more user input devices into a plurality of textual interpretations and based on a ranking of the textual interpretations, select a top interpretation;
   an augmentation module comprising machine executable instructions stored on a memory, for execution by a processor to add context into the user speech, the context derived from one or both of the following:
   a user data received from the one or more user input devices of the virtual reality device that provide data regarding the user's interaction with the virtual environment; and
   virtual environment data defining an element in the virtual environment with which the user is interacting; and
   a response generation module comprising machine executable instructions stored on a memory, for execution by a processor to form a question from the top interpretation with the added context, query a second database with the question, receive an answer from the second database responsive to the question, and then generate and provide a user response to the user based on the answer.

2. The system of claim 1 wherein the user data comprises what the user is looking at in the virtual environment or pointing at in the virtual environment, or both.

3. The system of claim 1 wherein virtual environment data comprises metadata that defines elements in the virtual environment.

4. The system of claim 1 wherein the virtual reality device includes a headset and one or more hand controllers.

5. The system of claim 1 wherein textual interpretations which related to elements in the virtual environment that the user is looking at, pointing at, or holding are giving a higher ranking than other textual interpretations.

6. The system of claim 1 wherein virtual environment data defines elements within the virtual environment and the location of those elements within the virtual environment.

7. A method for speech interpretation from a user in a virtual environment in real-time aided by user data and virtual world data comprising:
presenting the virtual environment to a user using a virtual reality device, the virtual reality device comprising one or more user input devices, one or more user output devices, and a communication module comprising machine executable instructions stored on a memory, for execution by a processor to establish direct communication with the one or more user input devices and one or more user output devices, and the one or more output devices outputting a virtual environment to the user comprising at least one visual element;
monitoring for user speech with an artificial intelligence module comprising machine executable instructions stored on a memory, for execution by a processor to perform speech interpretation, the artificial intelligence module further comprising a speech-to-text module and an augmentation module;
responsive to detecting user speech, processing the speech with the speech-to-text module comprising machine executable instructions stored on a memory, for execution by a processor to interpret user speech received from the one or more user input devices into a plurality of textual interpretations and based on a ranking of the textual interpretations, select a top interpretation;
obtaining user speech context from the augmentation module comprising machine executable instructions stored on a memory, for execution by a processor to add context into the user speech, the context derived from one or both of the following:
a user data received from the one or more user input devices of the virtual reality device that provide data regarding the user's interaction with the virtual environment wherein the user data comprises what the user is looking at in the virtual environment or pointing at in the virtual environment, or both; and
virtual environment data defining an element in the virtual environment with which the user is interacting.

8. The method of claim 7, wherein the virtual environment data is stored in a database which stores data regarding the elements in the virtual environment and the location of the elements.

9. The method of claim 7 further comprising, using a response generation module comprising machine executable instructions stored on a memory, for execution by a processor, performing the following:
forming a question from the top interpretation with the added context;
querying a second database with the question;
receiving an answer from the second database responsive to the question; and
generating and providing a user response to the user based on the answer.

10. The method of claim 7 wherein virtual environment data comprises metadata that defines elements in the virtual environment.

11. The method of claim 7 wherein the virtual reality device includes a headset and one or more hand controllers.

12. The method of claim 7 wherein textual interpretations which related to elements in the virtual environment that the user is looking at, pointing at, or holding are giving a higher ranking than other textual interpretations.

13. The method of claim 7 wherein virtual environment data defines elements within the virtual environment and the location of those elements within the virtual environment.

14. A system for speech interpretation from a user in a virtual environment in real-time aided by user data and virtual world data, the system comprising:
a virtual reality device comprising one or more user input devices, one or more user output devices, and a communication module comprising machine executable instructions stored on a memory, for execution by a processor, and the one or more output devices outputting a virtual environment to the user comprising at least one visual element;
a database storing information about elements in the virtual environment;
an artificial intelligence module comprising machine executable instructions stored on a memory, for execution by a processor to perform speech interpretation, the artificial intelligence module comprising:
a speech-to-text module comprising machine executable instructions stored on a memory, for execution by a processor to interpret user speech received from the one or more user input devices into a plurality of textual interpretations and based on a ranking of the textual interpretations, select a top interpretation, wherein the textual interpretations which are related to elements in the virtual environment that the user is looking at, pointing at, or holding are giving a higher ranking than other textual interpretations;
an augmentation module comprising machine executable instructions stored on a memory, for execution by a processor to add context into the user speech, the context derived from one or both of the following:
a user data received from the one or more user input devices of the virtual reality device that provide data regarding the user's interaction with the virtual environment; and
virtual environment data defining an element in the virtual environment with which the user is interacting.

* * * * *